US005623062A

United States Patent [19]
Sasaki et al.
[11] Patent Number: 5,623,062
[45] Date of Patent: Apr. 22, 1997

[54] BISAZO COMPOUNDS AS CHARGE GENERATING MATERIALS

[75] Inventors: Masaomi Sasaki, Susono; Tomoyuki Shimada, Numazu, both of Japan

[73] Assignee: Ricoh Company, Ltd., Tokyo, Japan

[21] Appl. No.: 234,941

[22] Filed: Apr. 28, 1994

Related U.S. Application Data

[62] Division of Ser. No. 924,581, Aug. 5, 1992, Pat. No. 5,344,735, which is a continuation of Ser. No. 680,237, Apr. 3, 1991, abandoned, which is a continuation of Ser. No. 341,111, Apr. 20, 1989, abandoned.

[30] Foreign Application Priority Data

| | | | |
|---|---|---|---|
| Apr. 20, 1988 | [JP] | Japan | 63-97933 |
| May 16, 1988 | [JP] | Japan | 63-120145 |

[51] Int. Cl.$^{6}$ .......................... C09B 35/023; C09B 35/03; G03G 5/09
[52] U.S. Cl. .......................... 534/653; 534/689; 534/691
[58] Field of Search .......................... 534/653, 689, 534/691

[56] References Cited

U.S. PATENT DOCUMENTS

| | | | |
|---|---|---|---|
| 4,486,519 | 12/1984 | Sasaki | 534/691 X |
| 4,830,943 | 5/1989 | Sasaki et al. | 430/58 |
| 5,081,233 | 1/1992 | Sasaki et al. | 534/689 X |

FOREIGN PATENT DOCUMENTS

| | | | |
|---|---|---|---|
| 62-156166 | 7/1987 | Japan | 534/689 |
| 63-142063 | 6/1988 | Japan | 534/689 |
| 64-33161 | 2/1989 | Japan | 534/689 |
| 64-63970 | 3/1989 | Japan | 534/689 |
| 64-79753 | 3/1989 | Japan | 534/691 |

*Primary Examiner*—Fiona T. Powers
*Attorney, Agent, or Firm*—Oblon, Spivak, McClelland, Maier & Neustadt, P.C.

[57] ABSTRACT

An electrophotographic photoconductor is disclosed, which comprises an electroconductive support and a photoconductive layer formed thereon comprising a bisazo pigment having the formula (I) serving as a charge generating material:

(I)

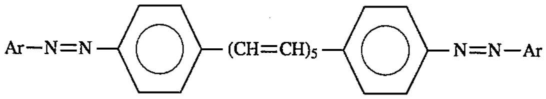

wherein Ar represents a residual group of a coupler represented by ArH selected from the group consisting of: an aromatic hydrocarbon compound having a hydroxyl group, a heterocyclic compound having a hydroxyl group, an aromatic hydrocarbon compound having an amino group, a heterocyclic compound having an amino group, an aromatic hydrocarbon compound having a hydroxyl group and an amino group, a heterocyclic compound having a hydroxyl group and an amino group, an aliphatic compound having an enolic ketone group, and an aromatic hydrocarbon compound having an enolic ketone group. Further, charge generating materials and novel bisazo pigments for use in the electrophotographic photoconductor are disclosed.

5 Claims, 11 Drawing Sheets

REFLECTION SPECTRA

BISAZO COMPOUNDS AS CHARGE GENERATING MATERIALS

This is a divisional of application Ser. No. 07/924, 581, filed on Aug. 5, 1992, now U.S. Pat. No. 5,344,735, which is a continuation of application Ser. No. 07/680,237, filed on Apr. 3, 1991, now abandoned, which is a Continuation of Application Ser. No. 07/341,111, filed on Apr. 20, 1989, now abandoned.

BACKGROUND OF THE INVENTION

The present invention relates to an electrophotographic photoconductor comprising an electroconductive support and a photoconductive layer comprising a particular bisazo pigment as a charge generating material which generates charge carriers when exposed to light.

Conventionally, a variety of inorganic and organic electrophotographic photoconductors are known. As inorganic electrophotographic photoconductors, there are known, for instance, a selenium photoconductor, a selenium-alloy photoconductor, and a zinc oxide photoconductor which is prepared by sensitizing zinc oxide with a sensitizer pigment and dispersing the same in a binder resin. Furthermore, as a representative example of organic electrophotographic photoconductors, an electrophotographic photoconductor comprising a charge transporting complex of 2,4,7-trinitro-9-fluorenone and poly-N-vinylcarbazole is known.

However, while these electrophotographic photoconductors have many advantages over other conventional electrophotographic photoconductors, they have several shortcomings from the viewpoint of practical use.

For instance, a selenium photoconductor, which is widely used at present, has the shortcomings that its manufacturing conditions are difficult and, accordingly, its production cost is high, and it is difficult to work it into the form of a belt due to its poor flexibility. Furthermore, it is so vulnerable to heat and mechanical shocks that it must be handled with the utmost care.

In contrast to this, the zinc oxide photoconductor is inexpensive since it can be produced more easily than the selenium photoconductor. Specifically, it can be produced by simply coating inexpensive zinc oxide particles on a support. However, it is poor in photosensitivity, surface smoothness, hardness, tensile strength and wear resistance. Therefore, it is not suitable for a photoconductor for use in plain paper copiers in which the photoconductor is used in quick repetition.

The photoconductor employing the aforementioned complex of 2,4,7-trinitro-9-fluorenone and poly-N-vinylcarbazole is also poor in photosensitivity and therefore not suitable for practical use, particularly for a high speed copying machine.

Recently, extensive studies have been done on the electrophotographic photoconductors in order to eliminate the above-mentioned shortcomings of the conventional photoconductors. In particular, attention has been focused on a multi-layered type organic electrophotographic photoconductor, each comprising an electroconductive support, a charge generation layer comprising an organic pigment formed on the electroconductive support, and a charge transport layer comprising a charge transporting material formed on the charge generation layer, which are for use in plain paper copiers, since such multi-layered type organic photoconductors have high photosensitivity and stable charging properties when compared with the conventional organic photoconductors. As a matter of fact, several types of multi-layered type organic electrophotographic photoconductors are being successfully used in practice. Examples of the multi-layered type organic electrophotographic photoconductors are as follows:

(1) A multi-layered type electrophotographic photoconductor whose charge generation layer is prepared by vacuum evaporation of a perylene derivative and whose charge transport layer comprises an oxadiazole derivative, disclosed in U.S. Pat. No. 3,871,882.

(2) A multi-layered type electrophotographic photoconductor whose charge generation layer comprises Chlorodiane Blue which is dispersed in an organic amine solution and coated on an electroconductive support and whose charge transport layer comprises a hydrazone derivative, disclosed in Japanese Patent publication No. 55-42380.

(3) A multi-layered type electrophotographic photoconductor whose charge generation layer comprises a distyrylbenzene type bisazo pigment dispersed in an organic solvent and coated on an electroconductive support, and whose charge transport layer comprises a hydrazone compound, disclosed in Japanese Laid-Open Patent Application No. 55-84943.

(4) A multi-layered type electrophotographic photoconductor whose charge generation layer comprises a bisazo compound represented by the following formula, disclosed in U.S. Pat. No. 4,486,519:

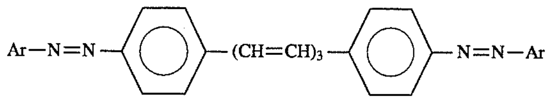

(5) A multi-layered type electrophotographic photoconductor whose charge generation layer comprises a bisazo compound represented by the following formula, disclosed in Japanese Laid-Open Patent Application No. 62-273545:

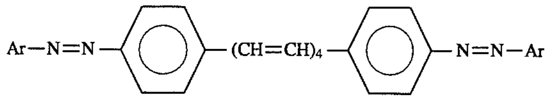

As previously mentioned, these multi-layered type electrophotographic photoconductors have many advantages over other electrophotographic photoconductors, but at the same time, they have various shortcomings.

Specifically, the electrophotographic photoconductor (1) employing a perylene derivative and an oxadiazole derivative presents no problem for use in an ordinary electrophotographic copying machine, but its photosensitivity is insufficient for use in a high-speed electro-photographic copying machine. Furthermore, since the perylene derivative, which is a charge generating material and has the function of controlling the spectral sensitivity of the photoconductor, does not necessarily have spectral absorbance in the entire visible region, this photoconductor is not suitable for use in color copiers.

The electrophotographic photoconductor (2) employing Chlorodiane Blue and a hydrazone compound exhibits comparatively good photosensitivity. However, when preparing this photoconductor, an organic amine, for example, ethylene diamine, which is difficult to handle, is necessary as a coating solvent for forming the charge generation layer.

The electrophotographic photoconductor (3) employing a distyryl benzene type bisazo compound and a hydrazone compound have an advantage over other conventional electrophotographic photoconductors in that the charge generation layer can be prepared easily by coating a dispersion of the bisazo pigment on an electroconductive support. However, the photosensitivity of the photoconductor is too low to use as a photoconductor for a high-speed electrophotographic copying machine.

Furthermore, recently there is a demand for a photoconductor for use in laser printers, in particular, for a highly sensitive photoconductor having a photosensitivity in a semiconductor laser wavelength region.

Even the electrophotographic photoconductor (4) and employing the previously mentioned bisazo compound(s) show insufficient absorbance near 780 nm of a semiconductor laser wavelength region.

Any of the above-mentioned photoconductors has too low a photosensitivity to use in practice-for semiconductor laser.

SUMMARY OF THE INVENTION

It is therefore a first object of the present invention to provide an electrophotographic photoconductor from which the above-mentioned conventional shortcomings are eliminated, and which has high photosensitivity and uniform spectral absorbance not only in the entire visible region, but also in the semiconductor laser wavelength region, and which gives rise to no difficulty in the production of the electrophotographic photoconductor and is suitable for use in laser printers.

A second object of the present invention is to provide charge generating materials for use in the above-mentioned electrophotographic photoconductor.

A third object of the present invention is to provide novel bisazo compounds employed as the above-mentioned charge generating materials.

The first object of the present invention is achieved by an electrophotographic photoconductor comprising an electroconductive support and a photoconductive layer formed thereon comprising a bisazo pigment having the formula (I) serving as a charge generating material:

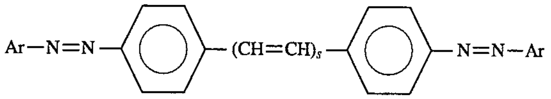
(I)

wherein Ar represents a residual group of a coupler represented by ArH selected from the group consisting of: an aromatic hydrocarbon compound having a hydroxyl group, a heterocyclic compound having a hydroxyl group, an aromatic hydrocarbon compound having an amino group, a heterocyclic compound having an amino group, an aromatic hydrocarbon compound having a hydroxyl group and an amino group, a heterocyclic compound having a hydroxyl group and an amino group, an aliphatic compound having an enolic ketone group, and an aromatic hydrocarbon compound having an enolic ketone group.

The second object of the present invention can be achieved by any of the following three types of charging materials:

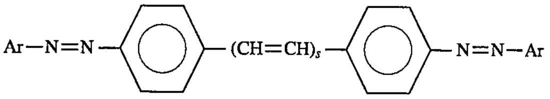
(I)

wherein Ar in the formula (I) is

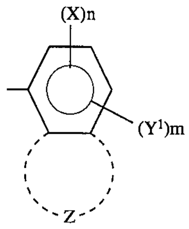

wherein X represents —OH,

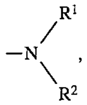

or —$NHSO_2$—$R^3$, wherein $R^1$ and $R^2$ each represent hydrogen, an unsubstituted or substituted alkyl group; and $R^3$ represents an unsubstituted or substituted alkyl group or an unsubstituted or substituted aryl group;

$Y^1$ represents hydrogen, a halogen, an unsubstituted or substituted alkyl group, an unsubstituted or substituted alkoxyl group, a carboxyl group, a sulfo group, an unsubstituted or substituted sulfamoyl group, or

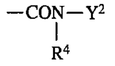

wherein $R^4$ represents hydrogen, an unsubstituted or substituted alkyl group, or an unsubstituted or substituted phenyl group; and $Y^2$ represents an unsubstituted or substituted cyclic hydrocarbon group, or an unsubstituted or substituted heterocyclic group, or

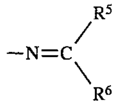

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto;

Z represents an unsubstituted or substituted cyclic hydrocarbon group, or an unsubstituted or substituted heterocyclic group; n is an integer of 1 or 2; and m is an integer of 1 or 2.

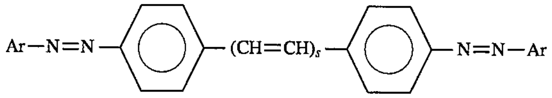
(II)

wherein Ar is

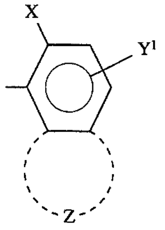

wherein X represents —OH,

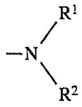

or $—NHSO_2—R^3$, wherein $R^1$ and $R^2$ each represent hydrogen, an unsubstituted or substituted alkyl group; and $R^3$ represents an unsubstituted or substituted alkyl group or an unsubstituted or substituted aryl group;

$Y^1$ represents hydrogen, a halogen, an unsubstituted or substituted alkyl group, an unsubstituted or substituted alkoxyl-group, a carboxyl group-a sulfo group an unsubstituted or substituted sulfamoyl group, or

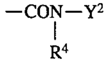

wherein $R^4$ represents hydrogen, an unsubstituted or substituted alkyl group, or an unsubstituted or substituted phenyl group; and $Y^2$ represents an unsubstituted or substituted cyclic hydrocarbon group, or an unsubstituted or substituted heterocyclic group, or

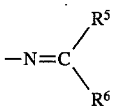

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, $R^5$ $R^6$ may form an substituted or substituted ring in combination with a carbon atom linked thereto; and Z represents an unsubstituted or substituted cyclic hydrocarbon group or an unsubstituted or substituted heterocyclic group.

(III)

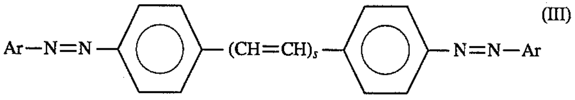

wherein Ar is

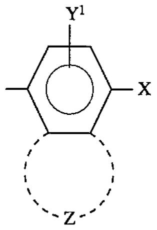

or

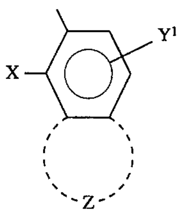

wherein X represents —OH,

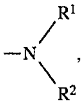

or $—NHSO_2—R^3$, wherein $R^1$ and $R^2$ each represent hydrogen, an unsubstituted or substituted alkyl group; and $R^3$ represents an unsubstituted or substituted alkyl group or an unsubstituted or substituted aryl group;

$Y^1$ represents hydrogen, a halogen, a substituted or unsubstituted alkyl group, an unsubstituted or substituted alkoxyl group, a carboxyl group, a sulfo group, a substituted or unsubstituted sulfamoyl group, or

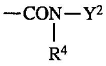

wherein $R^4$ represents hydrogen, an unsubstituted or substitute alkyl group, or an unsubstituted or substituted phenyl group; and $Y^2$ represents an unsubstituted or substituted cyclic hydrocarbon group, or an unsubstituted or substituted heterocyclic group, or

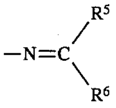

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto; and Z represents an unsubstituted or substituted cyclic hydrocarbon group, or an unsubstituted or substituted heterocyclic group.

The third object of the present invention can be achieved by a bisazo compound having the formula:

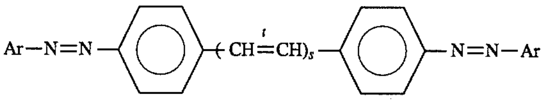

wherein Ar represents

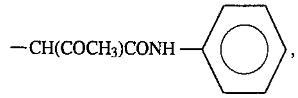,

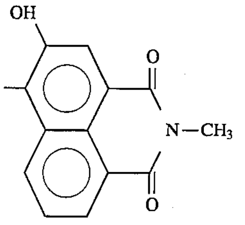 or 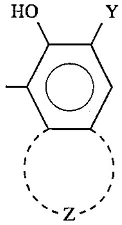

wherein Y represents a methoxy carbonyl group; an N,N-dimethyl carbamoyl group; —CONH—$Y^1$ in which $Y^1$ represents an unsubstituted or substituted hydrocarbon group, or an unsubstituted or substituted heterocyclic group; or —CONH=CH—$Y^2$ in which $Y^2$ represents an unsubstituted or substituted hydrocarbon group, or an unsubstituted or substituted heterocyclic group; and Z represents a benzene ring, a naphthalene ring, or a carbazole ring each of which ring may have a substituent.

DETAILED DESCRIPTION OF THE PREFERRED EMBODIMENTS

Figure 1:
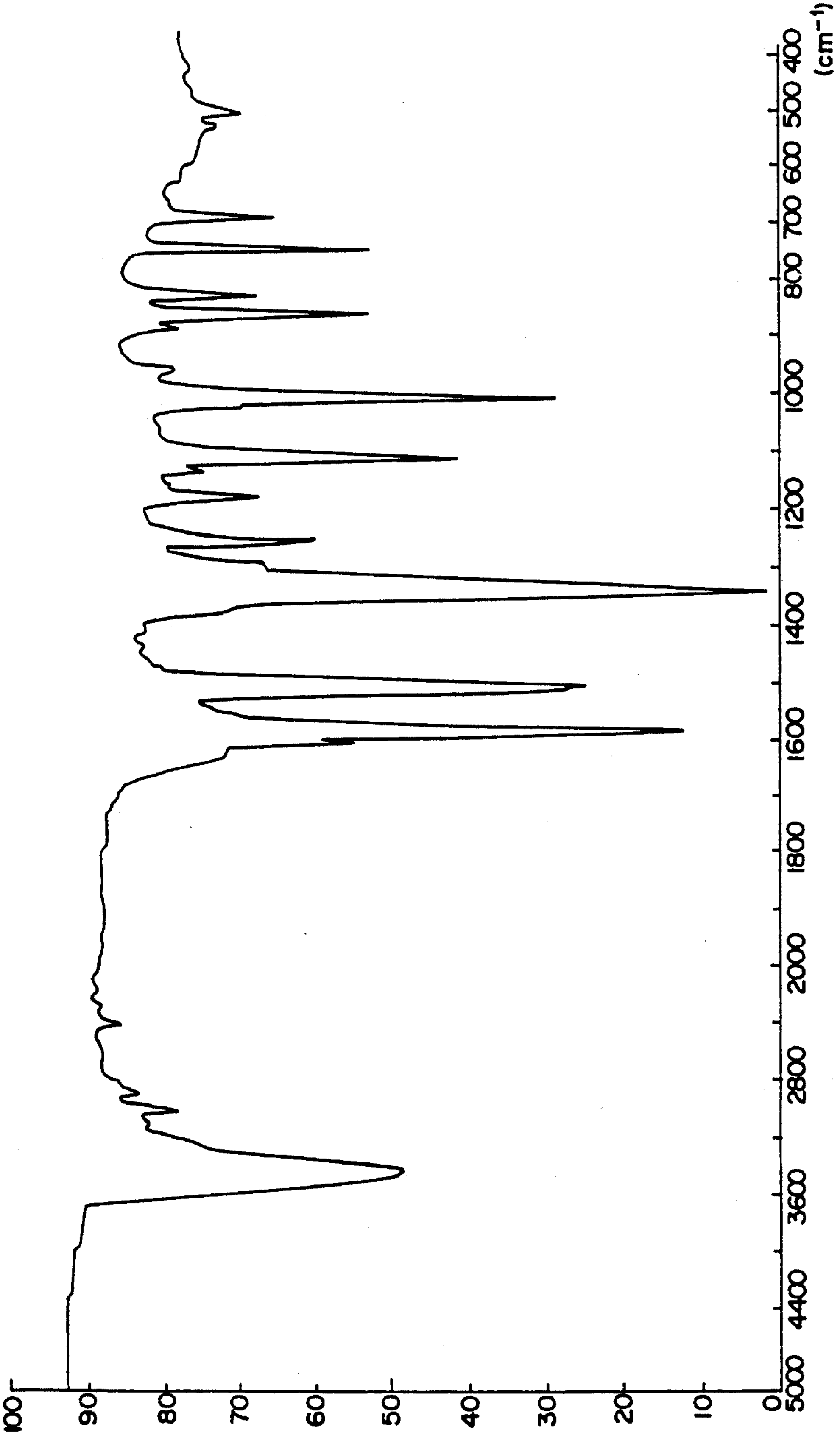
FIGS. 1 to 10 are IR spectra of bisazo pigments according to the present invention.

The electrophotographic photoconductor according to the present invention comprises an electroconductive support and a photoconductive layer formed thereon comprising a bisazo pigment having the formula (I) serving as a charge generating material:

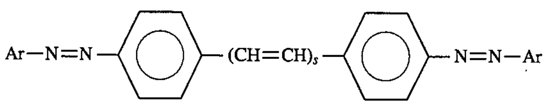 (I)

wherein Ar represents a residual group of a coupler represented by ArH selected from the group consisting of: an aromatic hydrocarbon compound having a hydroxyl group, a heterocyclic compound having a hydroxyl group, an aromatic hydrocarbon compound having an amino group, a heterocyclic compound having an amino group, an aromatic hydrocarbon compound having a hydroxyl group and an amino group, a heterocyclic compound having a hydroxyl group and an amino group, an aliphatic compound having an enolic ketone group, and an aromatic hydrocarbon compound having an enolic ketone group.

Preferable examples of the residual group represented by Ar of a coupler represented by ArH for the preparation of the above bisazo pigment are as follows:

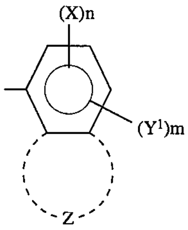 (I-1)

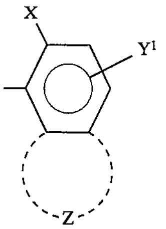 (I-2)

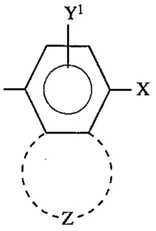 (I-3)

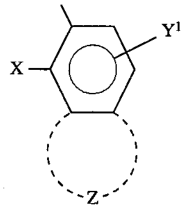 (I-4)

wherein X represents —OH,

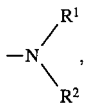, or —$NHSO_2$—$R^3$, wherein $R^1$ and $R^2$ each represent hydrogen, an unsubstituted or substituted alkyl group; and $R^3$ represents an unsubstituted or an substituted alkyl group or an unsubstituted or substituted aryl-group; $Y^1$ represents hydrogen, a halogen, an un substituted or substituted alkyl group, an unsubstituted or substituted alkoxyl group, a carboxyl group, a sulfo group, an unsubstituted or substituted sulfamoyl group, or

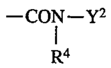

wherein $R^4$ represents hydrogen, an unsubstituted or substituted alkyl group, or an unsubstituted or substituted phenyl group; and $Y^2$ represents an unsubstituted or substituted cyclic hydrocarbon group, or an unsubstituted or substituted heterocyclic group, or

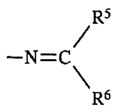

wherein $R^5$ represents an unsubstituted or substituted cyclic hydrocarbon group, an unsubstituted or substitute heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto;

z represents an unsubstituted or substituted cyclic hydrocarbon group, or an unsubstituted or substituted heterocyclic group; n is an integer of 1 or 2; and m is an integer of 1 or 2.

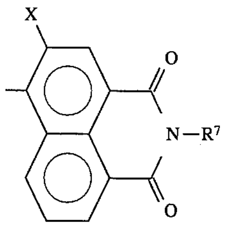

(I-5)

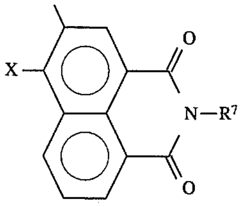

(I-6)

wherein X represents —OH,

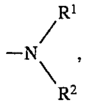

or —$NHSO_2$—$R^3$, wherein $R^1$ and $R^2$ each represent hydrogen, an unsubstituted or substituted alkyl group; and $R^3$ represents an unsubstituted or substituted alkyl group or an unsubstituted or substituted aryl group; and $R^7$ represents an unsubstituted or substituted hydrocarbon group.

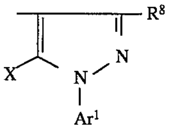

(I-7)

wherein X represents —OH,

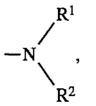

or —$NHSO_2$—$R^3$, wherein $R^1$ and $R^2$ each represent hydrogen, an unsubstituted or unsubstituted alkyl group; and $R^3$ represents an unsubstituted or substituted alkyl group or an unsubstituted or substituted aryl group; and $R^8$ represents an alkyl group, a carbamoyl group, a carboxyl group or ester group thereof; and $Ar^1$ represents an unsubstituted or substituted cyclic hydrocarbon group.

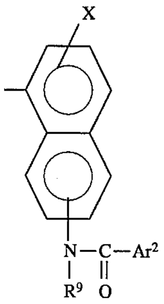

(I-8)

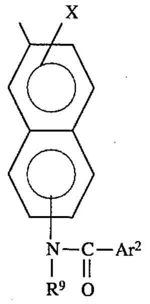

(I-9)

wherein X represents —OH,

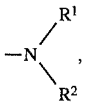

or —$NHSO_2$—$R^3$, wherein $R^1$ and $R^2$ each represent hydrogen, an unsubstituted or substituted alkyl group; and $R^3$ represents an unsubstituted or substituted alkyl group or an unsubstituted or substituted aryl group; and $R^9$ represents hydrogen or an unsubstituted or substituted hydrocarbon group; and $Ar^2$ represents an unsubstituted or substituted cyclic hydrocarbon group.

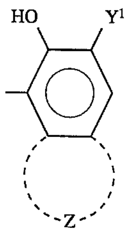

(I-10)

$Y^1$ represents hydrogen, a halogen, an unsubstituted or substituted alkyl group, an unsubstituted or substituted alkoxyl group, a carboxyl group, a sulfo group, an unsubstituted or substituted sulfamoyl group, or

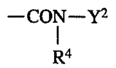

wherein $R^4$ represents hydrogen, an unsubstituted or substituted alkyl group, or an unsubstituted or substituted phenyl group; and $Y^2$ represents an unsubstituted or substituted cyclic hydrocarbon group, or an unsubstituted or substituted heterocyclic group, or

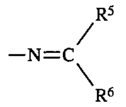

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form a ring in combination with a carbon atom linked thereto; and Z represents an unsubstituted or substituted cyclic hydrocarbon group, or an unsubstituted or substituted heterocyclic group.

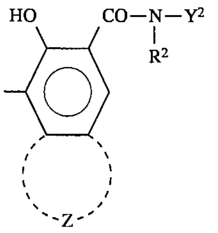

(I-11)

wherein Z represents an unsubstituted or substituted cyclic hydrocarbon group, or an unsubstituted or substituted heterocyclic group; $Y^2$ represents an unsubstituted or substituted cyclic hydrocarbon group, or an unsubstituted or substituted heterocyclic group; and $R^2$ represents hydrogen, an unsubstituted or substituted alkyl group, or unsubstituted or substituted phenyl group.

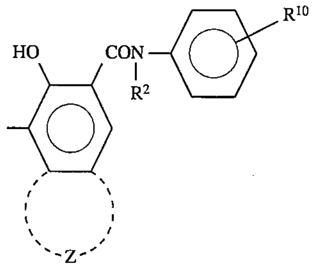

(I-12)

wherein Z represents an unsubstituted or substituted cyclic hydrocarbon group, or an unsubstituted or substituted heterocyclic group; $R^2$ represents hydrogen, an unsubstituted or substituted alkyl group, or an unsubstituted or substituted phenyl group; and $R^{10}$ represents a group selected from the group consisting of an alkyl group having 1 to 4 carbon atoms, an alkoxyl group having 1 to 4 carbon atoms, a halogen, a dialkylamino group, a diaralkylamino group, a halomethyl group, a nitro group, a cyano group, a carboxyl group or ester group, a hydroxyl group and a sulfonate group.

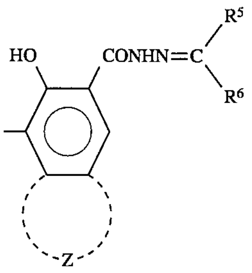

(I-13)

wherein Z represents an unsubstituted or substituted cyclic hydrocarbon group, or an unsubstituted or substituted heterocyclic group; $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto.

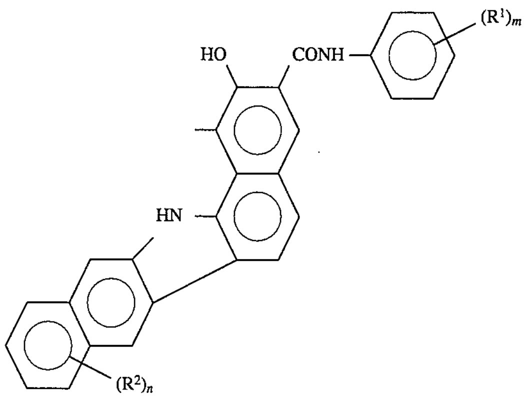

(I-14)

wherein $R^1$ represents hydrogen, an alkyl group such as a methyl group and an ethyl group; an alkoxyl group such as a methoxy group and an ethoxy group; a nitro group; or a halogen; $R^2$ represents an alkyl group such as a methyl group and an ethyl group; an alkoxyl group such as a methoxy group and an ethoxy group; a halogen; or a nitro group; and m and n each represent an integer of 1 to 3.

Of the above mentioned residual groups represented by Ar, the residual group represented by the formulas (I-12) and (I-13) are most preferable for use in the present invention.

In the above examples of the residual group represented by Ar in the formulas (I-1) to (I-4) and (I-10) to (I-13), as the cyclic hydrocarbon group represented by Z, a benzene ring and a naphthalene ring, which may have a substituent selected from the group consisting of a halogen, an alkyl group, and an alkoxyl group, are preferable for use in the present invention.

Further, as the heterocyclic group represented by Z, an indole ring, a carbazole ring and a benzofuran ring, which may have a substituent selected from the group consisting of a halogen, an alkyl group, and an alkoxyl group, are preferable for use in the present invention.

As the cyclic hydrocarbon group represented by $Y^2$ or $R^5$, a phenyl group, a naphthyl group, an anthryl group, and a pyrenyl group, which may have a substituent selected from the group consisting of an alkyl group having 1 to 4 carbon atoms, an alkoxyl group having 1 to 4 carbon atoms, a halogen, a dialkylamino group, a diaralkylamino group, a halomethyl group, a nitro group, a cyano group, a carboxyl group or ester group, a hydroxyl group and a sulfonate group, are preferable for use in the present invention.

As the heterocyclic group represented by $Y^2$ or $R^5$, a pyridyl group, a thienyl group, a furyl group, anindolyl group, a benzofuranyl group, a carbazolyl group and a dibenzofuranyl group, which may have a substituent selected from the group consisting of an alkyl group having 1 to 4 carbon atoms, an alkoxyl group having 1 to 4 carbon atoms, a halogen, a dialkylamino group, a diaralkylamino group, a halomethyl group, a nitro group, a cyano group, a carboxyl group or ester group, a hydroxyl group and a sulfonate group, are preferable for use in the present invention.

As the ring formed by $R^5$ and $R^6$, a fluorene ring which may have a substituent selected from the group consisting of an alkyl group having 1 to 4 carbon atoms, an alkoxyl group having 1 to 4 carbon atoms, a halogen, a dialkylamino group, a diaralkylamino group, a halomethyl group, a nitro group, a cyano group, a carboxyl group or ester group, a hydroxyl group and a sulfonate group, are preferable for use in the present invention.

A preferable substituent of the phenyl group represented by $R^4$ is a halogen such as bromide.

In the examples of the residual group represented by Ar in the formulas (I-5) and (I-6), as the hydrocarbon group represented by $R^7$, an alkyl group having 1 to 4 carbon atoms, an aralkyl group, and an aryl group, which aralkyl group and aryl group may have a substituent selected from the group consisting of an alkyl group having 1 to 4 carbon atoms, an alkoxyl group having 1 to 4 carbon atoms, a halogen, a hydroxyl group and a nitro group, are preferable for use in the present invention.

In the examples of the residual group represented by Ar in the formula (I-7), as the cyclic hydrocarbon group represented by $Ar^1$ a phenyl group and a naphthyl group which may have a substituent selected from the group consisting of an alkyl group having 1 to 4 carbon atoms, an alkoxyl group having 1 to 4 carbon atoms, a halogen, a cyano group, and a dialkylamino group, are preferable for use in the present invention.

In the examples of the residual group represented by Ar in the formulas (I-8) and (I-9), as the hydrocarbon group represented by $R^9$, an alkyl group having 1 to 4 carbon atoms, an aralkyl group, and an aryl group, which aralkyl group and aryl group may have a substituent selected from the group consisting of an alkyl group having 1 to 4 carbon atoms, an alkoxyl group having 1 to 4 carbon atoms, a halogen, a hydroxyl group and a nitro group, are preferable for use in the present invention.

Further as the cyclic hydrocarbon group represented by $Ar^2$, a phenyl group and a naphthyl group which may have a substituent selected from the group consisting of an alkyl group having 1 to 4 carbon atoms an alkoxyl group having 1 to 4 carbon atoms, a halogen, a cyano group, and a dialkylamino group, are preferable for use in the present invention.

The charge generating materials for use in the present invention are preferably bisazo compounds having the following general formula:

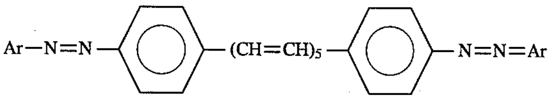

(I)

wherein Ar in the formula (I) is

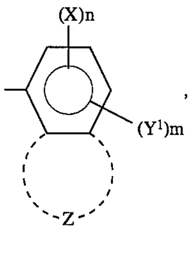

,

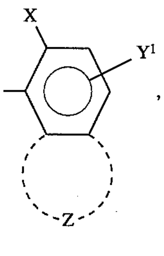

,

-continued

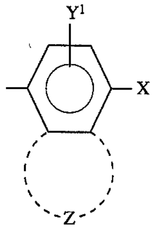

or

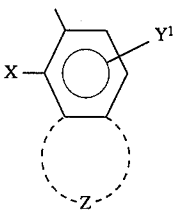

wherein X represents —OH,

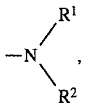

, or $—NHSO_2—R^3$, wherein $R^1$ and $R^2$ each represent hydrogen, an unsubstituted or substituted alkyl group; and $R^3$ represents an unsubstituted or substituted alkyl group or an unsubstituted or substituted aryl group;

$Y^1$ represents hydrogen, a halogen, an unsubstituted or substituted alkyl group, an unsubstituted or substituted alkoxyl group, a carboxyl group, a sulfo group, an unsubstituted or substituted sulfamoyl group, or

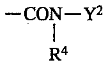

wherein $R^4$ represents hydrogen, an unsubstituted or substituted alkyl group, or an unsubstituted or substituted phenyl group; and $Y^2$ represents an unsubstituted or substituted cyclic hydrocarbon group, or an unsubstituted or substituted heterocyclic group, or

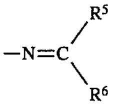

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto;

Z represents an unsubstituted or substituted cyclic hydrocarbon group, or an unsubstituted or substituted heterocyclic group; n is an integer of 1 or 2; and m is an integer of 1 or 2.

The bisazo compounds for use in the present invention are bisazo compounds have the following general formula:

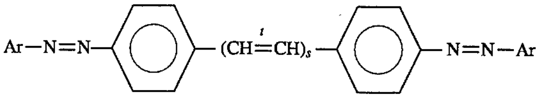

(II)

wherein Ar represents

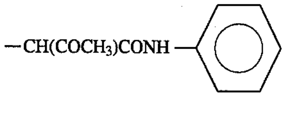

-continued

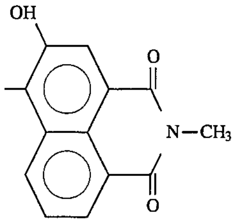

or

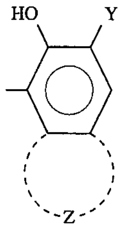

wherein Y represents a methoxy carbonyl group an N,N-dimethyl carbamoyl group; —CONH—$Y^1$ in which $Y^1$ represents an unsubstituted or substituted hydrocarbon group, or an unsubstituted or substituted heterocyclic group; or —CONH═CH—$Y^2$ in which $Y^2$ represents an unsubstituted or substituted hydrocarbon group, or an unsubstituted or substituted heterocyclic group; and Z represents a benzene ring, a naphthalene ring, or a carbazole ring each of which ring may have a substituent.

In the above, as preferable substituents of the rings represented by Z are a halogen, an alkyl group, and an alkoxyl group. Preferable hydrocarbon groups represented by $Y^1$ are a phenyl group which may have a substituent selected from the group consisting of an alkyl group, an alkoxyl group, a hydroxyl group, a dialkylamino group, a halogen, a nitro group, a phenylamino group and a phenylcarbamoyl group; a naphthyl group which may have a substituent selected from the group consisting of an alkyl group, a halogen, a hydroxyl group, a nitro group and an alkoxyl group; a carbazolyl group; and

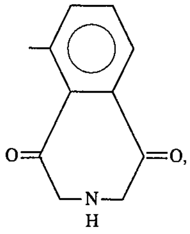,

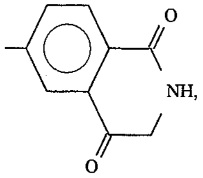,

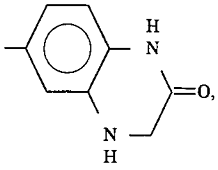,

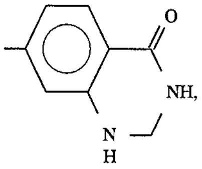,

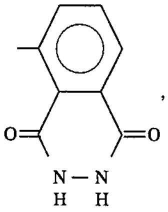,

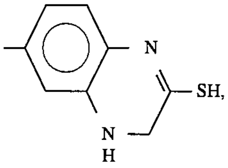,

-continued

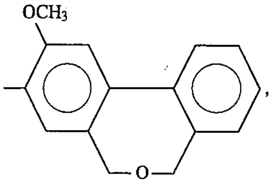, and

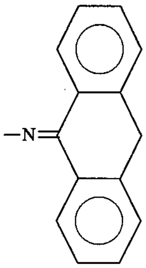.

Preferable hydrocarbon groups represented by $Y^2$ are a phenyl group and a naphthyl group, which may have a substituent selected from the group consisting of an alkyl group, an alkoxyl group, a halogen, a hydroxyl group and a nitro group; and an anthryl group.

Representative examples of the bisazo pigment for use in the present invention are in the following Table 1.

TABLE 1

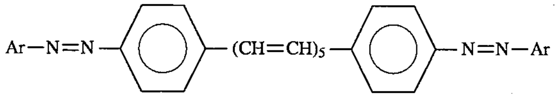

| No. | Ar |
|---|---|
| 1 | 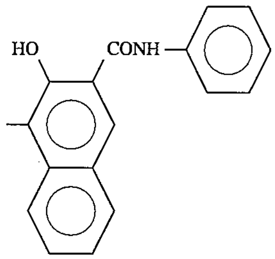 |
| 2 | 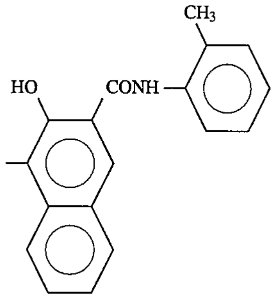 |

TABLE 1-continued
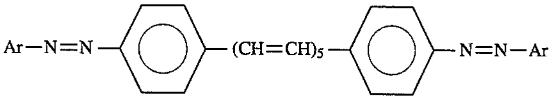
| No. | Ar |
|---|---|
| 3 | 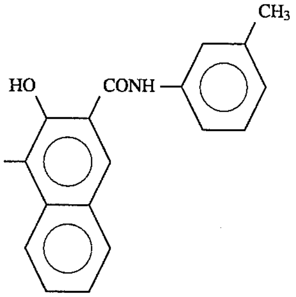 |
| 4 | 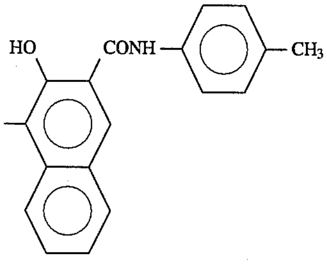 |
| 5 | 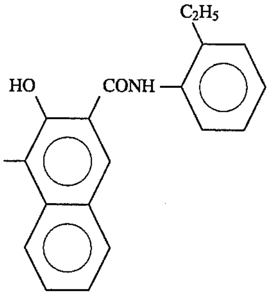 |
| 6 | 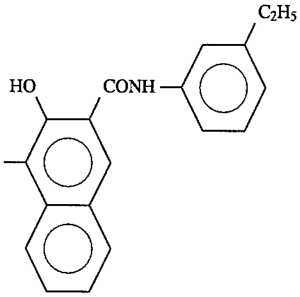 |
| 7 | 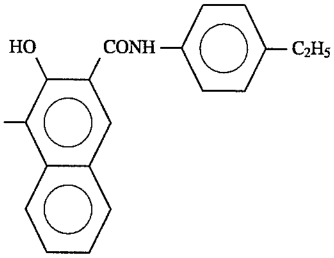 |
TABLE 1-continued
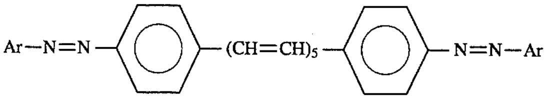
| No. | Ar |
|---|---|
| 8 | 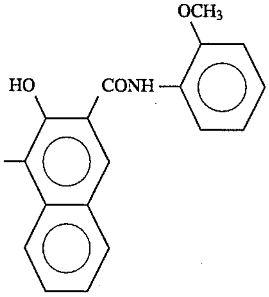 |
| 9 | 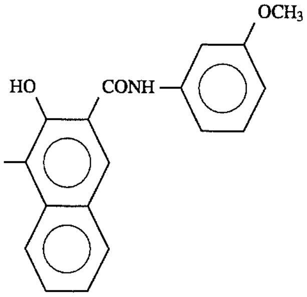 |
| 10 | 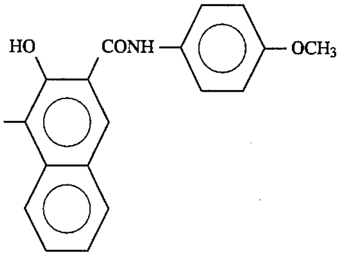 |
| 11 | 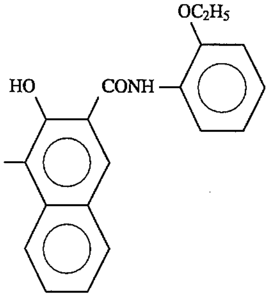 |
| 12 | 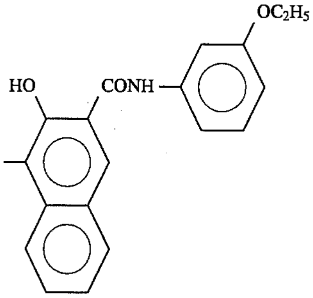 |

TABLE 1-continued
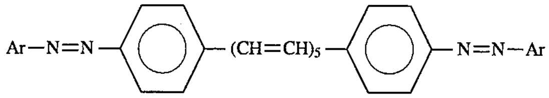
| No. | Ar |
|---|---|
| 13 | 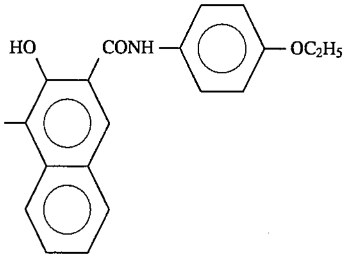 |
| 14 | 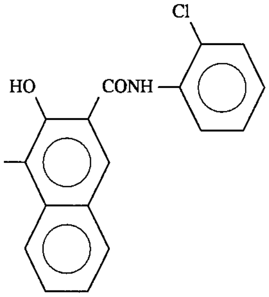 |
| 15 | 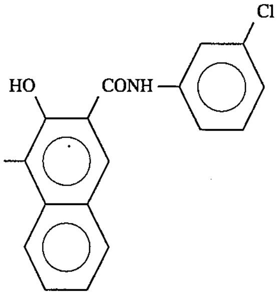 |
| 16 | 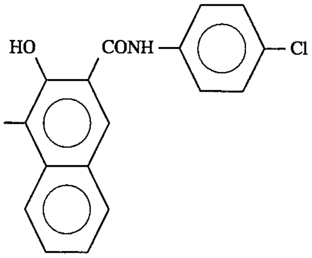 |
| 17 | 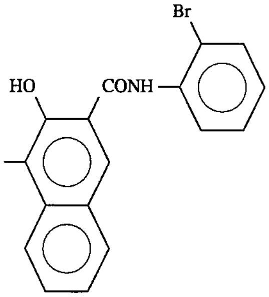 |
TABLE 1-continued
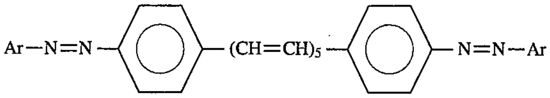
| No. | Ar |
|---|---|
| 18 | 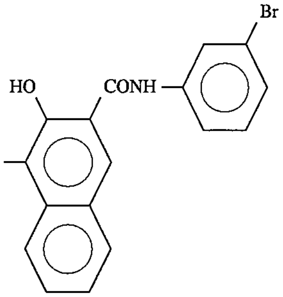 |
| 19 | 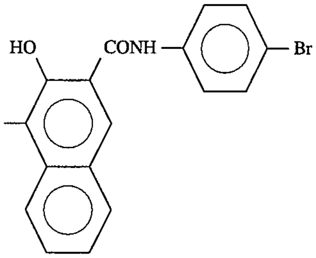 |
| 20 | 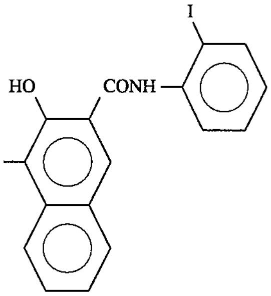 |
| 21 | 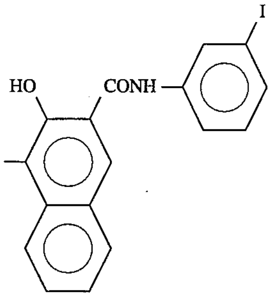 |
| 22 | 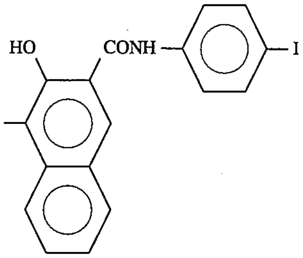 |

TABLE 1-continued
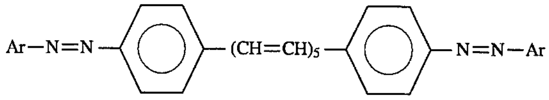
| No. | Ar |
|---|---|
| 23 | 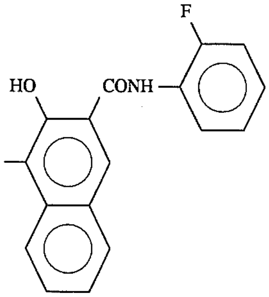 |
| 24 | 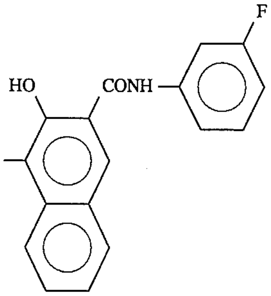 |
| 25 | 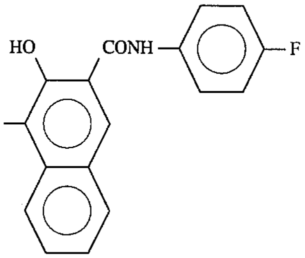 |
| 26 | 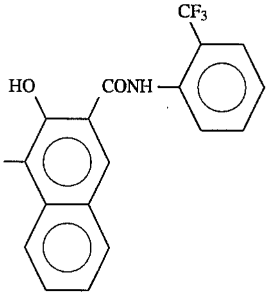 |
| 27 | 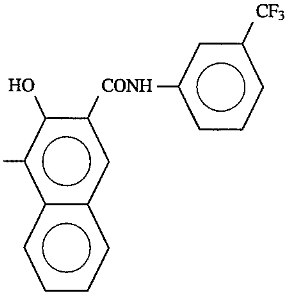 |
TABLE 1-continued
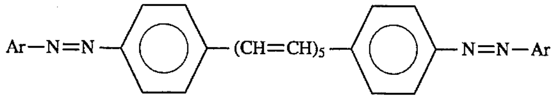
| No. | Ar |
|---|---|
| 28 | 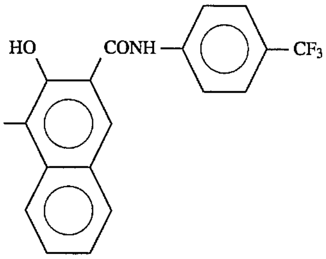 |
| 29 | 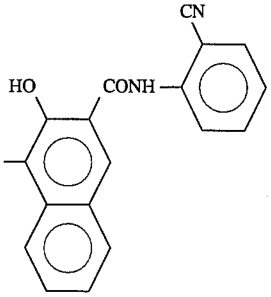 |
| 30 | 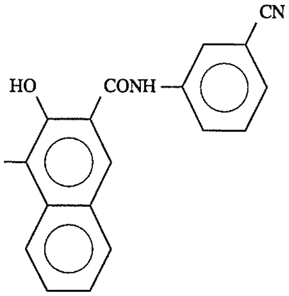 |
| 31 | 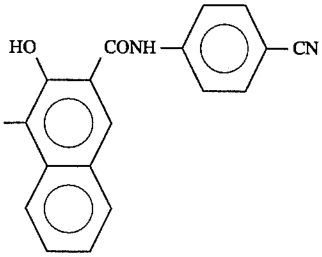 |
| 32 | 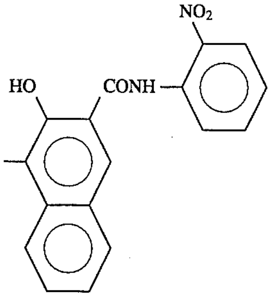 |

TABLE 1-continued
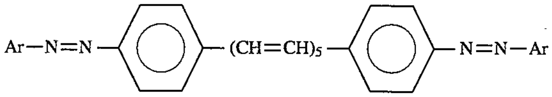
| No. | Ar |
|---|---|
| 33 | 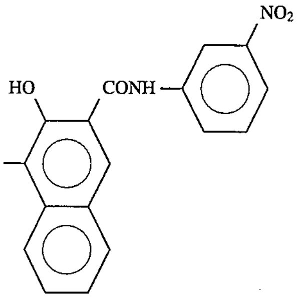 |
| 34 | 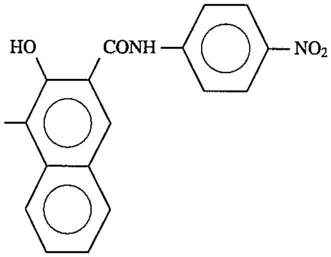 |
| 35 | 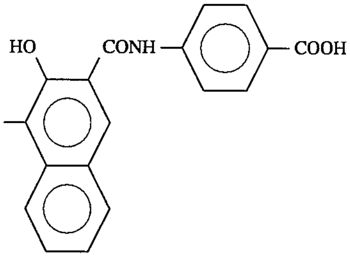 |
| 36 | 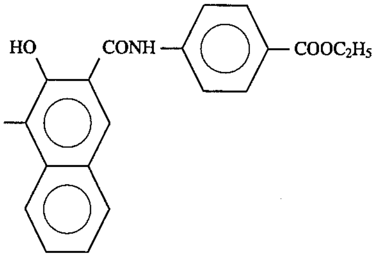 |
| 37 | 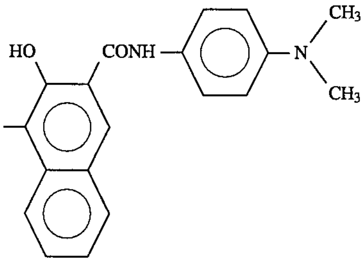 |
TABLE 1-continued
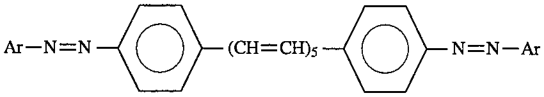
| No. | Ar |
|---|---|
| 38 | 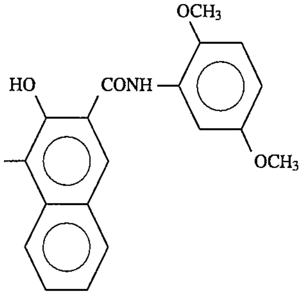 |
| 39 | 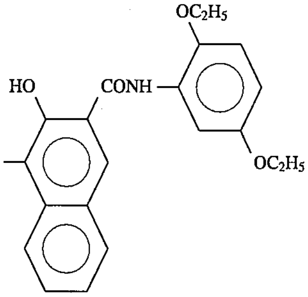 |
| 40 | 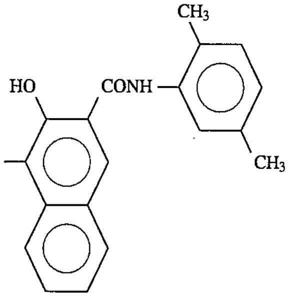 |
| 41 | 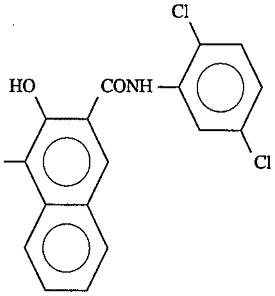 |
| 42 | 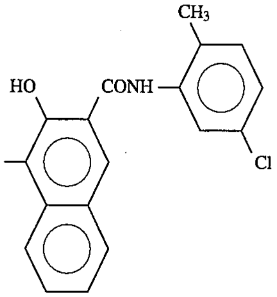 |

TABLE 1-continued
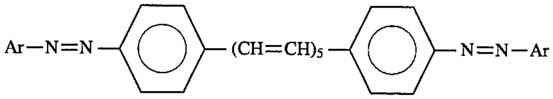
| No. | Ar |
|---|---|
| 43 | 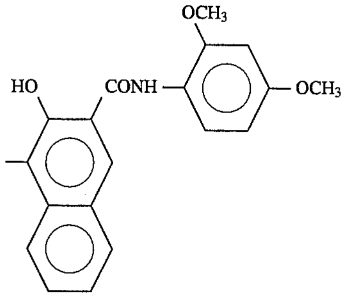 |
| 44 | 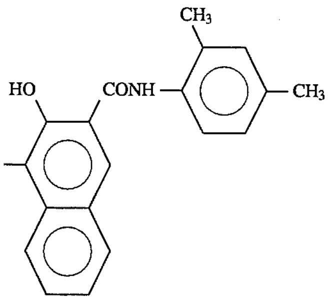 |
| 45 | 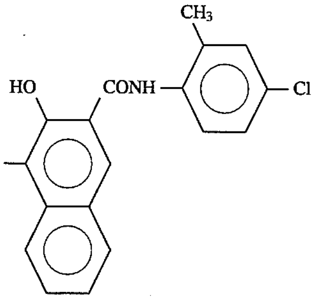 |
| 46 | 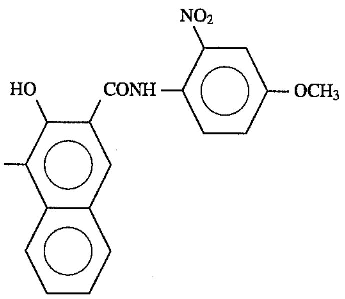 |
TABLE 1-continued
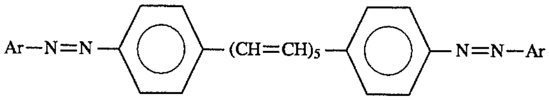
| No. | Ar |
|---|---|
| 47 | 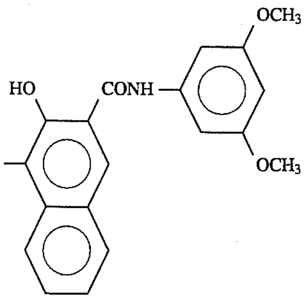 |
| 48 | 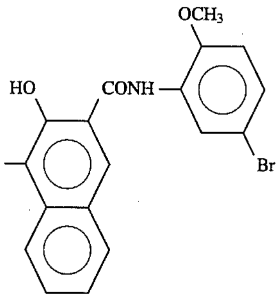 |
| 49 | 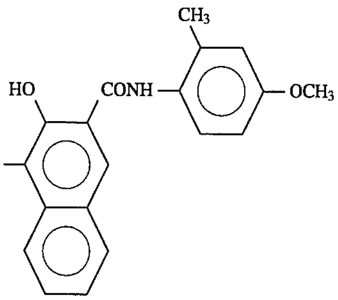 |
| 50 | 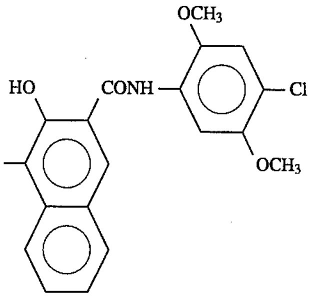 |
| 51 | 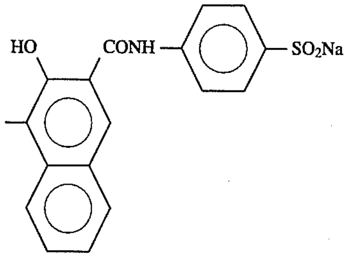 |

TABLE 1-continued
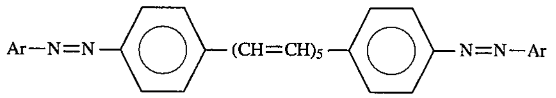
| No. | Ar |
|---|---|
| 52 | 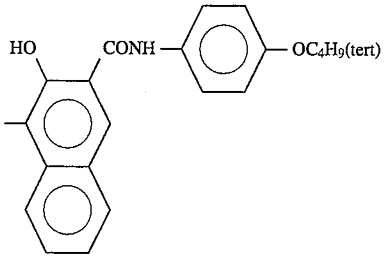 |
| 53 | 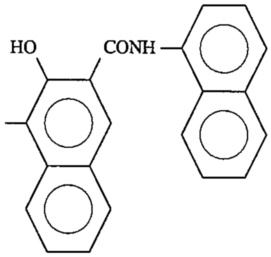 |
| 54 | 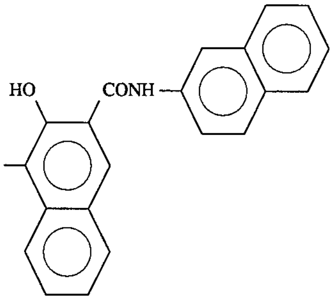 |
| 55 | 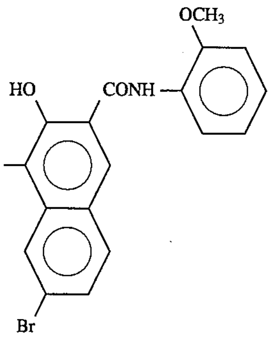 |
TABLE 1-continued
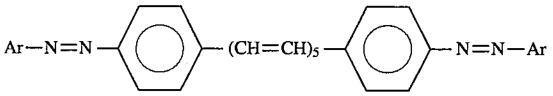
| No. | Ar |
|---|---|
| 56 | 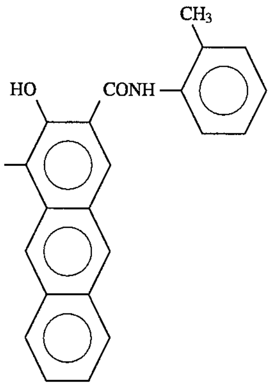 |
| 57 | 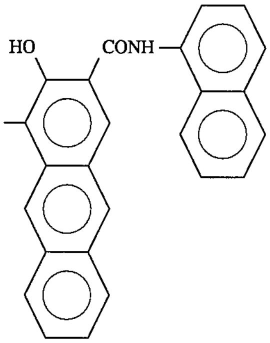 |
| 58 | 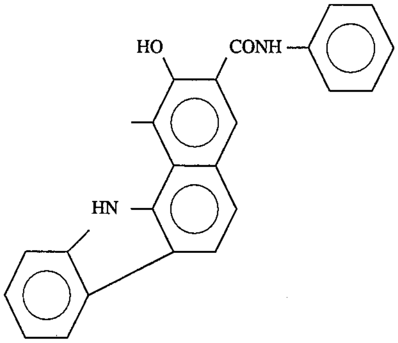 |
| 59 | 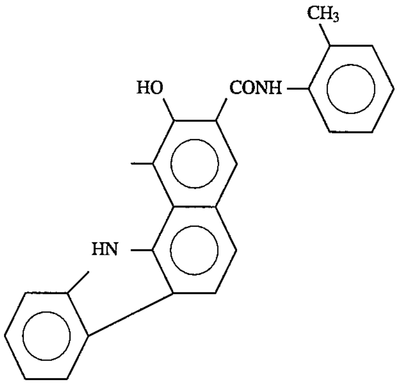 |

TABLE 1-continued
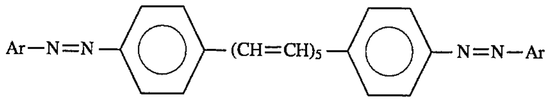
| No. | Ar |
| --- | --- |
| 60 | 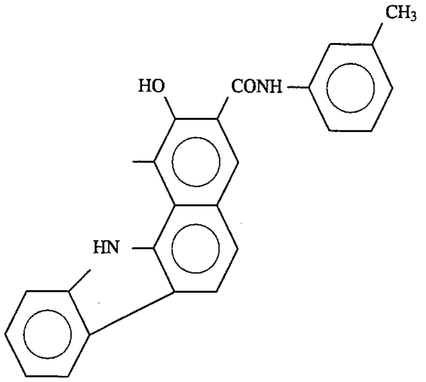 |
| 61 | 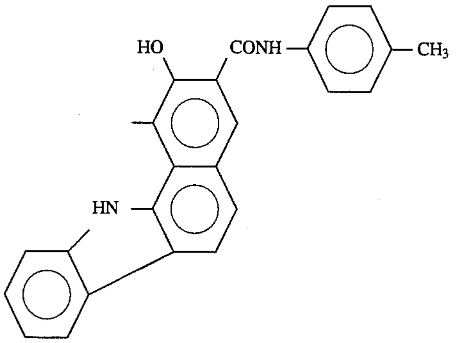 |
| 62 | 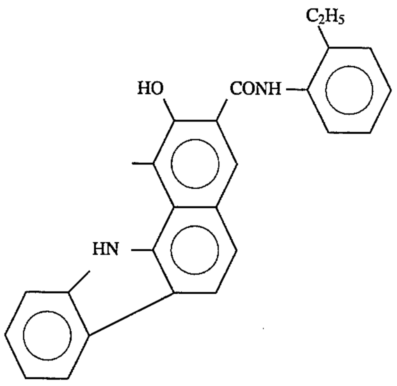 |
| 63 | 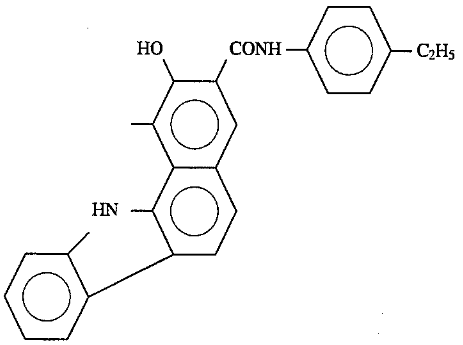 |
TABLE 1-continued
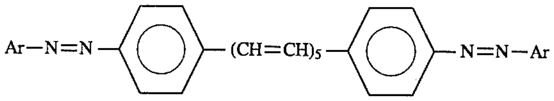
| No. | Ar |
| --- | --- |
| 64 | 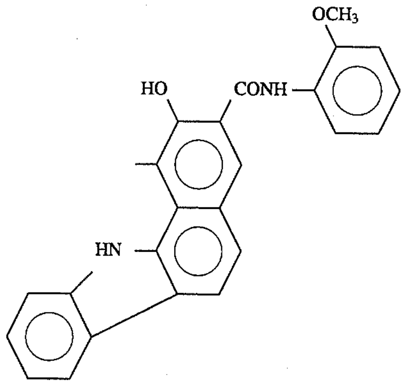 |
| 65 | 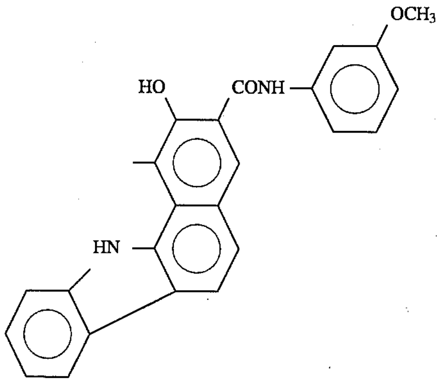 |
| 66 | 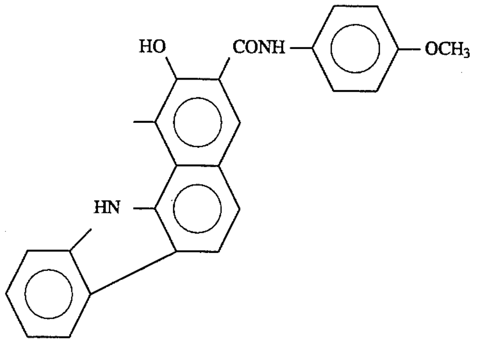 |
| 67 | 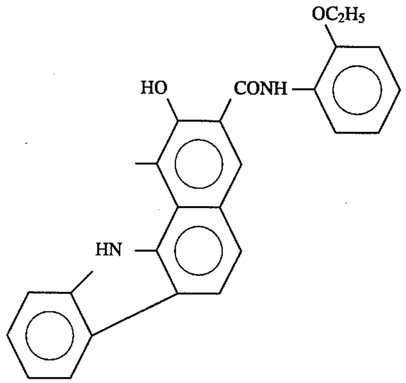 |

TABLE 1-continued
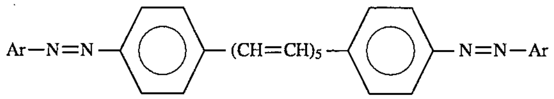
| No. | Ar |
|---|---|
| 68 | 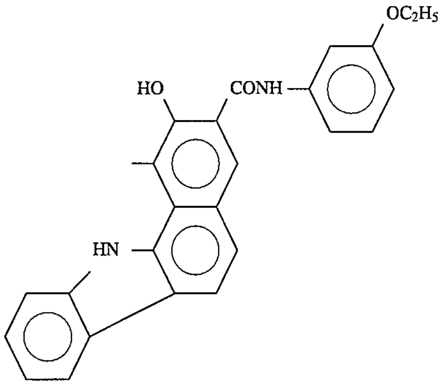 |
| 69 | 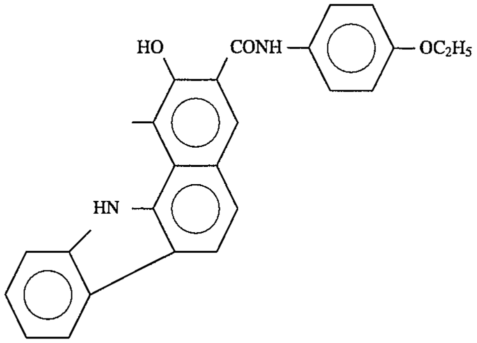 |
| 70 | 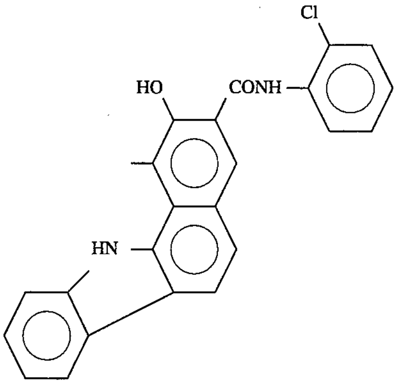 |
TABLE 1-continued
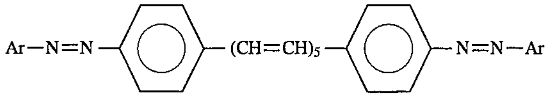
| No. | Ar |
|---|---|
| 71 | 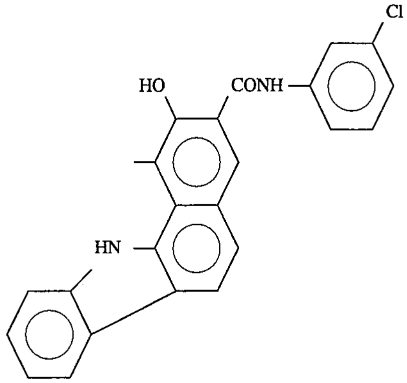 |
| 72 | 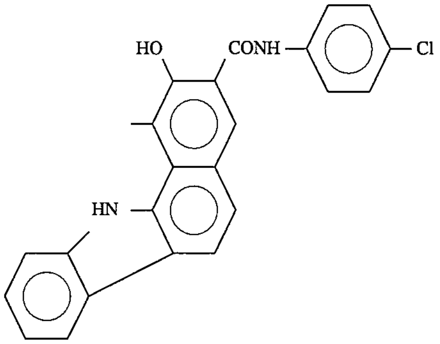 |
| 73 | 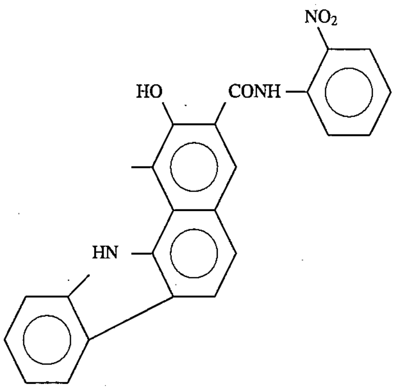 |
| 74 | 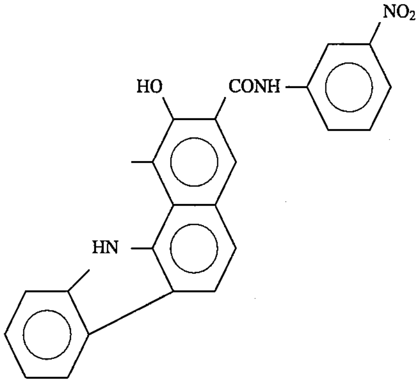 |

TABLE 1-continued
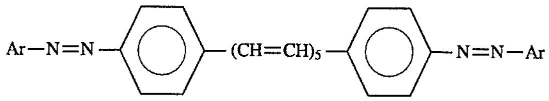
| No. | Ar |
|---|---|
| 75 | 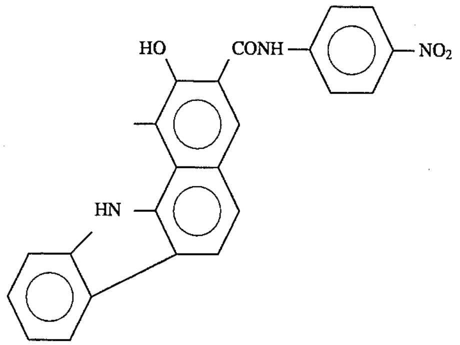 |
| 76 | 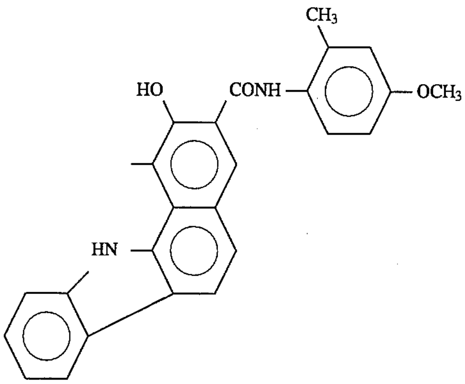 |
| 77 | 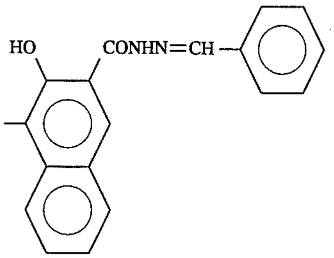 |
| 78 | 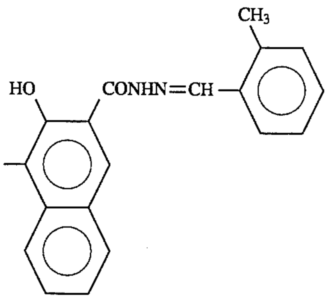 |
TABLE 1-continued
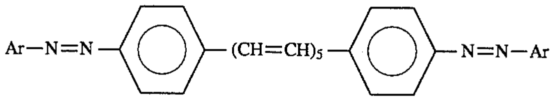
| No. | Ar |
|---|---|
| 79 | 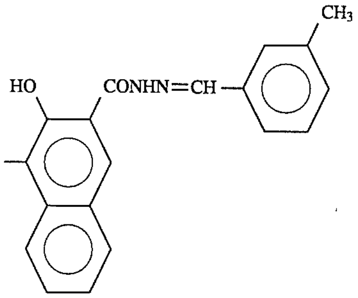 |
| 80 | 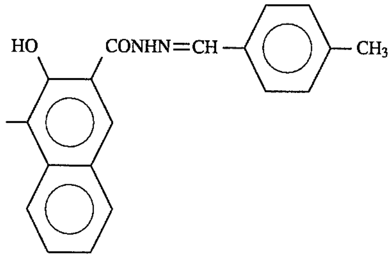 |
| 81 | 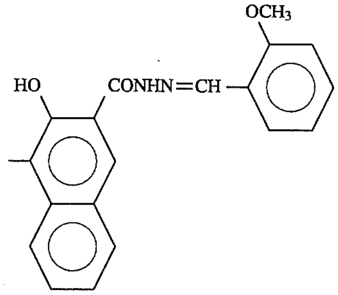 |
| 82 | 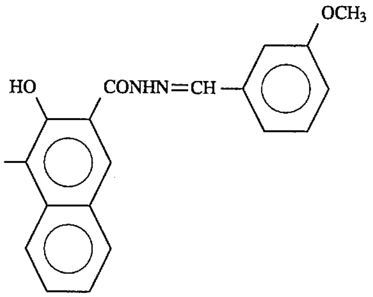 |
| 83 | 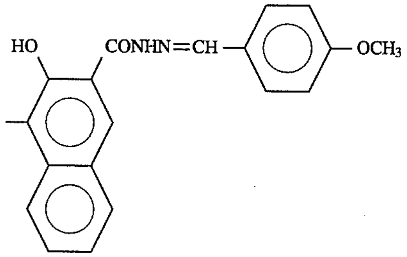 |

TABLE 1-continued
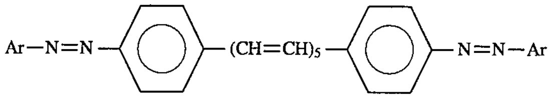
| No. | Ar |
| --- | --- |
| 84 | 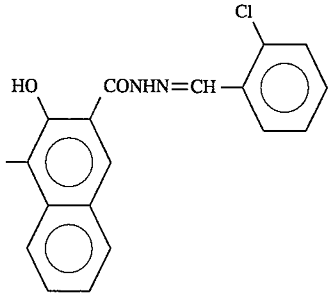 |
| 85 | 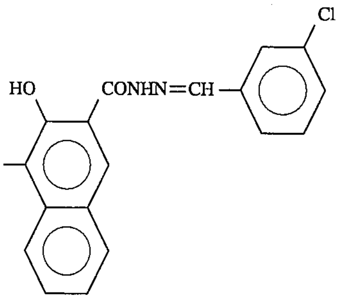 |
| 86 | 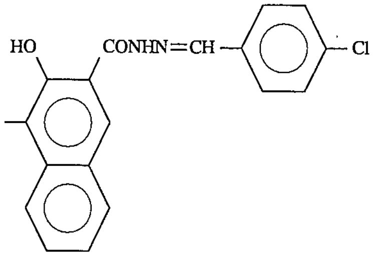 |
| 87 | 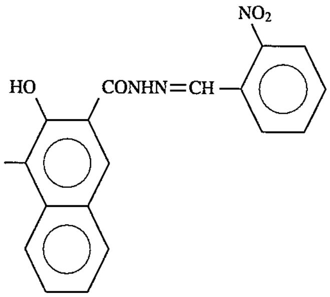 |
| 88 | 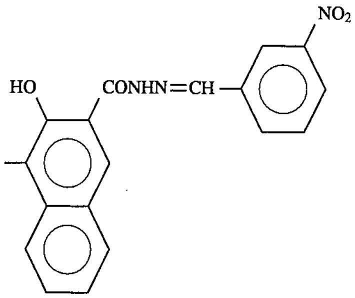 |
TABLE 1-continued
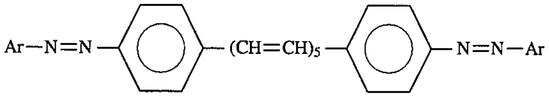
| No. | Ar |
| --- | --- |
| 89 | 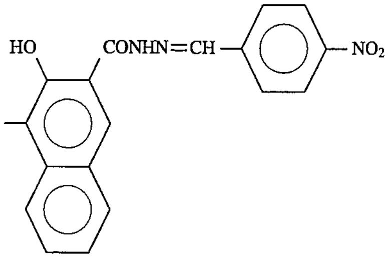 |
| 90 | 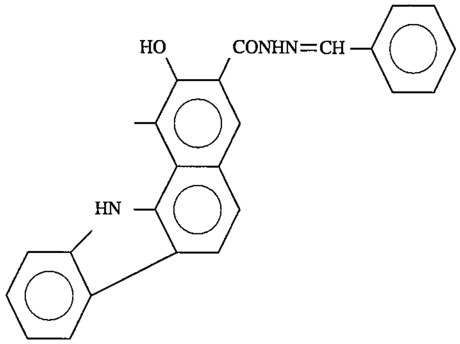 |
| 91 | 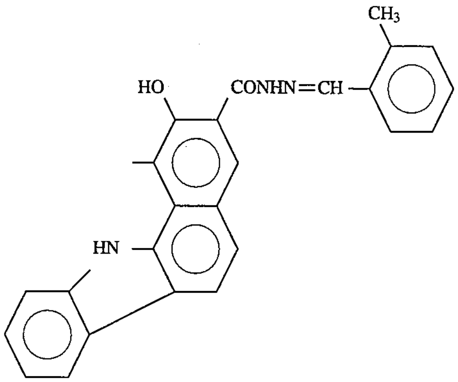 |
| 92 | 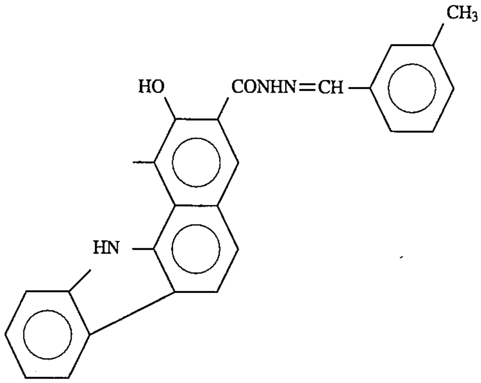 |

TABLE 1-continued
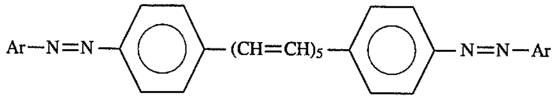
| No. | Ar |
|---|---|
| 93 | 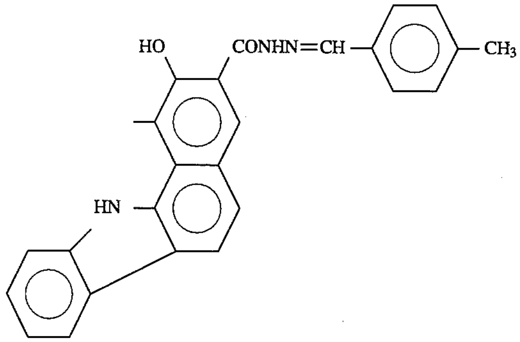 |
| 94 | 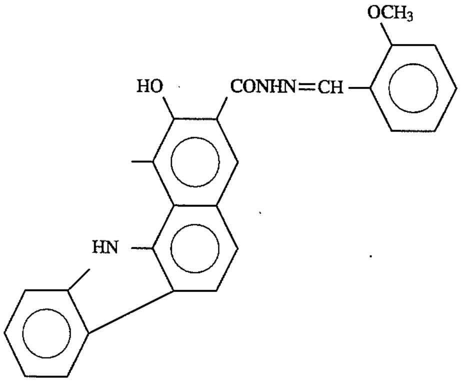 |
| 95 | 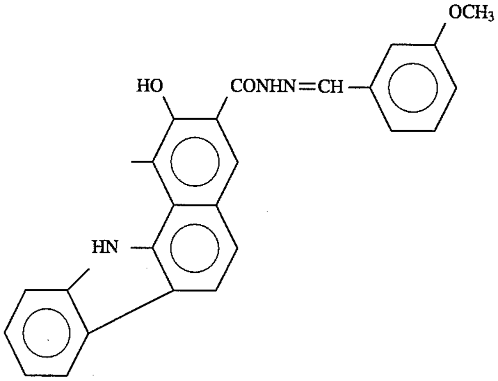 |
| 96 | 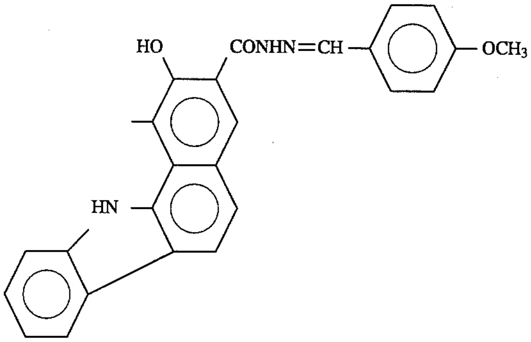 |
TABLE 1-continued
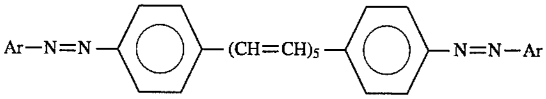
| No. | Ar |
|---|---|
| 97 | 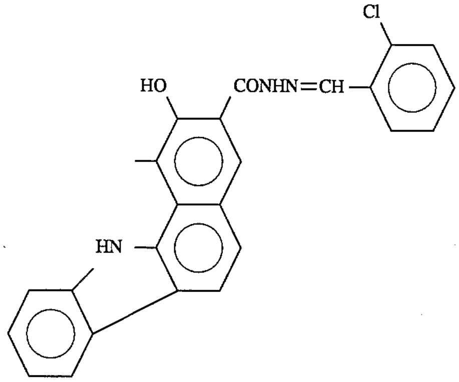 |
| 98 | 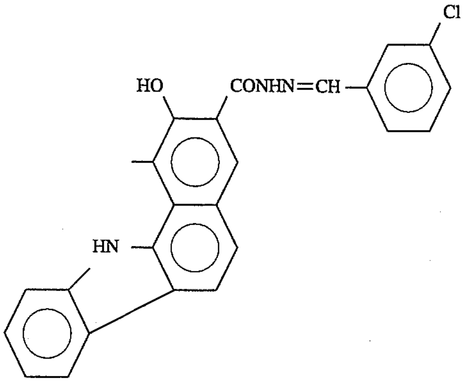 |
| 99 | 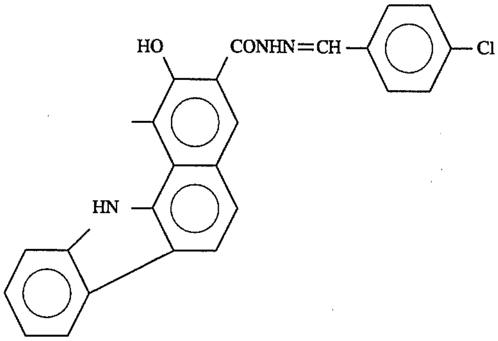 |
| 100 | 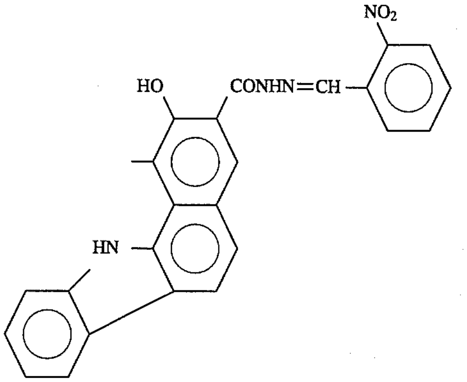 |

TABLE 1-continued
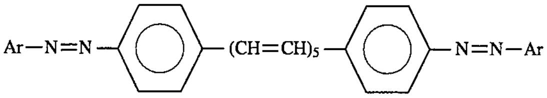
| No. | Ar |
|---|---|
| 101 | 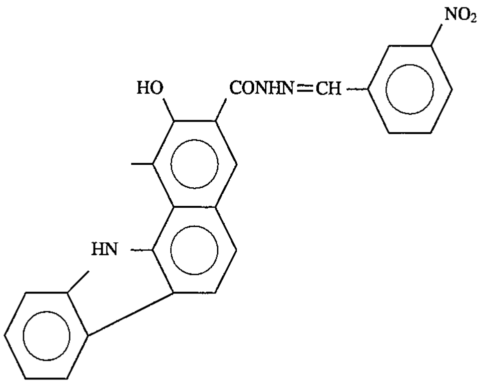 |
| 102 | 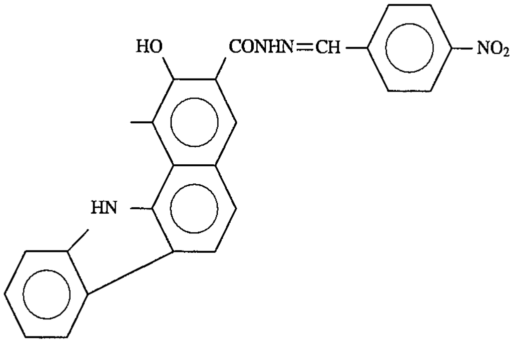 |
| 103 | 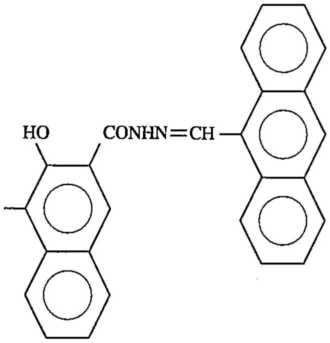 |
| 104 | 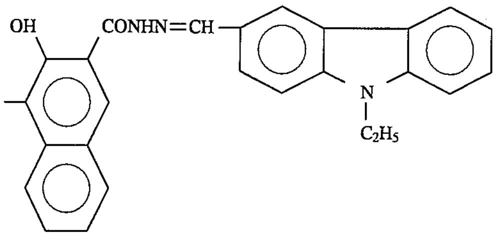 |
TABLE 1-continued
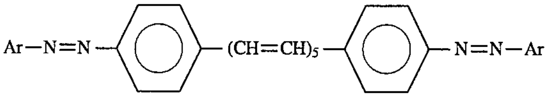
| No. | Ar |
|---|---|
| 105 | 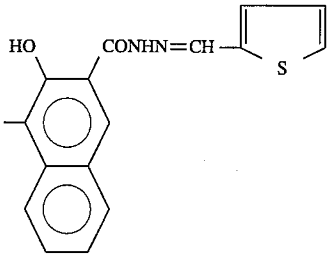 |
| 106 | 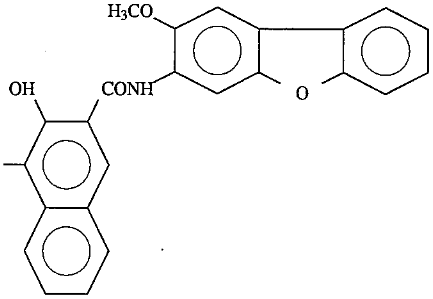 |
| 107 | 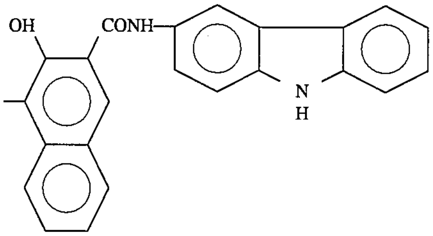 |
| 108 | 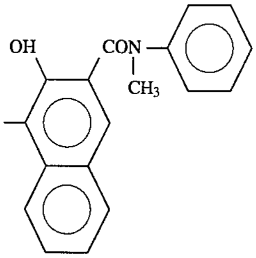 |
| 109 | 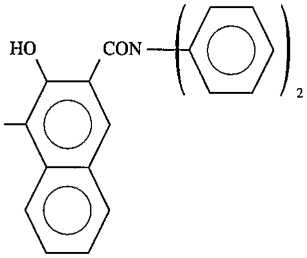 |

TABLE 1-continued
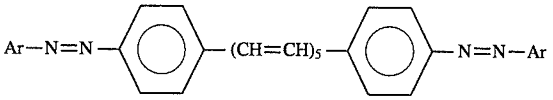
| No. | Ar |
|---|---|
| 110 | 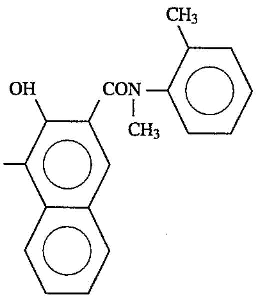 |
| 111 | 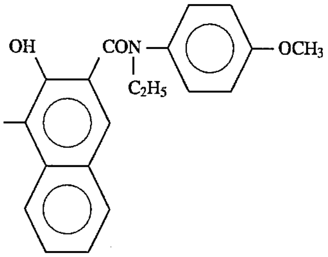 |
| 112 | 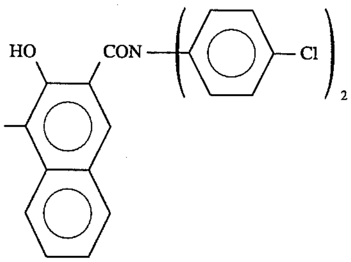 |
| 113 | 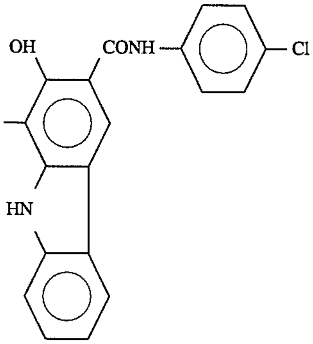 |
TABLE 1-continued
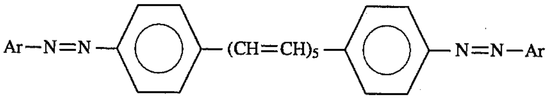
| No. | Ar |
|---|---|
| 114 | 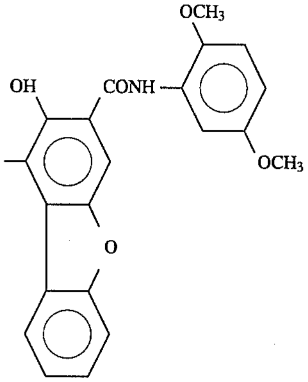 |
| 115 | 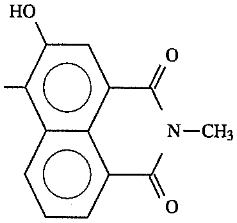 |
| 116 | 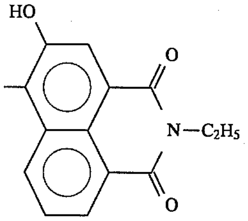 |
| 117 | 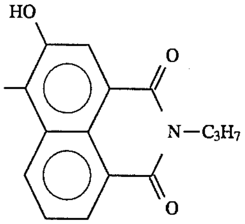 |
| 118 | 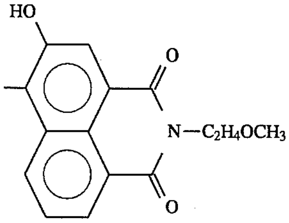 |

TABLE 1-continued
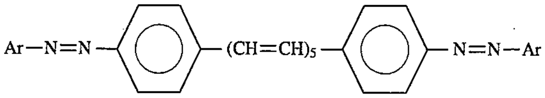
| No. | Ar |
|---|---|
| 119 | 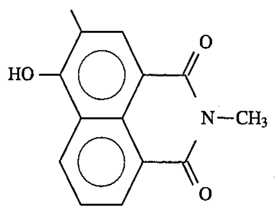 |
| 120 | 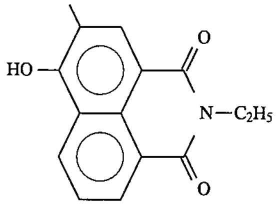 |
| 121 | 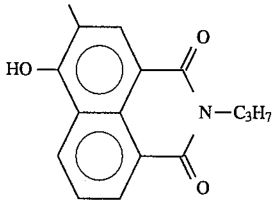 |
| 122 | 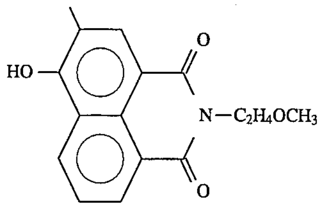 |
| 123 | 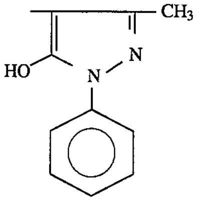 |
| 124 | 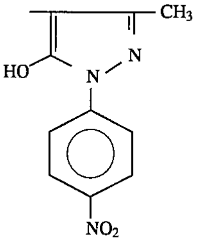 |
TABLE 1-continued
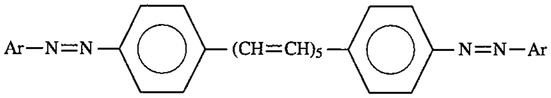
| No. | Ar |
|---|---|
| 125 | 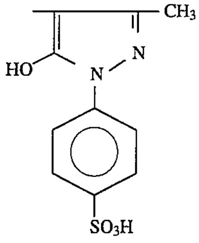 |
| 126 | 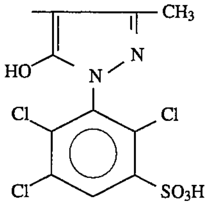 |
| 127 | 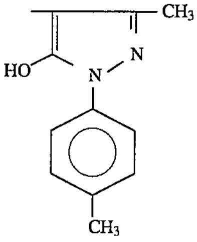 |
| 128 | 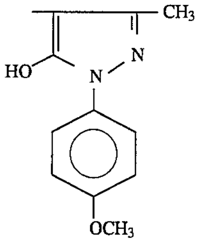 |
| 129 | 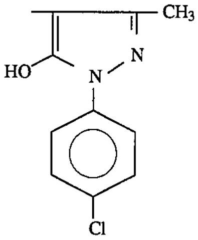 |
| 130 | 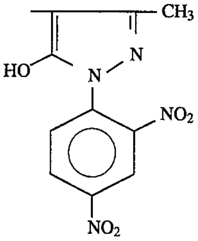 |

TABLE 1-continued
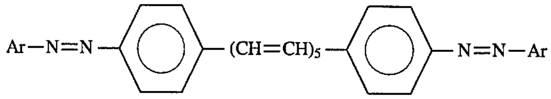
| No. | Ar |
|---|---|
| 131 | 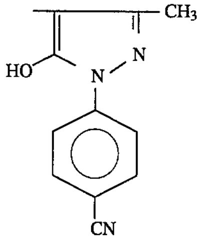 |
| 132 | 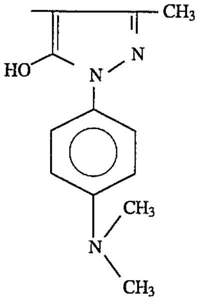 |
| 133 | 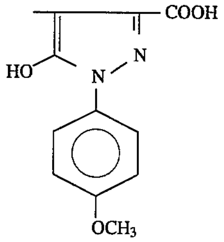 |
| 134 | 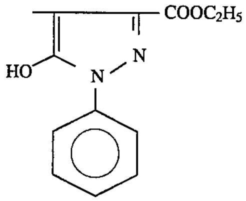 |
| 135 | 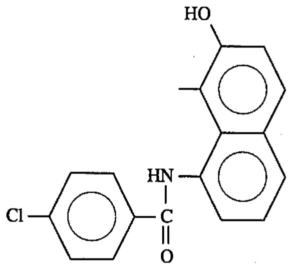 |
TABLE 1-continued
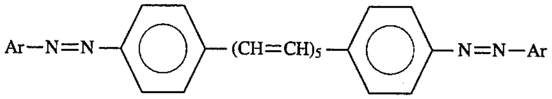
| No. | Ar |
|---|---|
| 136 | 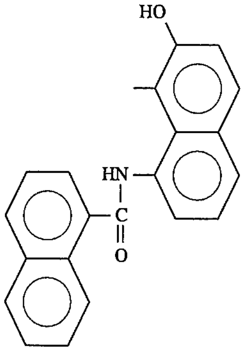 |
| 137 | 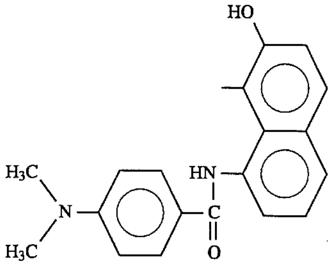 |
| 138 | 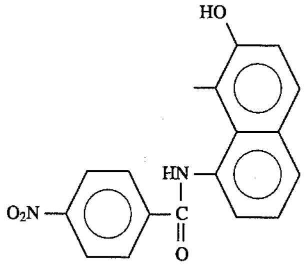 |
| 139 | 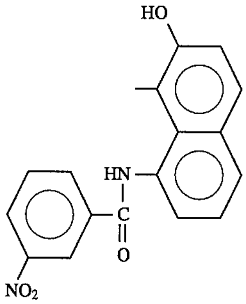 |
| 140 | 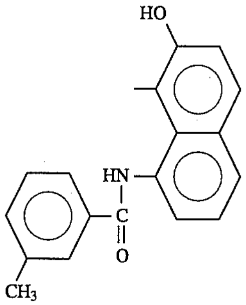 |

TABLE 1-continued
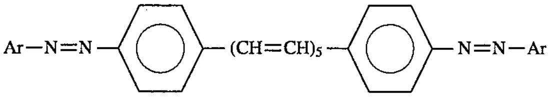
| No. | Ar |
|---|---|
| 141 | 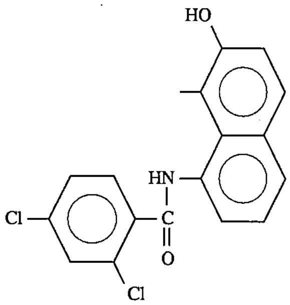 |
| 142 | 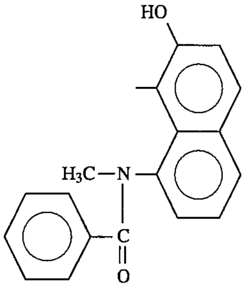 |
| 143 | 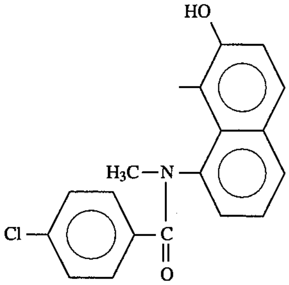 |
| 144 | 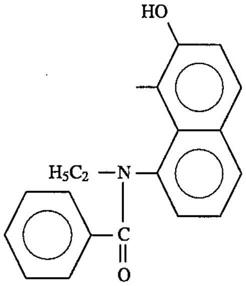 |
TABLE 1-continued
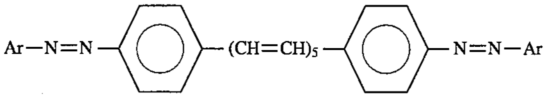
| No. | Ar |
|---|---|
| 145 | 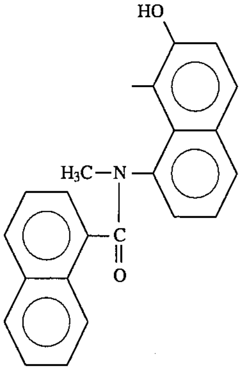 |
| 146 | 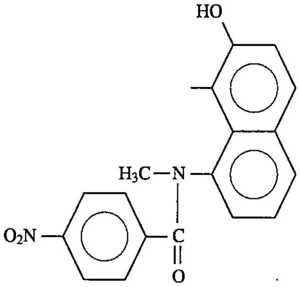 |
| 147 | 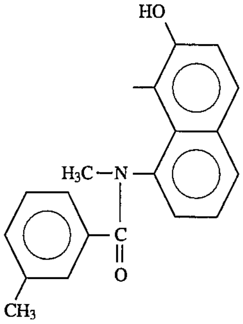 |
| 148 | 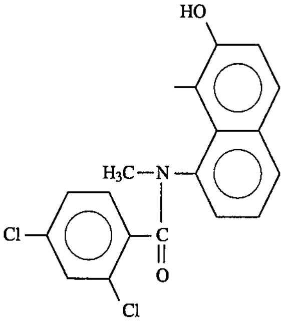 |

TABLE 1-continued
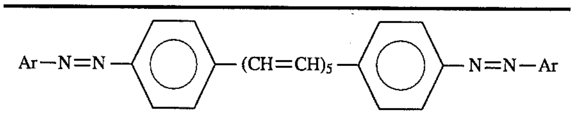
| No. | Ar |
| --- | --- |
| 149 | 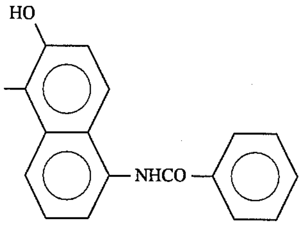 |
| 150 | 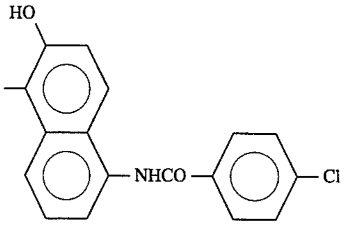 |
| 151 | 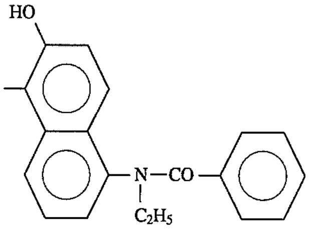 |
| 152 | 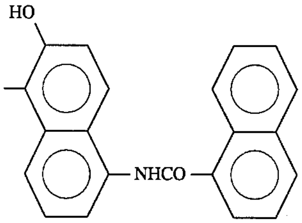 |
| 153 | 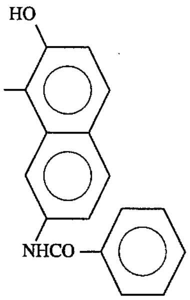 |
| 154 | 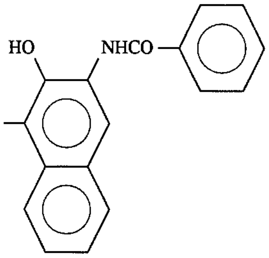 |
TABLE 1-continued
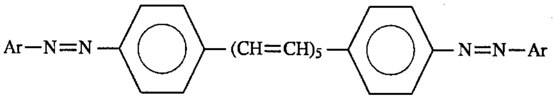
| No. | Ar |
| --- | --- |
| 155 | 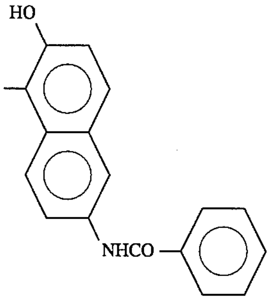 |
| 156 | 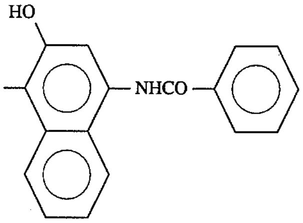 |
| 157 | 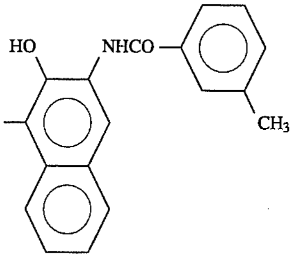 |
| 158 | 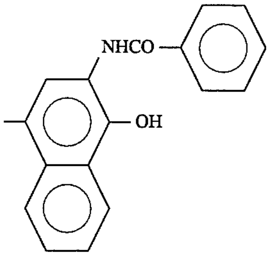 |
| 159 | 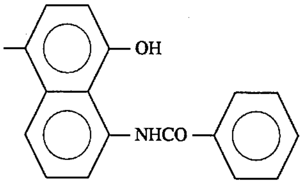 |
| 160 | 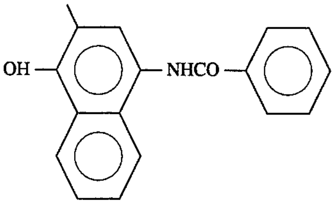 |

TABLE 1-continued
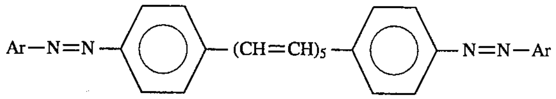
| No. | Ar |
|---|---|
| 161 | 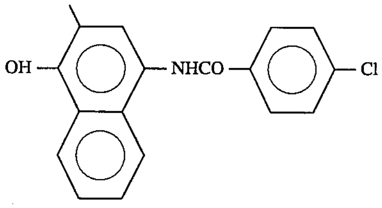 |
| 162 | 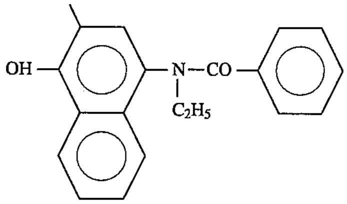 |
| 163 | 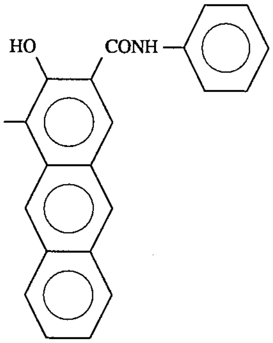 |
| 164 | 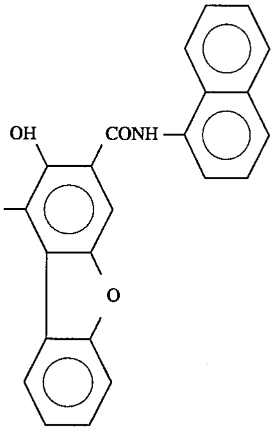 |
| 165 | 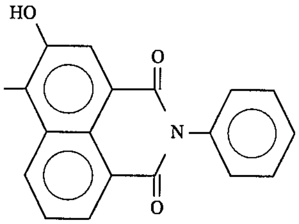 |
TABLE 1-continued
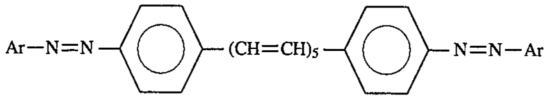
| No. | Ar |
|---|---|
| 166 | 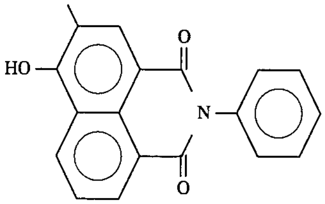 |
| 167 | 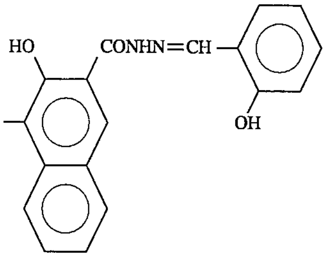 |
| 168 | 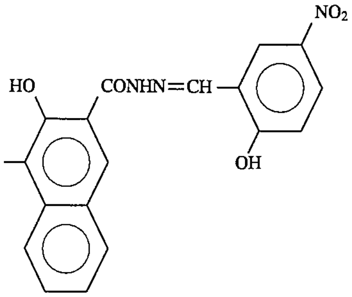 |
| 169 | 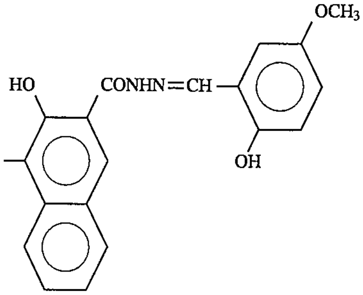 |
| 170 | 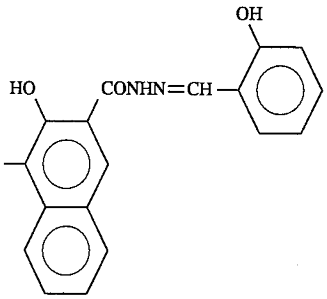 |

TABLE 1-continued
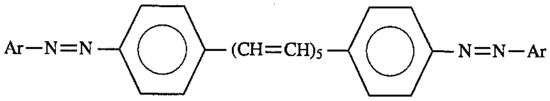
| No. | Ar |
|---|---|
| 171 | 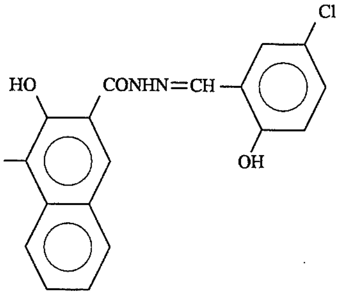 |
| 172 | 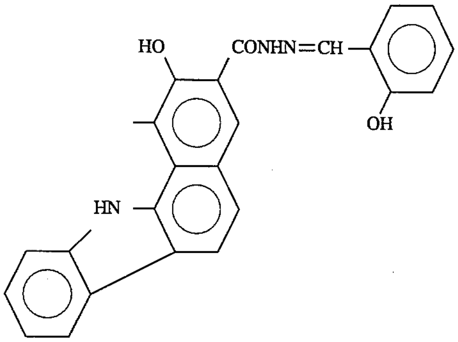 |
| 173 | 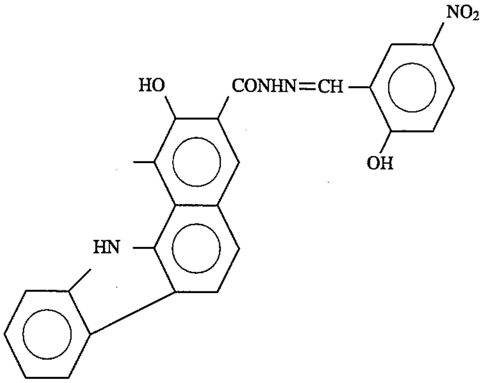 |
| 174 | 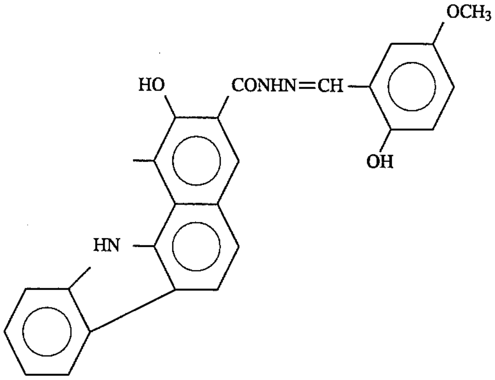 |
TABLE 1-continued
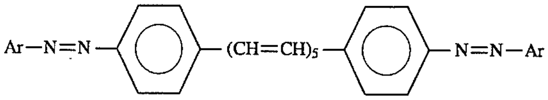
| No. | Ar |
|---|---|
| 175 | 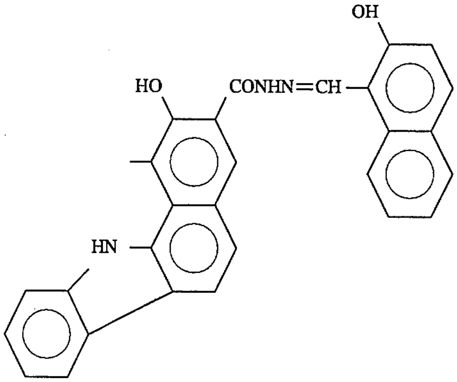 |
| 176 | 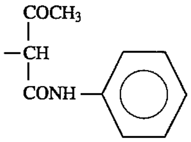 |
| 177 | 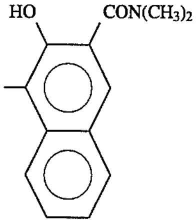 |
| 178 | 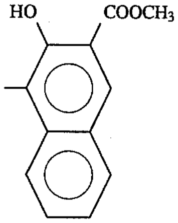 |
| 179 | 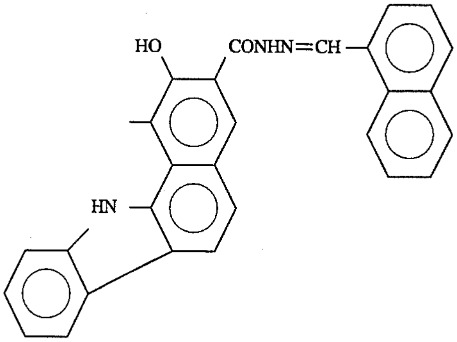 |

TABLE 1-continued
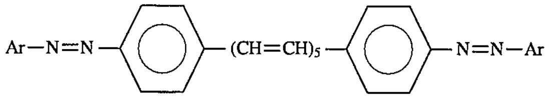
| No. | Ar |
|---|---|
| 180 | 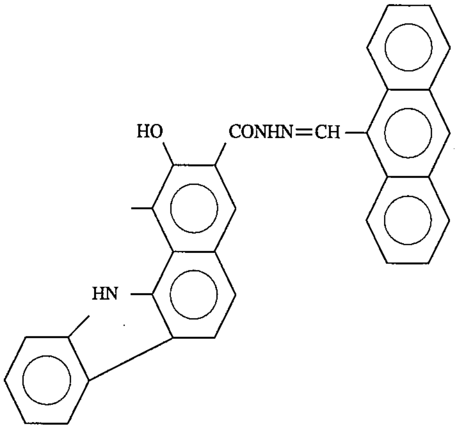 |
| 181 | 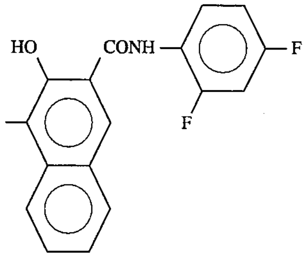 |
| 182 | 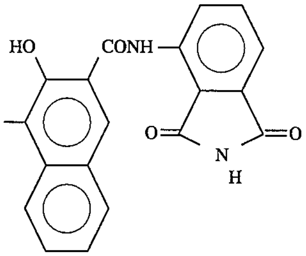 |
| 183 | 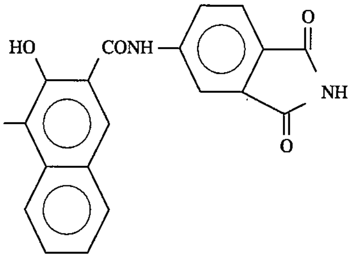 |
| 184 | 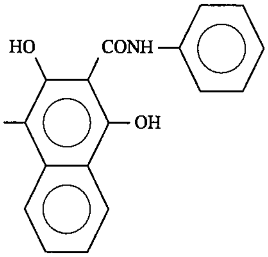 |
TABLE 1-continued
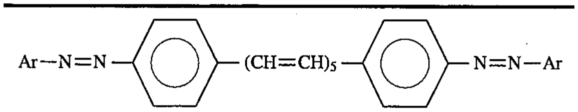
| No. | Ar |
|---|---|
| 185 | 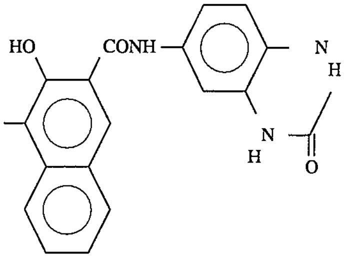 |
| 186 | 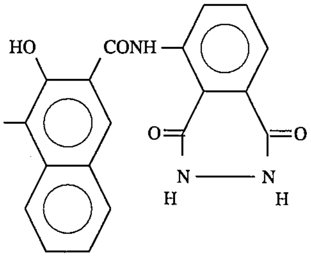 |
| 187 | 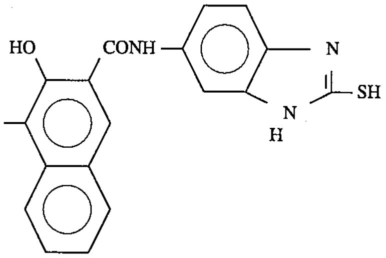 |
| 188 | 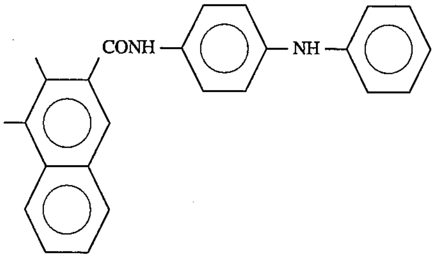 |
| 189 | 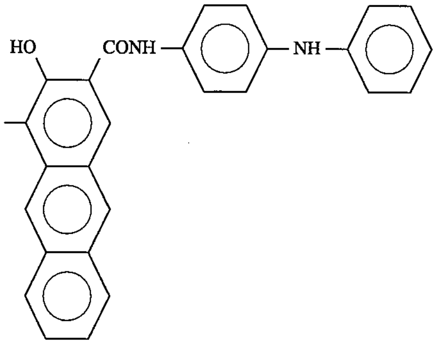 |

TABLE 1-continued
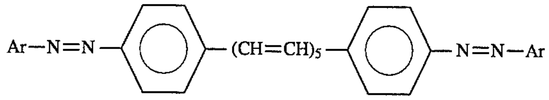
| No. | Ar |
|---|---|
| 190 | 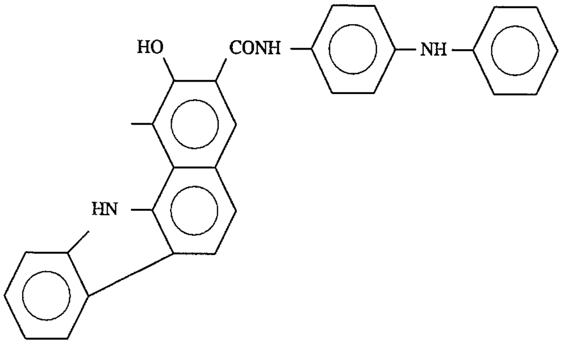 |
| 191 | 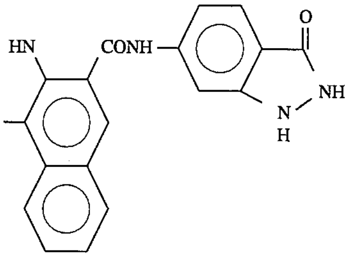 |
| 192 | 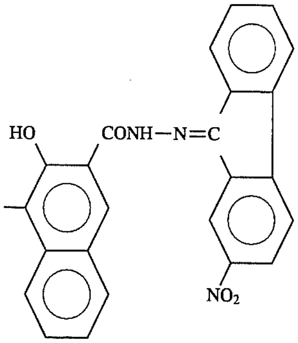 |
| 193 | 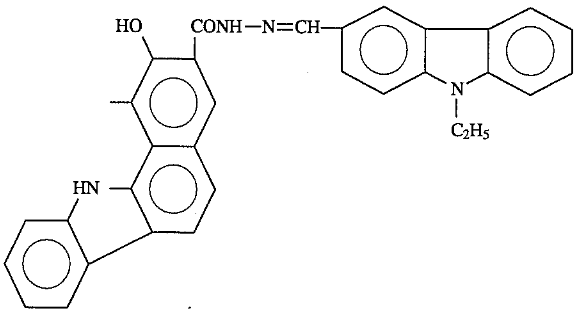 |
TABLE 1-continued
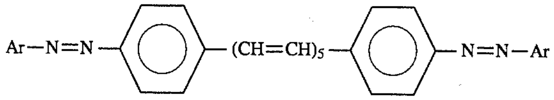
| No. | Ar |
|---|---|
| 194 | 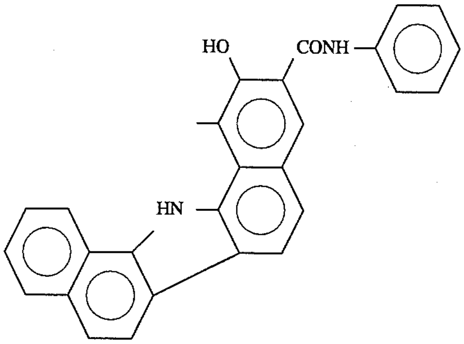 |
| 195 | 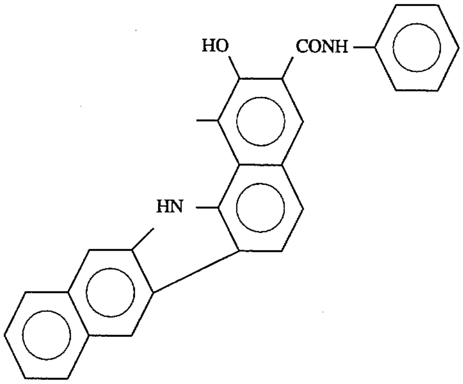 |
| 196 | 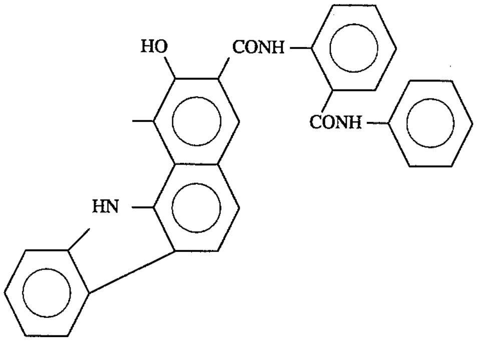 |
| 197 | 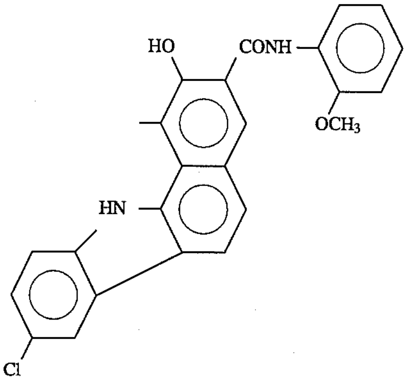 |

TABLE 1-continued
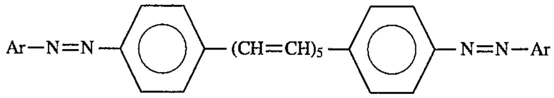
| No. | Ar |
|---|---|
| 198 | 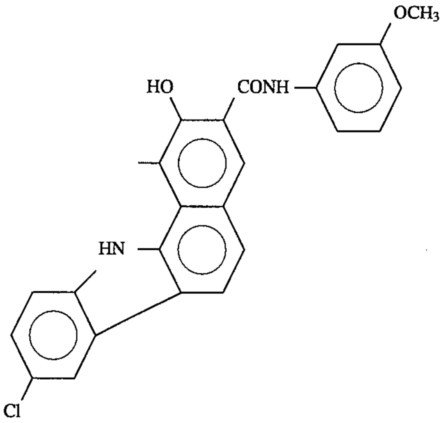 |
| 199 | 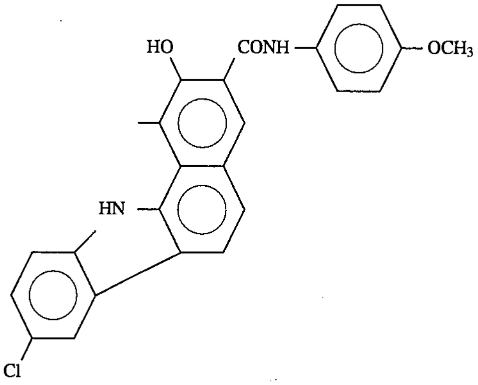 |
| 200 | 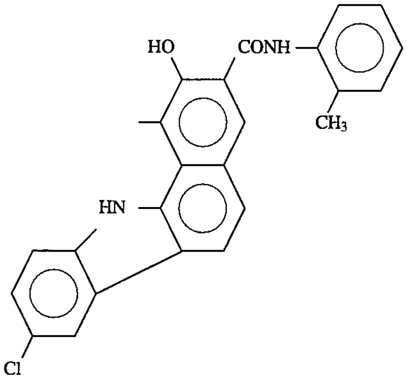 |
TABLE 1-continued
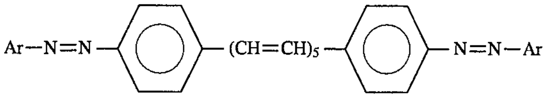
| No. | Ar |
|---|---|
| 201 | 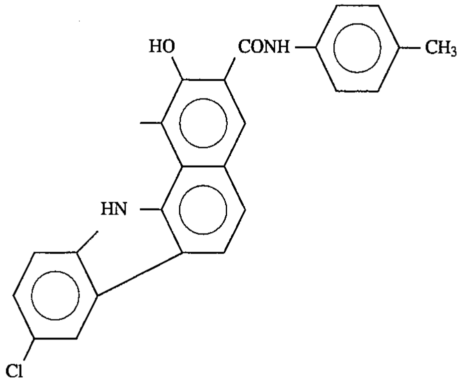 |
| 202 | 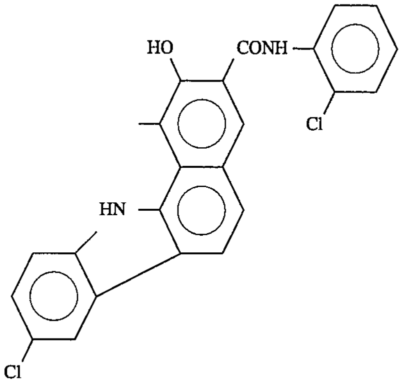 |
| 203 | 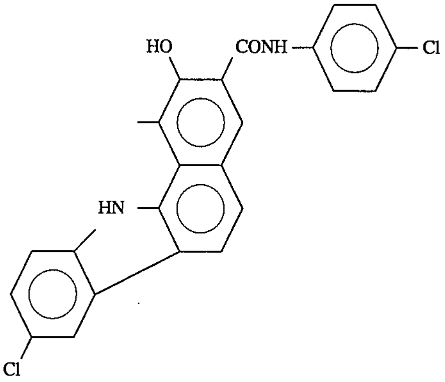 |

TABLE 1-continued
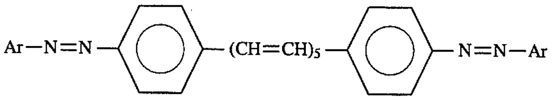
| No. | Ar |
|---|---|
| 204 | 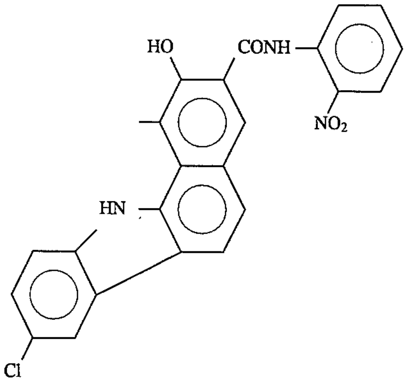 |
| 205 | 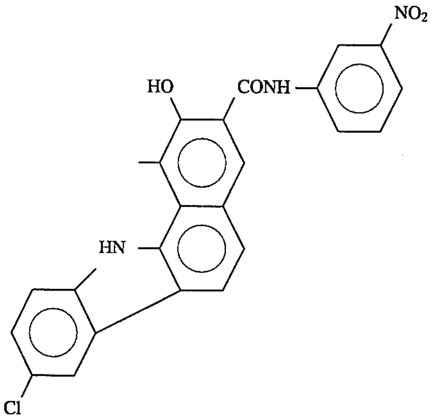 |
| 206 | 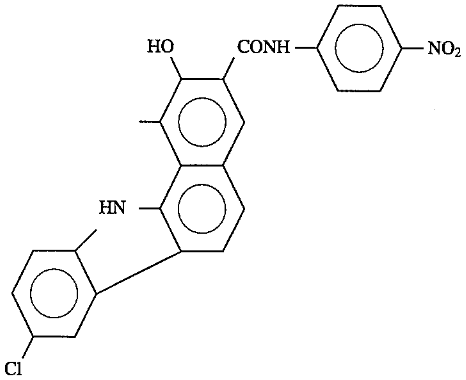 |
TABLE 1-continued
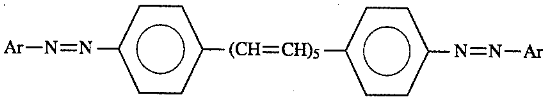
| No. | Ar |
|---|---|
| 207 | 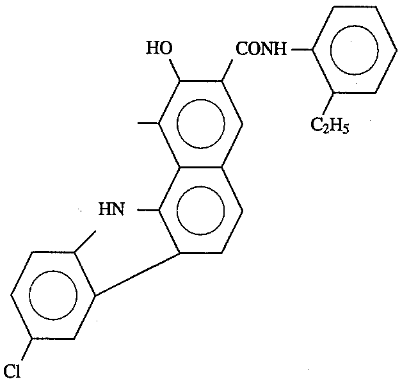 |
| 208 | 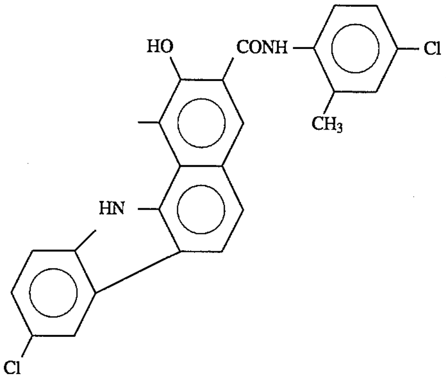 |
| 209 | 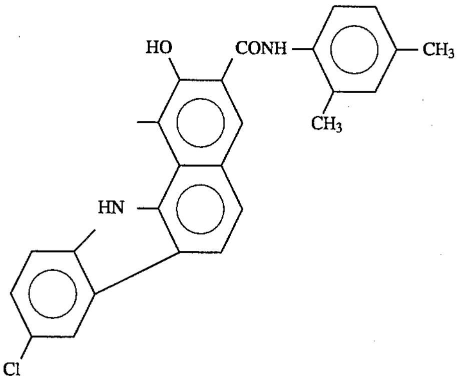 |

TABLE 1-continued

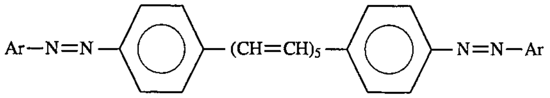

| No. | Ar |
|---|---|
| 210 | 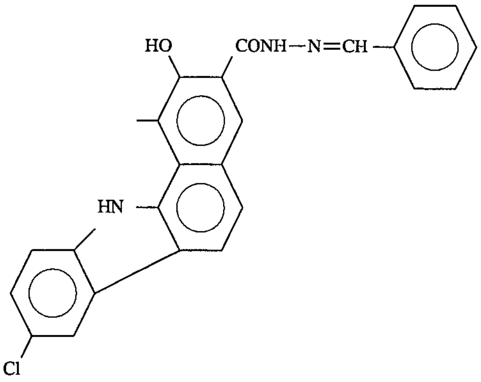 |
| 211 | 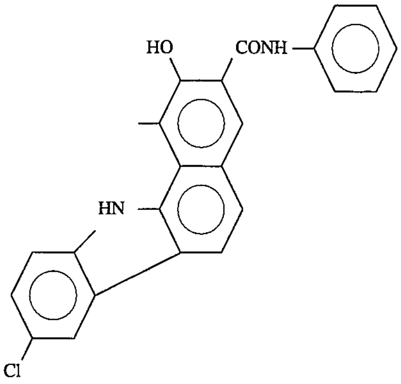 |
| 212 | 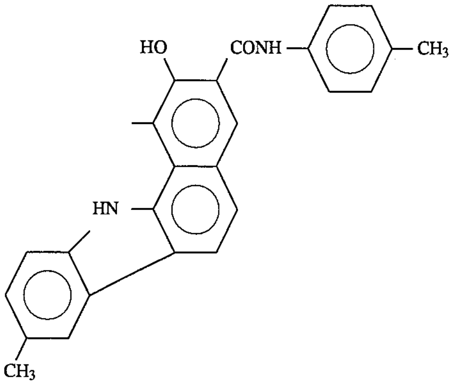 |

TABLE 1-continued

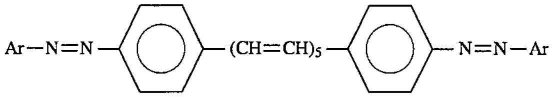

| No. | Ar |
|---|---|
| 213 | 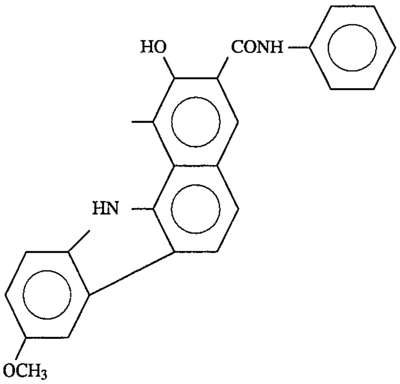 |
| 214 | 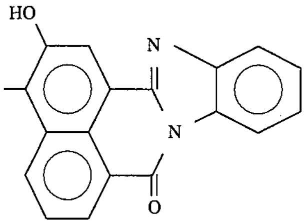 |

The bisazo pigment of the above-mentioned formula for use in the present invention can be obtained by a coupling reaction of a bis(diazonium)salt of general formula (II-1) with a coupler of the general formula (II-2).

(II-1)

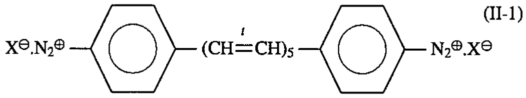

wherein X represents an anionic functional group.

Ar—H (II-2)

wherein Ar is the same as previously defined in the general formula (II).

Specific examples of the anionic functional group represented by X in the formula (XV) include $Cl^{\ominus}$, $Br^{\ominus}$, $I^{\ominus}$, $BF_4^{\ominus}$, $PF_6^{\ominus}$, $B(C_6H_5)_4^{\ominus}$, $ClO_4^{\ominus}$, $SO_4^{2\ominus}$,

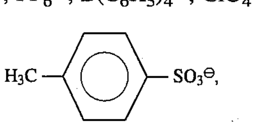

$AsF_6^{\ominus}$ and $SbF_6^{\ominus}$. Among the above anionic functional groups $BF_4^{\ominus}$ is preferable for the preparation of the bisazo pigments.

The bisazo pigment of the formula (II) is prepared as follows:

The bis(diazonium)salt of the formula (II-1), used as a starting material for the preparation of the bisazo pigment, can be obtained by diazotization of 1,10-bis(4-aminophenyl)-1,3,5,7,9-decapentaene (hereinafater referred to as the diamino compound) which is obtained by reduction of 1,10-bis(4-nitrophenyl)-1,3,5,7,9-decapentaene (hereinafter referred to as the dinitro compound). The dinitro compound and the diamino compound are both novel materials.

To prepare the dinitro compound necessary for the synthesis of the bisazo pigment for use in the present invention, Witting reaction is initiated, for example, by subjecting 1,4-bis(triphenylphosphonium bromide)-2-butene and 4-nitrocinnamaldehyde to condensation in the presence of a basic catalyst. The dinitro compound produced by the Witting reaction has a moiety of 3-monocis form or 3,7-dicis form, but can be converted into a trans form as a whole in such a manner that the crude or purified product of this dinitro compound is heated together with a small amount of iodine which serves as a catalyst for the reaction in an aromatic hydrocarbon solvent such as toluene and xylene. Preparation of 1,10-bis(4-nitrophenyl)-1,3,5,7,9-decapentaene is described in detail in a Japanese Patent Application filed on Apr. 20, 1988 by the same inventors as those of the present invention, entitled "1,10-bis(4-nitrophenyl)-1,3,5,7,9-decapentaene and manufacturing method thereof".

The thus obtained dinitro compound is reduced by heating it to 70° to 120° C. using a reducing agent such as iron-hydrochloric acid and stannous chloride-hydrochloric acid, so that the diamino Compound is prepared. This reduction is completed in 0.5 to 3 hours. It is preferable that such reduction be carried out in an organic solvent such as N,N-dimethylformamide when iron-hydrochloric acid is employed as the reducing agent. The preparation of 1,10-bis(4-aminophenyl)-1,3,5,7,9-decapentaene is described in detail in a Japanese Patent Application filed on Apr. 20, 1988 by the same inventors as those of the present invention, entitled "1,10-bis(4-aminophenyl)-1,3,5,7,9-decapentaene and manufacturing method thereof".

In the next step, diazotization of the above-prepared diamino compound is performed by dispersing the diamino compound in an inorganic acid such as hydrochloric acid or sulphuric acid and adding sodium nitrite to this dispersion, with the temperature maintained at −10° to 20° C. This disazotization is completed in about 0.5 to 3 hours.

Through the above-mentioned series of the reaction, the bis(diazonium)salt of the general formula (II-1) can be obtained. Alternatively, by adding an aqueous solution of borofluoric acid or sodium borofluoride to the above disazotization reaction mixture, the bis(diazonium)salt can also be obtained. Preparation of bis(diazonium)salt is described in detail in a Japanese Patent Application filed on Apr. 20, 1988 by the same inventors as those of the present invention, entitled "Bis(diazonium) salt and manufacturing method thereof".

In order to obtain the bisazo pigment for use in the present invention, the above-prepared bis(diazonium)salt is isolated from the reaction mixture and dissolved together with the coupler of the general formula (XVI) in an organic solvent such as N,N-dimethylformamide and dimethyl sulfoxide. To this solution, an alkaline aqueous solution such as an aqueous solution of sodium acetate is added dropwise, with the temperature maintained at about −10° to 40° C., to initiate the coupling reaction. This coupling reaction is completed in about 5 minutes to 3 hours. After the completion of the coupling reaction, the resulting crystals are separated from the reaction solution by filtration, and washed with water and/or an organic solvent, or recrystallized to purify the obtained bisazo compound. Alternatively, the bisazo compound can be obtained by allowing the above-prepared diazotization reaction solution to react with the coupler.

The present invention will now be explained by referring to the following synthesis examples of the bisazo pigment.

Synthesis Example 1

[Preparation of 1,10-bis(4-nitrophenyl)-1,3,5,7,9-decapentaene]

In a stream of a nitrogen gas, 259 g of 1,4-bis(triphenylphosphonium bromide)-2-butene was dissolved in 3 l of dry methanol. To this solution, 130.5 g of 4-nitrocinnamaldehyde was added, and this mixture was stirred for 30 minutes at room temperature. After the addition of 4-nitrocinnamaldehyde, 32.0 g of lithium methoxide was further added to the above mixture for 4 hours at 23° C. to 27° C. on a water bath. After stirred for 10 hours at room temperature, the thus prepared reaction mixture was diluted with 1 l of water, washed with water and then with methanol, and dried, so that 120.9 g of a crude product in the form of dark red powder was obtained.

The thus obtained crude product was added to 2.5 l of toluene together with 2.42 g of iodine, and the mixture was stirred for 20 hours under application of heat, with the temperature of the reaction mixture maintained at 86° C. to 90° C. This reaction mixture was cooled to room temperature, washed with toluene, and dried, whereby 113.6 g of a powdery dark red product was obtained in an 86.5% yield.

Finally, the crude product was recrystallized from dimethylformamide, whereby highly purified 1,10-bis(4-nitrophenyl)-1,3,5,7,9-decapentaene was obtained in the form of dark red needles. The melting point of the product was 241.5° to 242.5° C.

The results of the elemental analysis of the thus obtained product were as follows:

| | % C | % H | % N |
|---|---|---|---|
| Calculated | 70.57 | 4.86 | 7.48 |
| Found | 70.75 | 4.80 | 7.24 |

The above calculation was based on the formula for 1,10-bis(4-nitrophenyl)-1,3,5,7,9-decapentaene of $C_{22}H_{18}N_2O_4$.

FIG. 1 shows an infrared spectrum of 1,10-bis(4-nitrophenyl)-1,3,5,7,9-decapentaene, taken by use of a KBr tablet, which indicates an absorption at 1005 $cm^{-1}$ characteristic of deformation vibration of trans-olefine, and absorptions characteristic of NH stretching vibration at 1510 $cm^{-1}$ and 1335 $cm^{-1}$.

Visible absorption spectrum (THF) λmax 448 nm

[Preparation of 1,10-bis(4-aminophenyl)-1,3,5,7,9-decapentaene]

59.2 g of the previously obtained 1,10-bis(4-nitrophenyl)-1,3,5,7,9-decapentaene was added to 1,600 ml of dimethylformamide. With stirring, 118.4 g of iron powder and 54 ml of a 6N solution of hydrochloric acid were then added to the above solution. The mixture was further stirred at 90° C. to 99° C. for 3 hours, and then cooled to 80° C. The mixture was then adjusted to pH 9.0 by using a 50% aqueous solution of sodium hydroxide. Then, insoluble components, together with Celite, were removed from the mixture by filtration. The filtrate was diluted with 600 ml of water and allowed to stand at room temperature. The resulting crystals were filtered off, washed with water, and dried, so that 45.7 g of brown-red crystals in the form of flat plates were obtained in a 92% yield.

The thus obtained crystals were recrystallized from a mixed solvent of dimethylformamide and water, whereby 1,10-bis(4-aminophenyl)-1,3,5,7,9-decapentaene was obtained in the form of dark red plates. The melting point, corresponding to an exothermic peak temperature of the product in a thermal analysis (DSC), was 262° C.

The results of the elemental analysis of the thus obtained product were as follows:

| | % C | % H | % N |
|---|---|---|---|
| Calculated | 84.02 | 7.07 | 8.91 |
| Found | 83.79 | 7.13 | 8.99 |

The above calculation was based on the formula for 1,10-bis(4-aminophenyl)-1,3,5,7,9-decapentaene of $C_{22}H_{22}N_2$.

Figure 2:
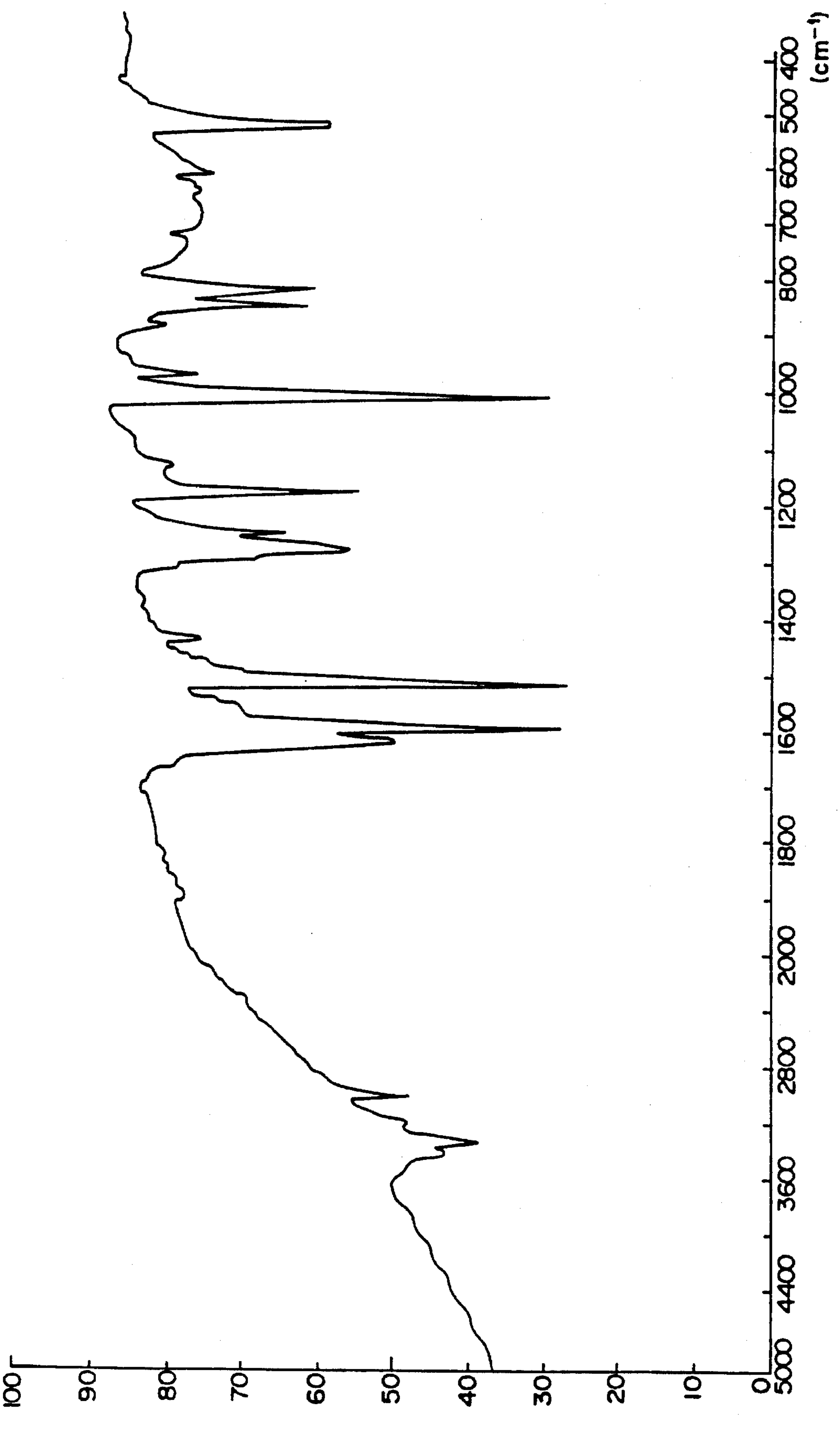

FIG. 2 shows an infrared spectrum of 1,10-bis(4-aminophenyl)-1,3,5,7,9-decapentaene, taken by use of a KBr tablet, which indicates an absorption between 3500 $cm^{-1}$ and 3200 $cm^{-1}$ characteristic of stretching vibration of primary amine, and an absorption characteristic of trans-olefine out-of-plane deformation vibration at 1010 $cm^{-1}$.

[Preparation of Bis(diazonium)salt]

30.0 g of the previously obtained 1,10-bis(4-aminophenyl)-1,3,5,7,9-decapentaene was added to 425 ml of a 15 vol. %-aqueous solution of sulfuric acid, and the mixture was stirred at 50° C. for 90 minutes. After the mixture was rapidly cooled to −5° C., an aqueous solution consisting of 14.46 g of sodium nitrite and 45 ml of water was added dropwise to the above mixture over a period of 90 minutes, with the temperature maintained at −5° C. to −3° C. This reaction mixture was stirred at −5° C. for 30 minutes and the resulting product was separated from the reaction mixture by filtration. This product was dissolved in 10 ml of cold water and a small amount of insoluble components in the above-prepared aqueous solution, was removed together with Celite by filtration. To the thus obtained filtrate, a 42%-aqueous solution of borofluoric acid was added, and then the precipitated crystals were separated from the solution by filtration and dried, so that 42.1 g of a dark red bis(diazonium)salt was obtained in an 86.0% yield. The decomposing point of the product was 120° C.

Figure 3:
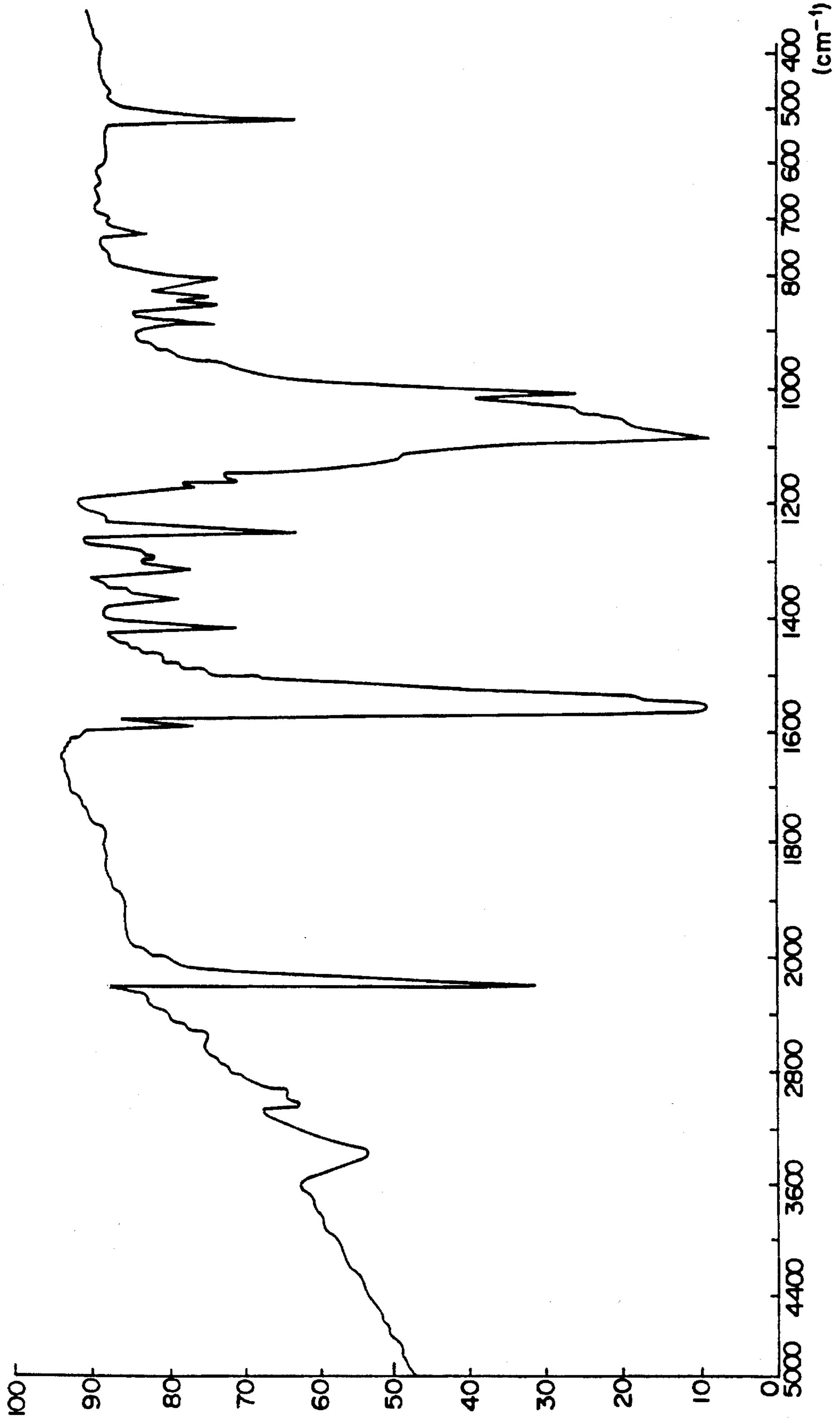

FIG. 3 shows an infrared spectrum of this bis(diazonium) salt, taken by use of a KBr tablet, which indicates an absorption at 2230 $cm^{-1}$ characteristic of stretching vibration of diazonium salt, and an absorption characteristic of trans-olefine out-of-plane deformation vibration at 1010 $cm^{-1}$.

[Preparation of Bisazo Pigment]

0.26 g of the previously obtained bis(diazonium)salt was added to a solution consisting of 50 ml of dimethylformamide and 0.19 g of acetoacetanilide. Further, to this mixture, 2 ml of 8.6%-aqueous solution of sodium acetate was added dropwise at room temperature. After the dropwise addition of the aqueous solution of sodium acetate, the mixture was stirred for 3 hours at room temperature and diluted with 40 ml of water. The resulting precipitate was separated from the solution by filtration, washed with water and dried, so that 0.30 g of a powdery dark red product was obtained in an 87% yield. This product was recrystallized from dimethylformamide, whereby a dark red bisazo pigment No. 176 of the following formula listed in Table 1 was obtained in the form of needles.

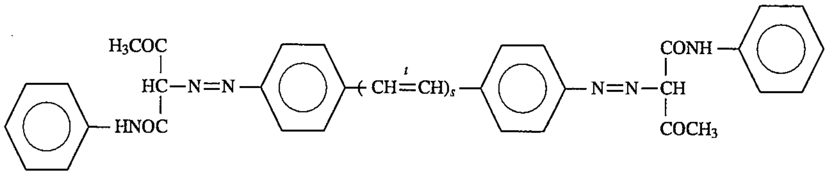

Exothermic peak temperature (DSC): 252° C.

The results of the elemental analysis of the thus obtained product were as follows:

| | % C | % H | % N |
|---|---|---|---|
| Calculated | 73.01 | 5.56 | 12.17 |
| Found | 72.80 | 5.38 | 12.02 |

The above calculation was based on the formula for the bisazo pigment of $C_{42}H_{38}N_6O_4$.

Figure 4:
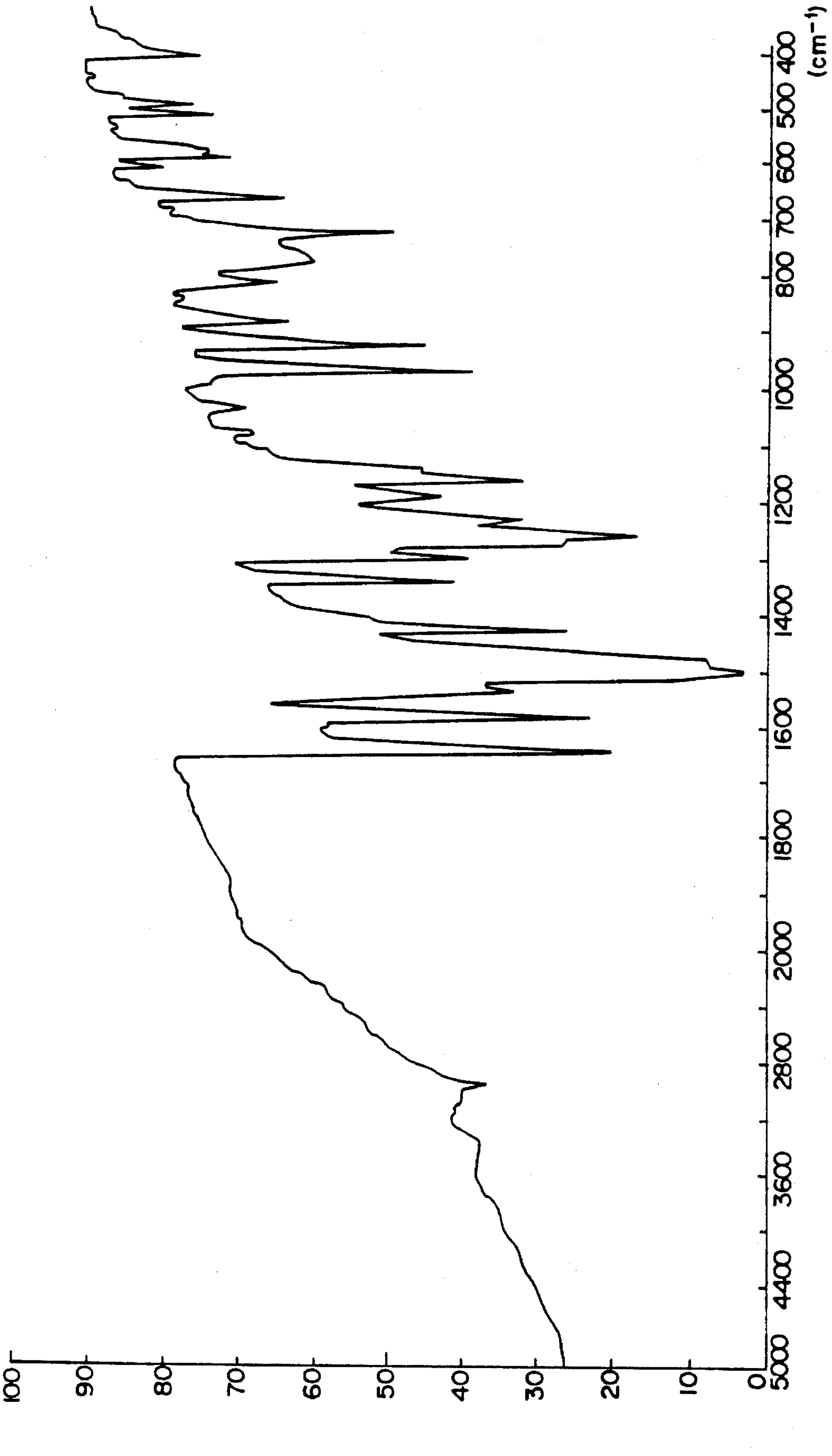

FIG. 4 shows an infrared spectrum of the bisazo pigment No. 176, taken by use Of a KBr tablet, which indicates an absorption characteristic of trans-olefine out-of-plane deformation vibration at 1000 $cm^{-1}$.

Synthesis Example 2

0.51 g of the same bis(diazonium)salt as that employed in Synthesis Example 1 was added to a solution consisting of 100 ml of dimethylformamide and 0.48 g of N-methyl-3-hydroxynaphthalimide. Further, to this mixture, 4 ml of an 8.6%-aqueous solution of sodium acetate was added dropwise at room temperature. After the addition of the aqueous solution of sodium acetate, the mixture was stirred for 3 hours at room temperature. The resulting precipitate was separated from the solution by filtration, washed with 200 ml of dimethylformamide five times and further with water twice, and dried, so that 0.65 g of powdery blue-black bisazo pigment No. 115 of the following formula listed in Table 1 was obtained in an 82% yield.

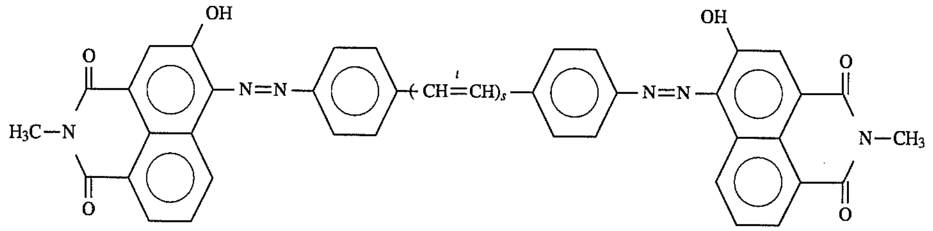

Exothermic peak temperature (DSC): 254° C.

The results of the elemental analysis of the thus obtained product were as follows:

| | % C | % H | % N |
|---|---|---|---|
| Calculated | 72.89 | 4.34 | 10.63 |
| Found | 72.61 | 4.35 | 10.45 |

The above calculation was based on the formula for the bisazo pigment of $C_{48}H_{34}N_6O_6$.

Figure 5:
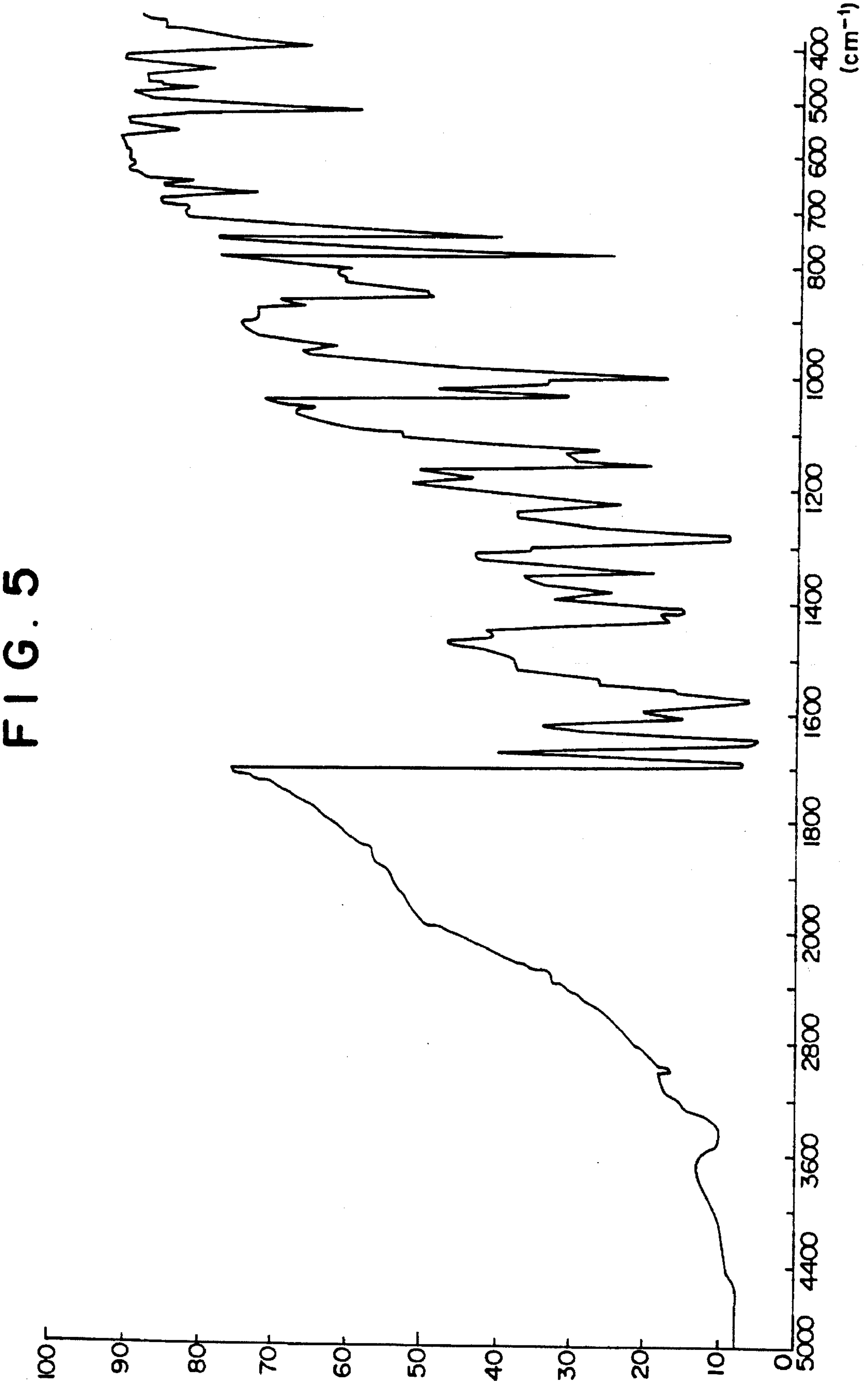

FIG. 5 shows an infrared spectrum of the bisazo pigment No. 115, taken by use of a KBr tablet, indicated an absorption characteristic of trans-olefine out-of-plane deformation vibration at 1005 $cm^{-1}$.

Synthesis Example 3

0.26 g of the same bis(diazonium)salt as that employed in Synthesis Example 1 was added to a solution consisting of 50 ml of dimethyl-formamide and 0.21 g of 3-hydroxy-2-naphthoic acid methyl ester. Further, to this mixture, 2 ml of an 8.6%-aqueous solution of sodium acetate was added dropwise at room temperature. After the dropwise addition of the aqueous solution of sodium acetate, the mixture was stirred for 3 hours at room temperature and diluted with 20 ml of water. The resulting precipitate was separated from the solution by filtration, washed with water and dried, so that 0.37 g of a blue-black product in the form of powder was obtained substantially in a yield of 100%. This product was recrystallized from nitrobenzene, whereby a bluish black bisazo pigment No. 178 of the following formula listed in Table 1 was obtained in the form of needles.

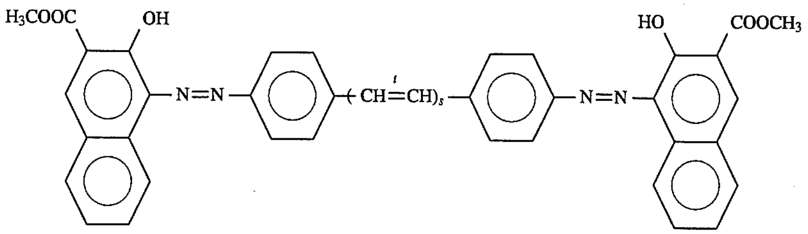

Exothermic peak temperature: 280° C.

The results of the elemental analysis of the thus obtained product were as follows:

| | % C | % H | % N |
|---|---|---|---|
| Calculated | 74.59 | 4.91 | 7.56 |
| Found | 74.40 | 4.73 | 7.38 |

The above calculation was based on the formula for the bisazo pigment of $C_{46}H_{36}N_4O_6$.

Figure 6:
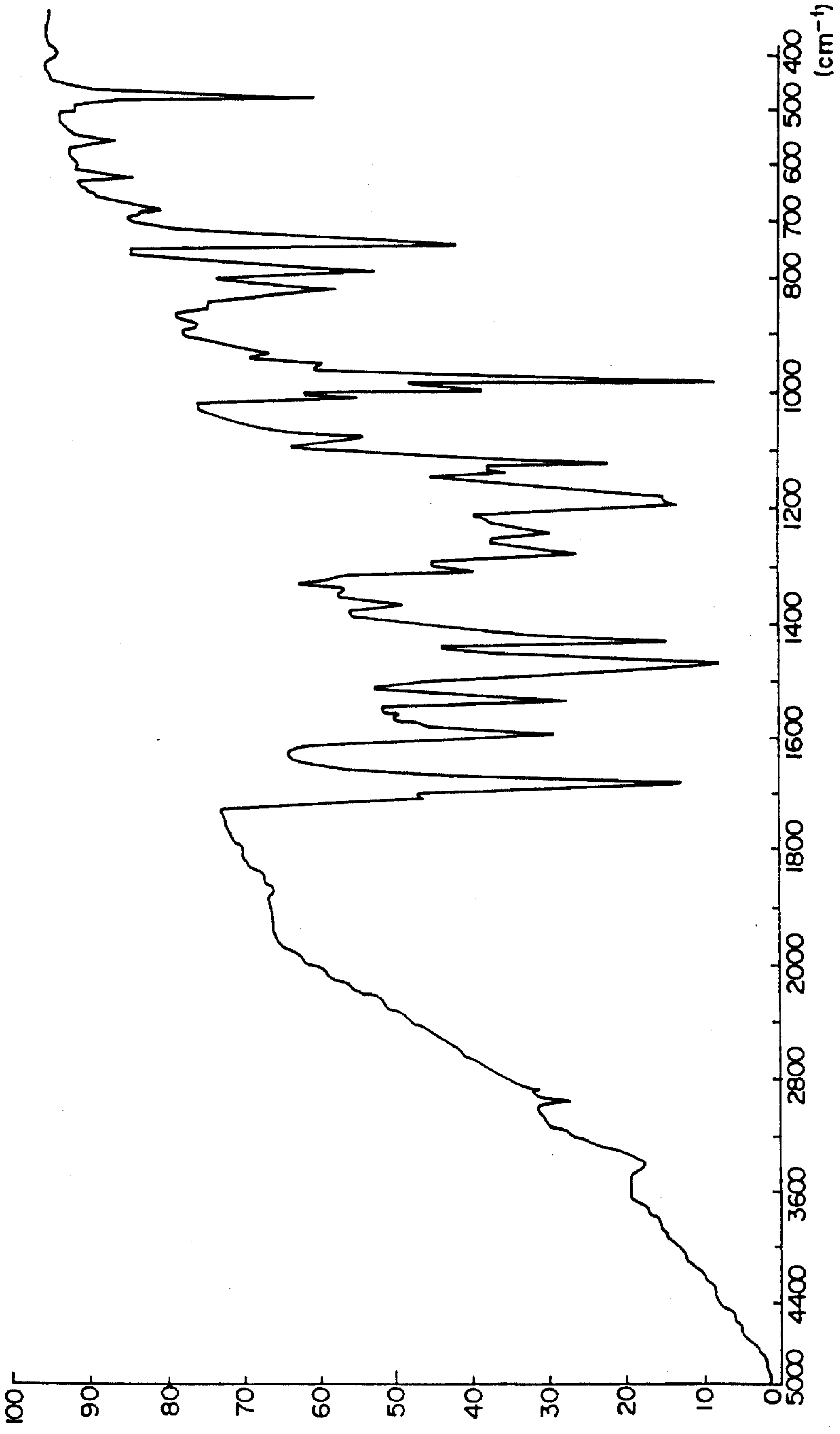

FIG. 6 shows an infrared spectrum of the bisazo pigment No. 178, taken by use of a KBr tablet, which indicates an absorption characteristic of the carbonyl stretching vibration at 1700 $cm^{-1}$ and an absorption characteristic of trans-olefine out-of-plane deformation vibration at 1005 $cm^{-1}$.

Synthesis Example 4

0.26 g of the same bis(diazonium)salt as that employed in Synthesis Example 1 was added to a solution consisting of 50 ml of dimethylformamide and 0.23 g of 3-hydroxy-2-N, N-dimethyl naphthoic acid amide. Further, to this mixture, 2 ml of an 8.6%-aqueous solution of sodium acetate was added dropwise at room temperature. After the dropwise addition of the aqueous solution of sodium acetate, the mixture was stirred for 3 hours at room temperature and diluted with a 50 vol. % aqueous solution of methanol. The resulting precipitate was separated from the solution by filtration, washed with water and dried, so that 0.38 g of a bluish black product in the form of powder was obtained substantially in a yield of 100%. This product was recrystallized from nitrobenzene, whereby a bluish black bisazo pigment No. 177 of the following formula listed in Table 1 was obtained in the form of needles.

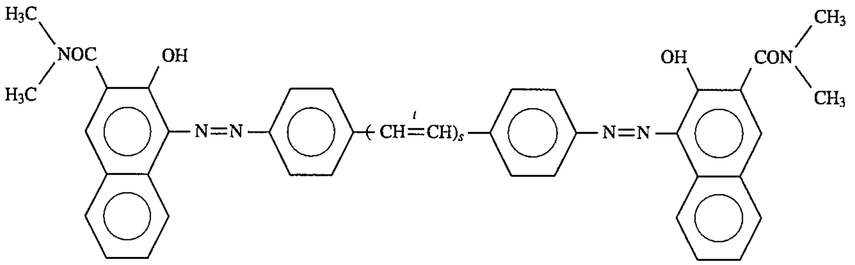

Exothermic peak temperature: 288° C.

The results of the elemental analysis of the thus obtained product were as follows:

| | % C | % H | % N |
|---|---|---|---|
| Calculated | 75.16 | 5.53 | 10.96 |
| Found | 74.72 | 5.27 | 10.69 |

The above calculation was based on the formula for the bisazo pigment of $C_{48}H_{42}N_6O_4$.

Figure 7:
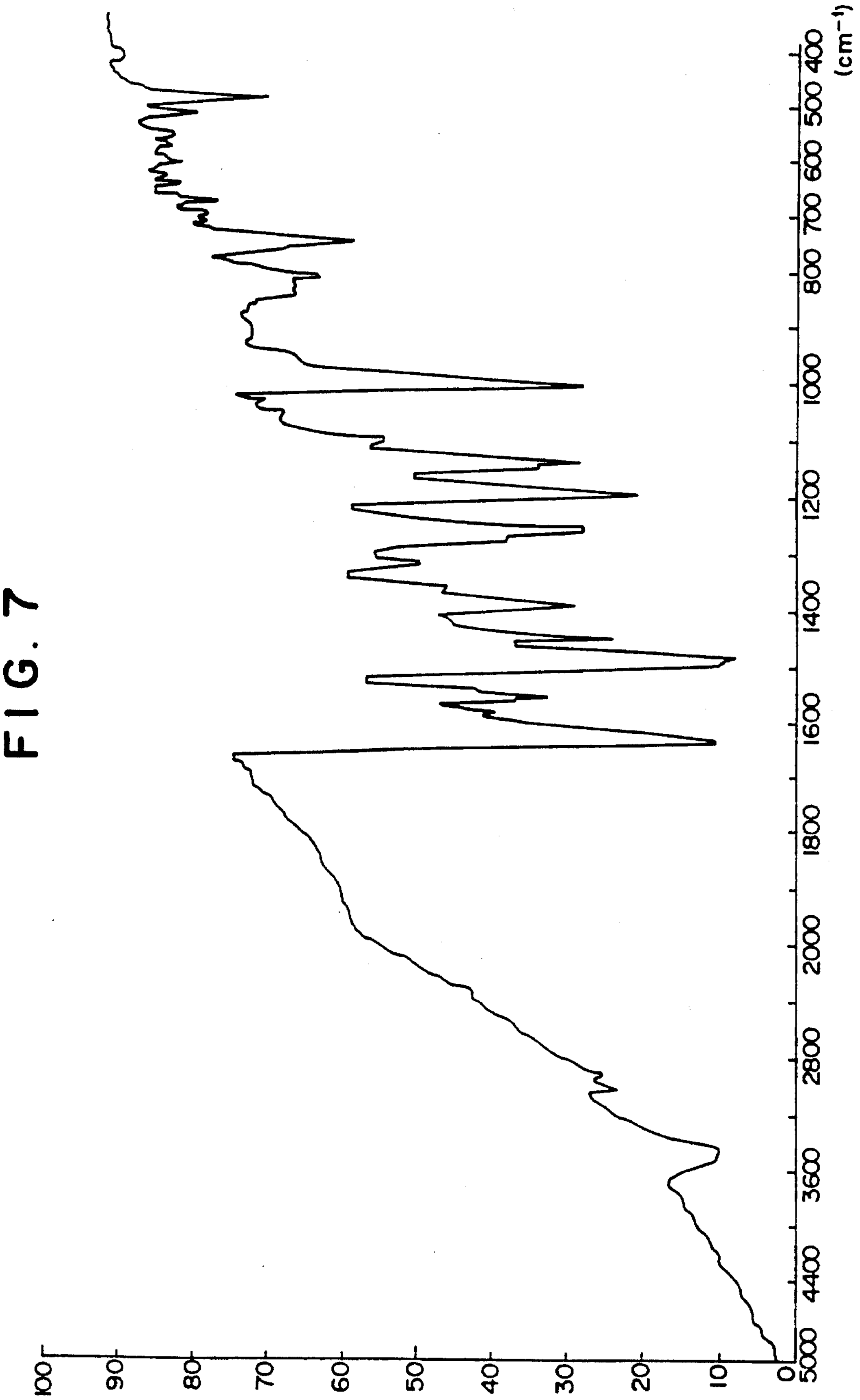

FIG. 7 shows an infrared spectrum of the bisazo pigment No. 177, taken by use of a KBr tablet, which indicates an absorption characteristic of the carbonyl stretching vibration at 1640 $cm^{-1}$ and an absorption characteristic of trans-olefine out-of-plane deformation vibration at 1010 $cm^{-1}$.

Synthesis Example 5

0.51 g of the same bis(diazonium)salt as that employed in Synthesis Example 1 was added to a solution consisting of 100 ml of dimethylformamide and 0.55 g of 3-hydroxy-2-naphthoic acid anilide. To this mixture, 4 ml of an 8.6%-aqueous solution of sodium acetate was added dropwise at room temperature. After the addition of the aqueous solution of sodium acetate, the mixture was stirred for 3 hours at room temperature. The resulting precipitate was separated from the solution by filtration, washed with 200 ml of dimethylformamide five times and further with water twice, and dried, so that 0.77 g of a powdery bluish black bisazo pigment No. 1 of the following formula listed in Table 1 was obtained in an 89% yield.

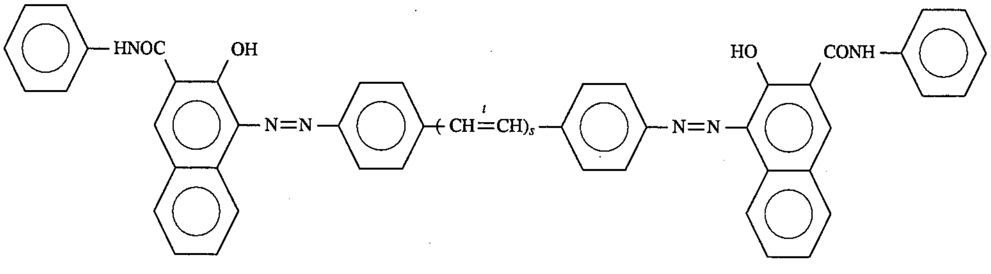

Exothermic peak temperature: 288° C.

The results of the elemental analysis of the thus obtained product were as follows:

| | % C | % H | % N |
|---|---|---|---|
| Calculated | 77.93 | 4.92 | 9.74 |
| Found | 78.00 | 4.97 | 9.65 |

The above calculation was based on the formula for the bisazo pigment of $C_{56}H_{42}N_6O_4$.

Figure 8:
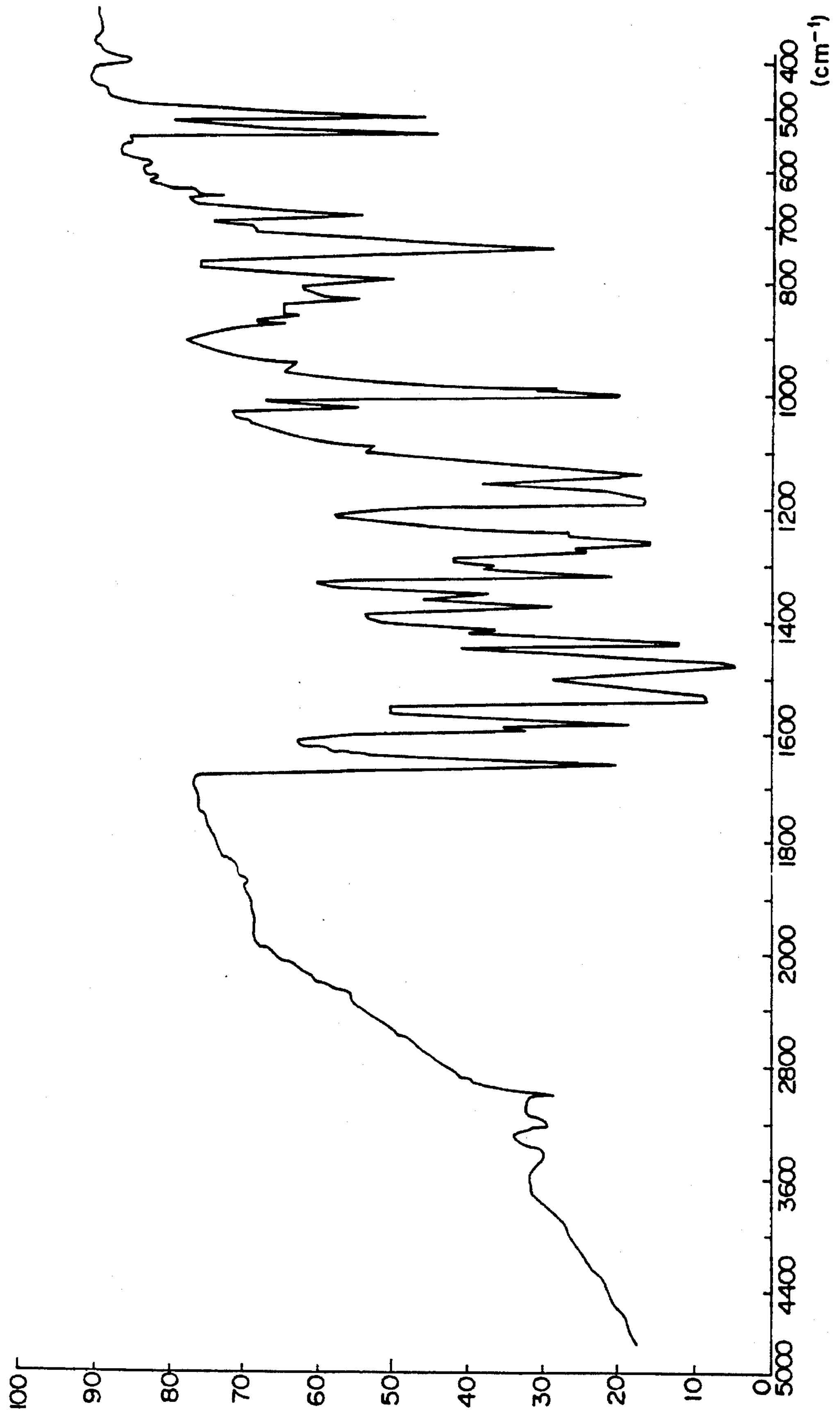

Visible spectrum in a DMF solution of 10 vol. % of ethylene diamine: λmax. 596 nm FIG. 8 shows an infrared spectrum of the bisazo pigment No. 1, taken by use of a KBr tablet, indicated an absorption characteristic of stretching vibration between C and 0 in secondary amido at 1675 $cm^{-1}$ and absorptions characteristic of trans-olefine out-of-plane deformation vibration at 1020 $cm^{-1}$ and 1000 $cm^{-1}$.

Synthesis Example 6

0.51 g of the same bis(diazonium)salt as that employed in Synthesis Example 1 was added to a solution consisting of 100 ml of dimethylformamide and 0.74 g of 2-hydroxy-3-phenylcarbamoyl-11H-benzo[a]carbazole. Further, to this mixture, 4 ml of an 8.6%-aqueous solution of sodium acetate was added dropwise at room temperature. After the addition of the aqueous solution of sodium acetate, the mixture was stirred for 3 hours at room temperature. The resulting precipitate was separated from the solution by filtration, washed with dimethylformamide seven times and with water twice, and dried, so that 0.96 g of a powdery bluish black bisazo pigment No. 58 of the following formula listed in Table 1 was obtained in a 92% yield.

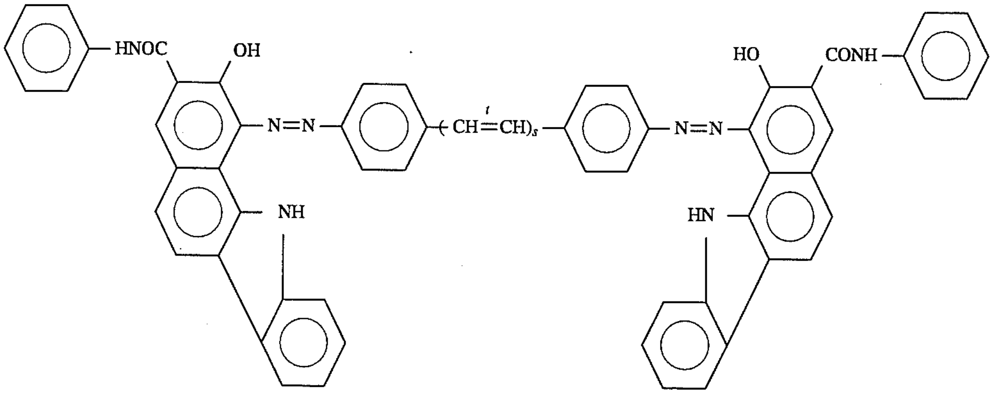

Exothermic peak temperature: 283° C.

The results of the elemental analysis of the thus obtained product were as follows:

| | % C | % H | % N |
|---|---|---|---|
| Calculated | 78.43 | 4.66 | 10.76 |
| Found | 78.66 | 4.62 | 10.49 |

The above calculation was based on the formula for the bisazo pigment of $C_{68}H_{48}N_8O_4$.

Figure 9:
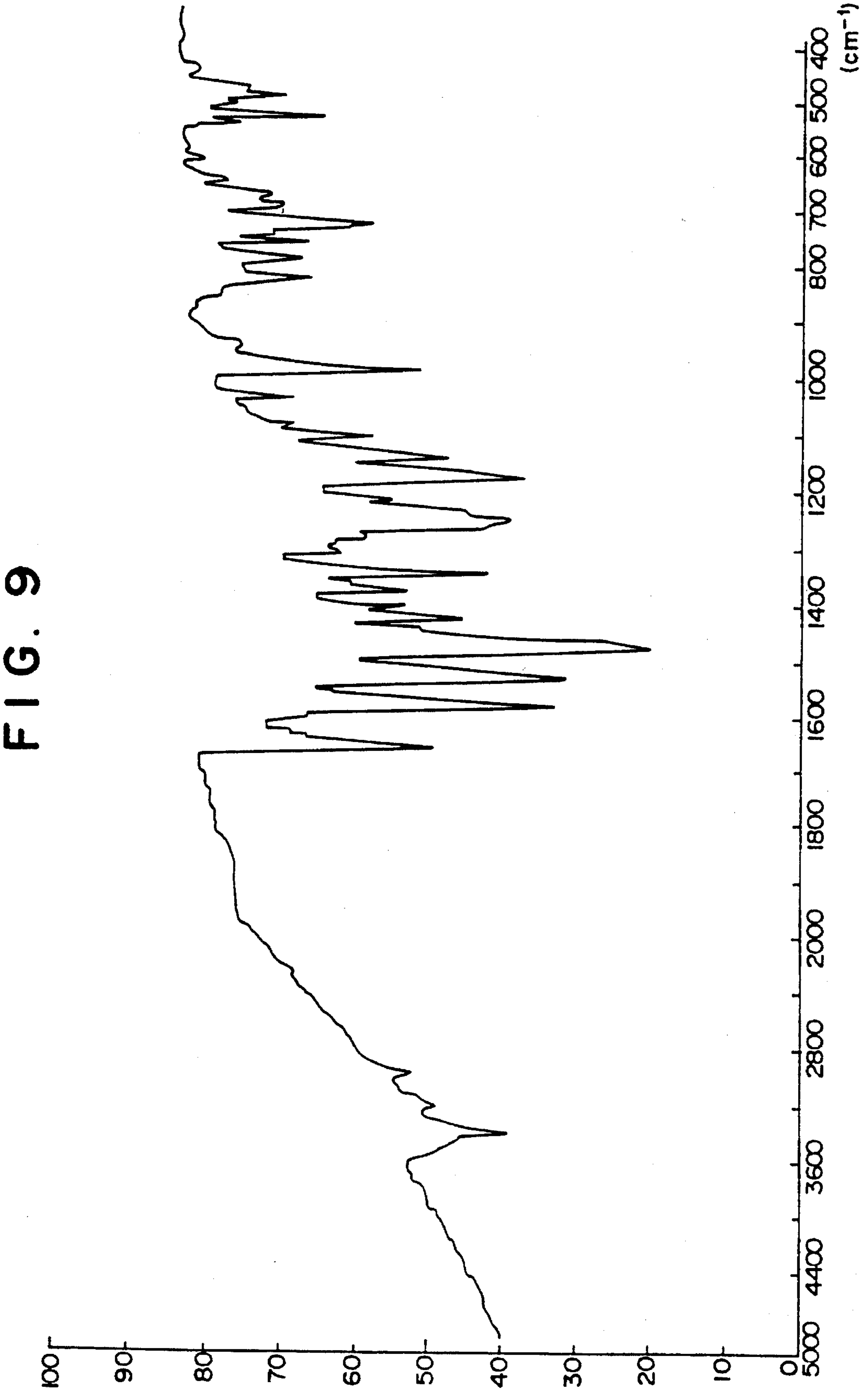

Visible spectrum in a DMF solution of 10 vol. % of ethylene diamine: λmax. 621 nm FIG. 9 shows an infrared spectrum of the bisazo pigment No. 58, taken by use of a KBr tablet, which indicates an absorption characteristic of stretching vibration between C and O in secondary amido at 1670 $cm^{-1}$ and an absorption characteristic of trans-olefine out-of-plane deformation vibration at 1005 $cm^{-1}$.

Synthesis Examples 7 to 32

Synthesis Example 6 was repeated except that the coupler (ArH) employed in Synthesis Example 6 was replaced by the respective couplers shown in the following Table 2, whereby the bisazo pigments were obtained as shown in Table 2.

TABLE 2
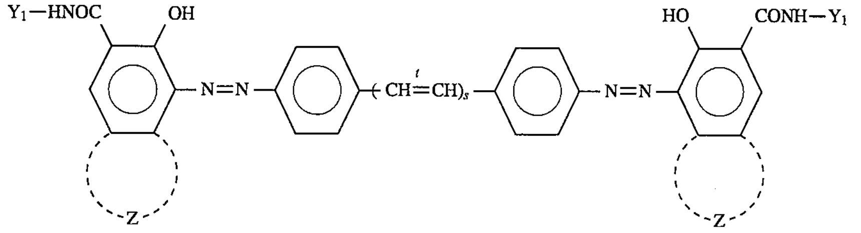
| Synthesis Example | 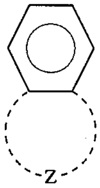 | $Y_1$ | Exothermic Peak Temperature (C.°) | Elemental Analysis Found (Calculated) % C | % H | % N | IR Spectrum (KBr) ($cm^{-1}$) C=O | trans-CH= |
|---|---|---|---|---|---|---|---|---|
| 7 (163) | 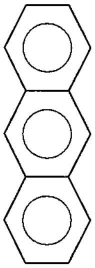 | 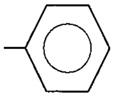 | 269 | 79.75 (79.80) | 4.59 (4.82) | 8.64 (8.73) | 1675 | 1020 |
| 8 (8) | 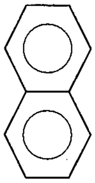 | 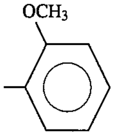 | 271 | 75.20 (75.46) | 5.20 (5.03) | 9.08 (9.11) | 1670 | 1015 1005 |
| 9 (10) | 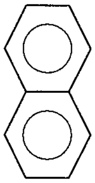 | 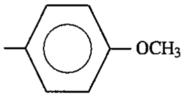 | 278 | 75.53 (75.46) | 4.88 (5.03) | 9.07 (9.11) | 1670 | 1015 1005 |
| 10 (4) | 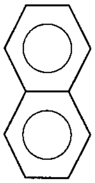 | 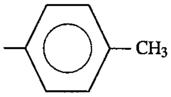 | 227 | 77.69 (78.18) | 5.05 (5.21) | 9.03 (9.43) | 1675 | 1015 1005 |
| 11 (16) | 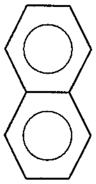 | 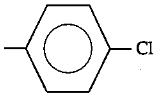 | 276 | 71.79 (72.18) | 4.16 (4.33) | 8.90 (9.02) | 1675 | 1015 1005 |

TABLE 2-continued
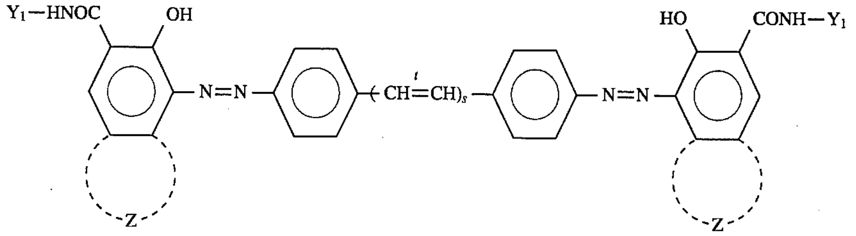
| Synthesis Example | 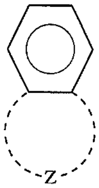 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 12 (34) | 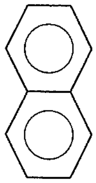 | 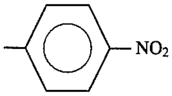 | 301 | 70.26 4.02 11.46<br>(70.58) (4.23) (11.76) | 1685 | 1015<br>1000 |
| 13 (37) | 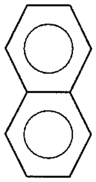 | 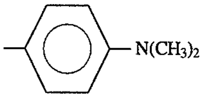 | 252 | 75.53 5.29 11.52<br>(75.93) (5.52) (11.81) | 1665 | 1015<br>1005 |
| 14 (64) | 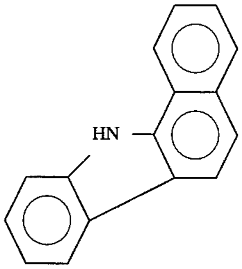 | 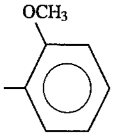 | 293 | 76.03 4.53 9.89<br>(76.34) (4.77) (10.18) | 1670 | 1000 |
| 15 (65) | 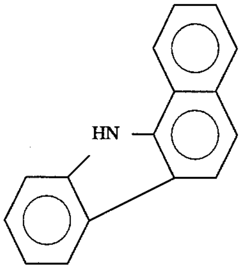 | 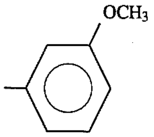 | 286 | 76.30 4.60 9.73<br>(76.34) (4.77) (10.18) | 1670 | 1000 |
| 16 (66) | 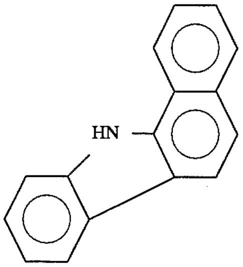 | 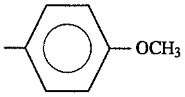 | 299 | 76.19 4.62 9.63<br>(76.34) (4.77) (10.18) | 1670 | 1000 |

TABLE 2-continued
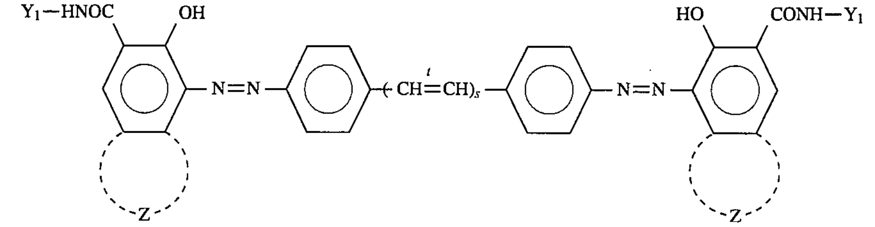
| Synthesis Example | 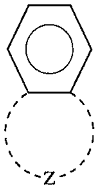 | $Y_1$ | Exothermic Peak Temperature (C.°) | Elemental Analysis Found (Calculated) % C | % H | % N | IR Spectrum (KBr) ($cm^{-1}$) C=O | trans-CH= |
|---|---|---|---|---|---|---|---|---|
| 17 (59) | 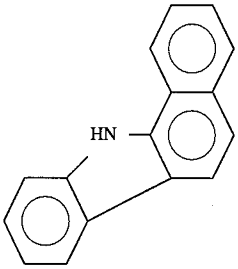 | 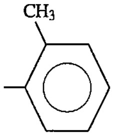 | 287 | 78.28 (78.62) | 4.68 (4.91) | 10.14 (10.48) | 1675 | 1000 |
| 18 (60) | 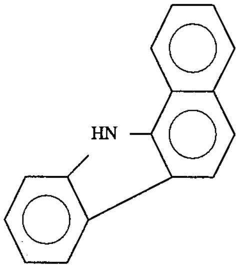 | 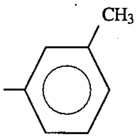 | 275 | 78.25 (78.62) | 4.74 (4.91) | 9.95 (10.48) | 1670 | 1000 |
| 19 (61) | 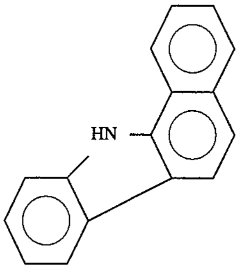 | 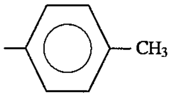 | 289 | 77.94 (78.62) | 4.67 (4.91) | 10.03 (10.48) | 1670 | 1000 |
| 20 (70) | 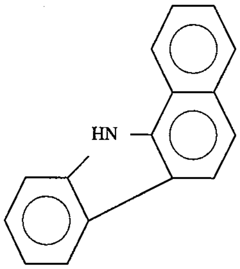 | 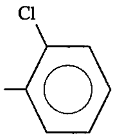 | 295 | 72.93 (73.57) | 4.00 (4.19) | 9.82 (10.10) | 1675 | 1000 |

TABLE 2-continued
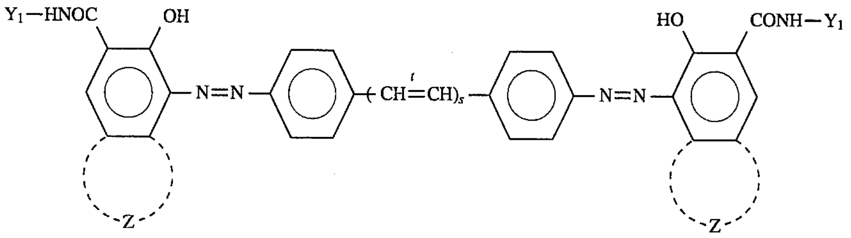
| Synthesis Example | 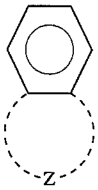 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 21 (71) | 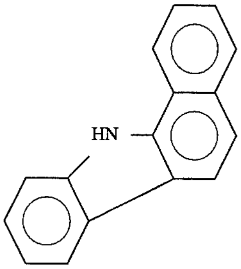 | 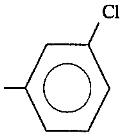 | 283 | 73.21 4.15 9.90 (73.57) (4.19) (10.10) | 1680 | 1000 |
| 22 (72) | 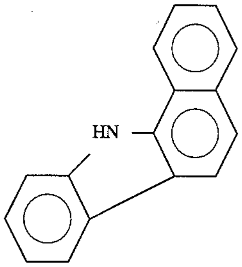 | 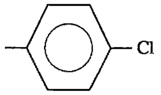 | 286 | 73.47 4.25 9.81 (73.57) (4.19) (10.10) | 1680 | 1005 |
| 23 (73) | 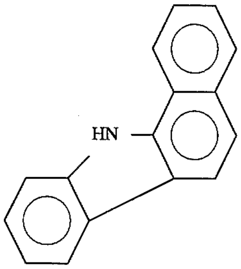 | 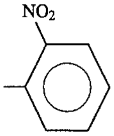 | 298 | 71.88 3.92 11.99 (72.19) (4.11) (12.38) | 1675 | 1000 |
| 24 (74) | 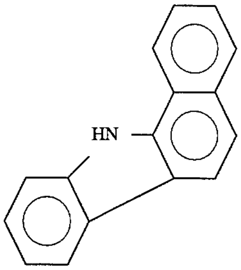 | 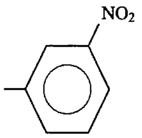 | 288 | 71.84 3.90 11.93 (72.19) (4.11) (12.38) | 1670 | 1000 |

TABLE 2-continued
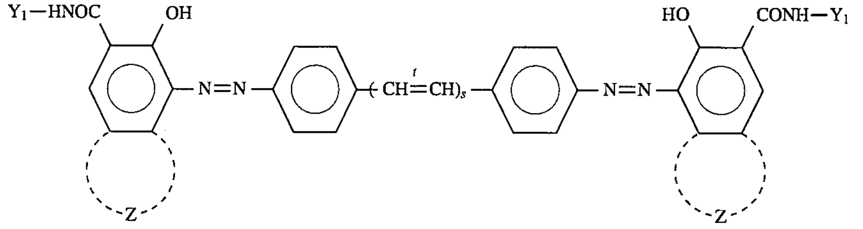
| Synthesis Example | 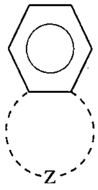 | $Y_1$ | Exothermic Peak Temperature (C.°) | Elemental Analysis Found (Calculated) %C | %H | %N | IR Spectrum (KBr) ($cm^{-1}$) C=O | trans-CH= |
|---|---|---|---|---|---|---|---|---|
| 25 (75) | 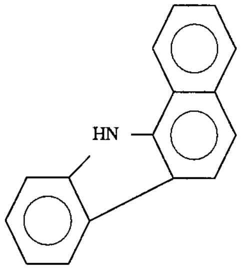 | 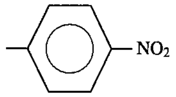 | 300 | 71.90 (72.19) | 3.97 (4.11) | 12.02 (12.38) | 1680 | 1000 |
| 26 (62) | 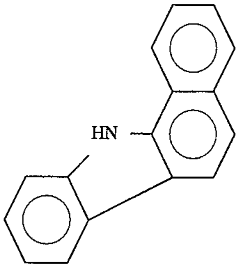 | 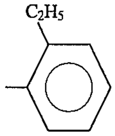 | 275 | 78.84 (78.80) | 5.00 (5.15) | 9.76 (10.21) | 1670 | 1000 |
| 27 (63) | 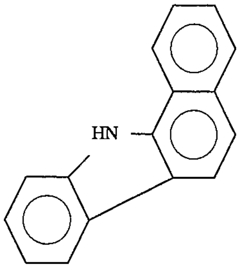 | 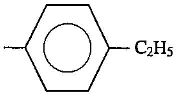 | 342 | 78.48 (78.80) | 4.92 (5.15) | 9.78 (10.21) | 1670 | 1000 |
| 28 (67) | 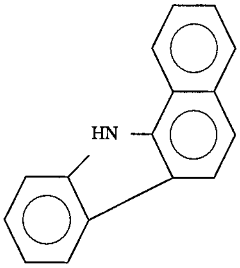 | 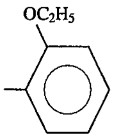 | 294 | 76.14 (76.57) | 4.79 (5.01) | 9.69 (9.92) | 1670 | 995 |

TABLE 2-continued
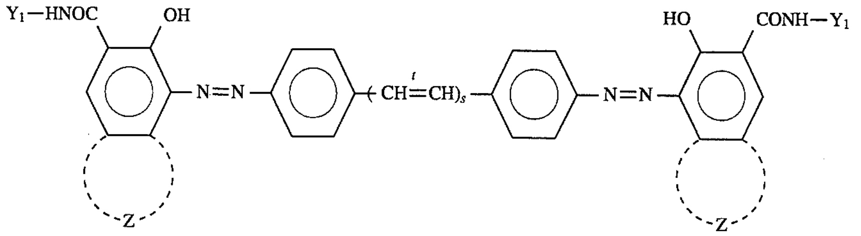
| Synthesis Example | 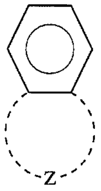 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 29 (69) | 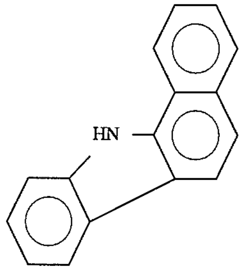 | 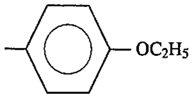 | 283 | 76.55 4.84 9.42 (76.57) (5.01) (9.92) | 1660 | 995 |
| 30 (212) | 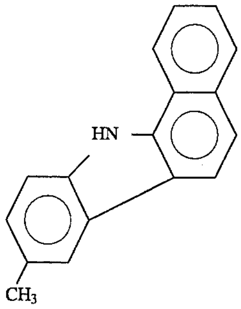 | 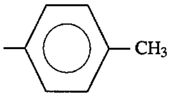 | 307 | 78.40 5.00 9.96 (78.80) (5.16) (10.21) | 1670 | 1000 |
| 31 (211) | 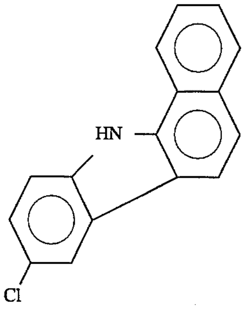 | 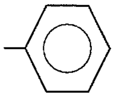 | 309 | 73.14 3.83 9.82 (73.57) (4.19) (10.10) | 1670 | 995 |
| 32 (213) | 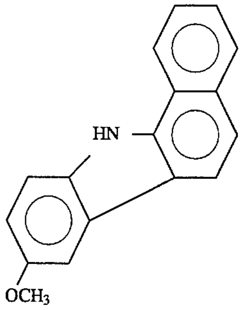 | 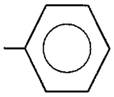 | 302 | 75.94 4.56 9.68 (76.34) (4.77) (10.18) | 1670 | 1000 |

TABLE 2-continued

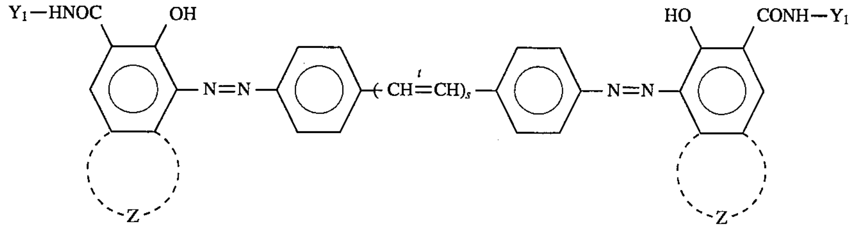

| Synthesis Example | 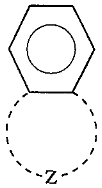 | $Y_1$ | Exothermic Peak Temperature (C.°) | Elemental Analysis Found (Calculated) %C %H %N | IR Spectrum (KBr) ($cm^{-1}$) C=O trans-CH= |
|---|---|---|---|---|---|

*Numbers in the parentheses in the column of Synthesis Examples indicate bisazo pigment No. in Table 2.

Synthesis Example 33

0.51 g of the same bis(diazonium)salt as that employed in Synthesis Example 1 was added to a solution consisting of 100 ml of dimethylformamide and 0.61 g of 3-hydroxy-2-naphthoic acid benzylidenehydrazide. To this mixture, 4 ml of an 8.6%-aqueous solution of sodium acetate was added dropwise at room temperature. After the addition of the aqueous solution of sodium acetate, the mixture was stirred for 3 hours at room temperature. The resulting precipitate was separated from the solution by filtration, washed with 200 ml of dimethylformamide six times and further with water twice, and dried, so that 0.85 g of a powdery bluish black bisazo pigment No. 77 of the following formula listed in Table 1 was obtained in a 93% yield.

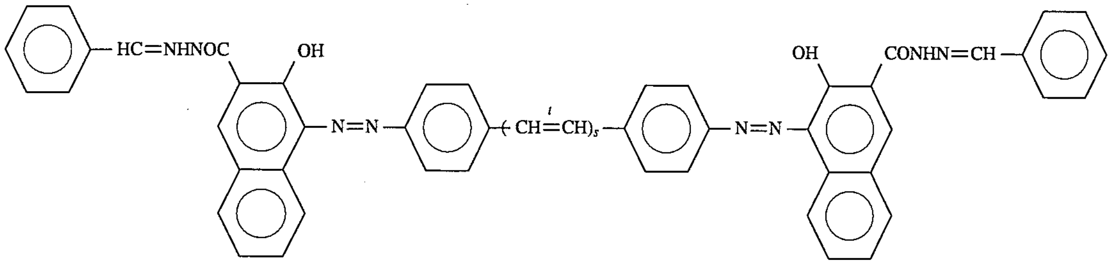

Exothermic peak temperature: 263° C.

The results of the elemental analysis of the thus obtained product were as follows:

| | % C | % H | % N |
|---|---|---|---|
| Calculated | 75.95 | 4.85 | 12.22 |
| Found | 75.75 | 4.52 | 12.12 |

The above calculation was based on the formula for the bisazo pigment of $C_{58}H_{44}N_8O_4$.

Figure 10:
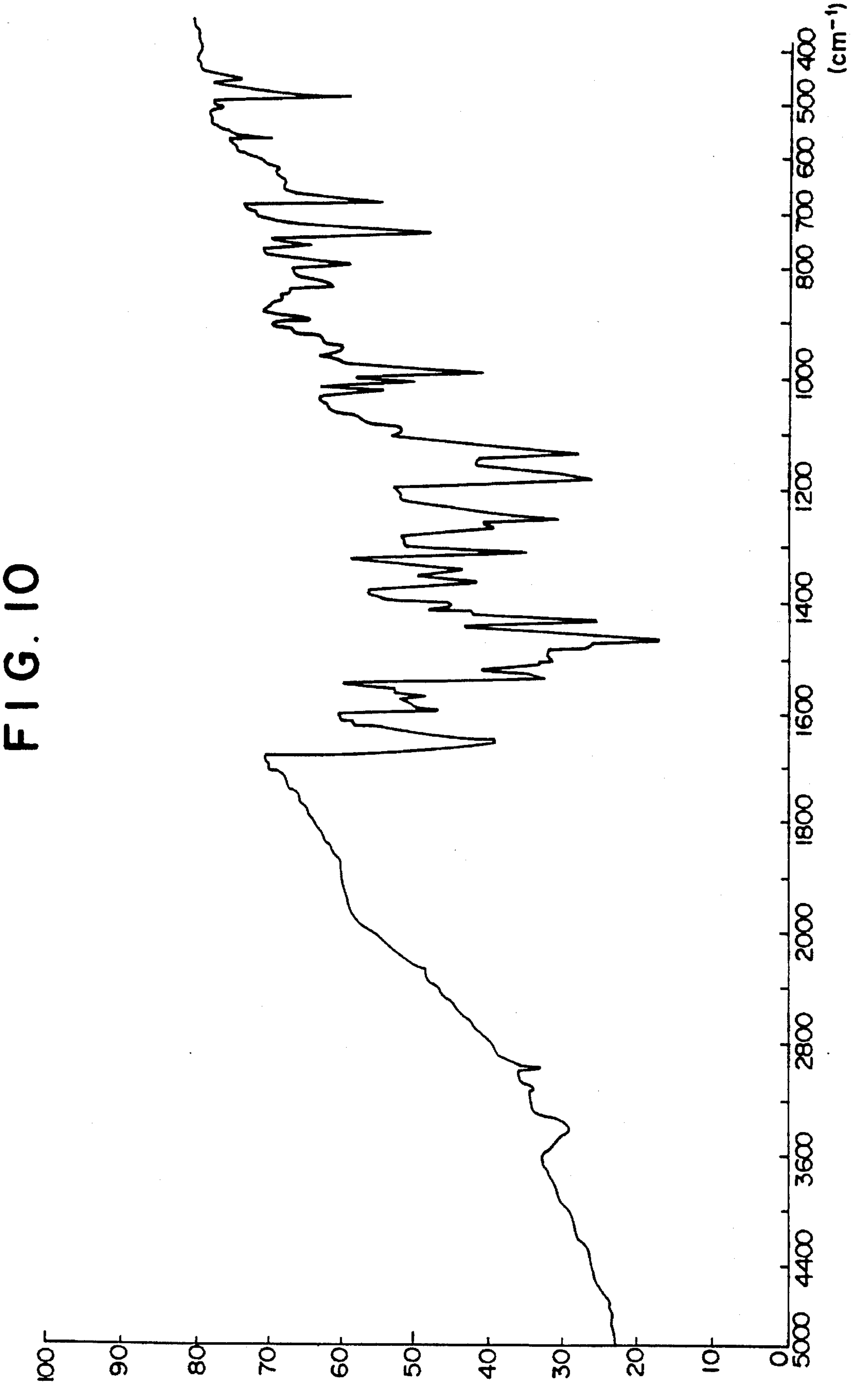

FIG. 10 shows an infrared spectrum of the bisazo pigment No. 77, taken by use of a KBr tablet, which indicates an absorption characteristic of CO stretching vibration at 1670 $cm^{-1}$ and an absorption characteristic of trans-olefine out-of-plane deformation vibration at 1005 $cm^{-1}$.

Synthesis Examples 34 to 41

Synthesis Example 33 was repeated except that the coupler (ArH) employed in Synthesis Example 33 was replaced by the respective couplers shown in the following Table 3, whereby the bisazo pigments were obtained as shown in Table 3.

TABLE 3
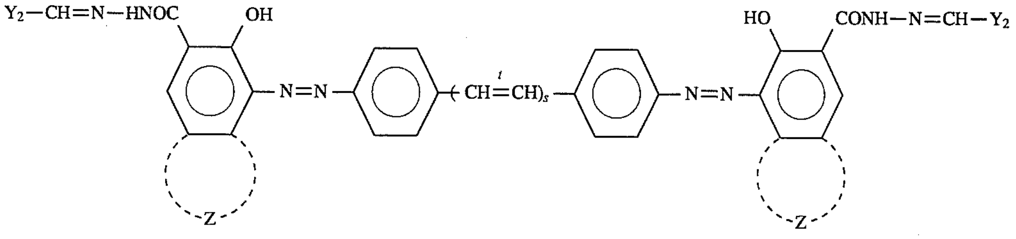
| Synthesis Example | 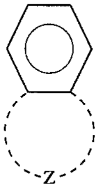 | $Y_2$ | Exothermic Peak Temperature (C.°) | Elemental Analysis Found (Calculated) % C % H % N | IR Spectrum (KBr) ($cm^{-1}$) C=O | trans-CH= |
|---|---|---|---|---|---|---|
| 34 (167) | 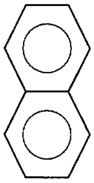 | 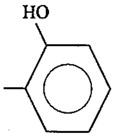 | 277 | 73.42 4.60 11.76 (73.43) (4.68) (11.81) | 1680 | 1005 |
| 35 (90) | 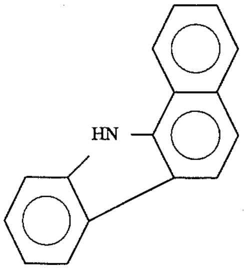 | 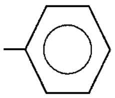 | 293 | 76.21 4.40 12.54 (76.76) (4.61) (12.79) | 1670 | 1005 |
| 36 (172) | 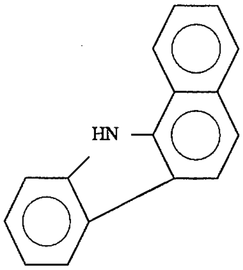 | 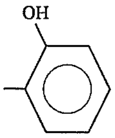 | 300 | 74.55 4.76 12.01 (74.58) (4.48) (12.43) | 1670 | 1000 |
| 37 (174) | 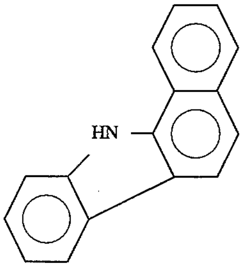 | 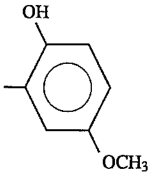 | 298 | 72.51 4.42 11.60 (72.83) (4.59) (11.80) | 1670 | 1000 |

TABLE 3-continued
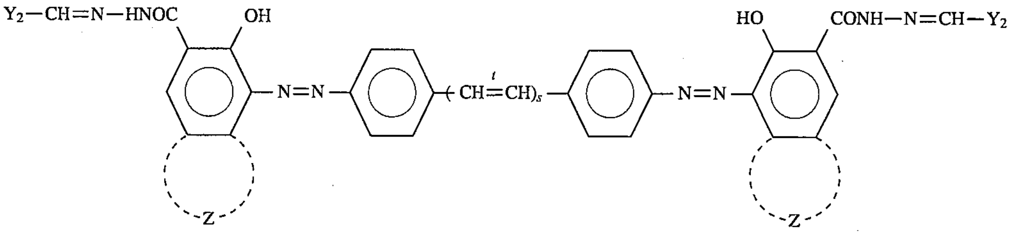
| Synthesis Example | 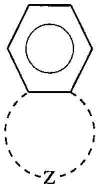 | $Y_2$ | Exothermic Peak Temperature (C.°) | Elemental Analysis Found (Calculated) % C | % H | % N | IR Spectrum (KBr) ($cm^{-1}$) C=O | trans-CH= |
|---|---|---|---|---|---|---|---|---|
| 38 (173) | 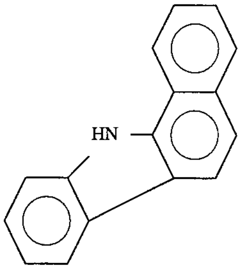 | 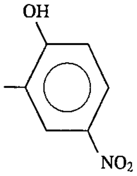 | 356 | 66.93 (67.04) | 3.94 (4.08) | 13.07 (13.48) | 1670 | 1000 |
| 39 (175) | 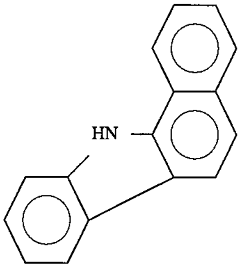 | 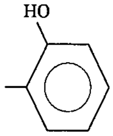 | 298 | 76.04 (76.32) | 4.39 (4.44) | 11.11 (11.41) | 1670 | 1000 |
| 40 (179) | 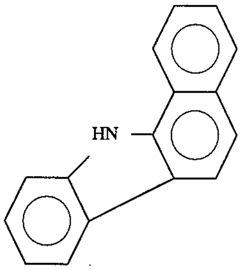 | 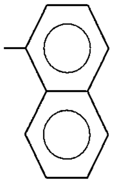 | 290 | 77.81 (78.36) | 4.30 (4.56) | 11.36 (11.72) | 1665 | 1000 |
| 41 (180) | 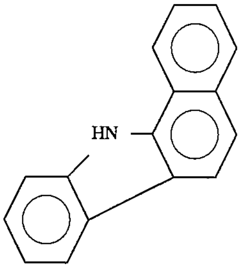 | 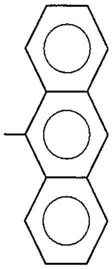 | 284 | 79.40 (79.72) | 4.25 (4.52) | 10.45 (10.81) | 1665 | 1000 |

Synthesis Examples 42 to 77

Synthesis Example 33 was repeated except that the coupler (ArH ) employed in Synthesis Example 33 was replaced by the respective couplers shown in the following Table 4, whereby bisazo pigments as shown in Table 4 were obtained.

TABLE 4

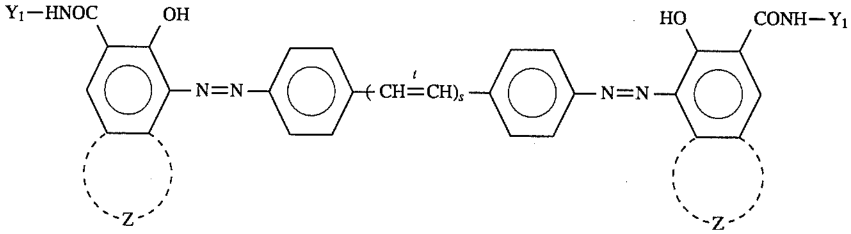

| Synthesis Example | 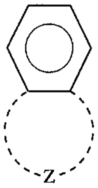 | $Y_1$ | Exothermic Peak Temperature (C.°) | Elemental Analysis Found (Calculated) %C %H %N | IR Spectrum (KBr) (cm$^{-1}$) C=O | trans-CH= |
|---|---|---|---|---|---|---|
| 42 (2) | 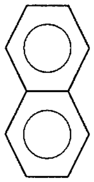 | 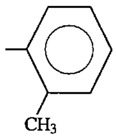 | 270 | 77.85 5.01 9.11 (78.17) (5.21) (9.43) | 1680 | 1000 |
| 43 (33) | 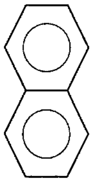 | 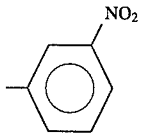 | 269 | 70.00 4.20 11.50 (70.58) (4.23) (11.76) | 1680 | 1000 |
| 44 (44) | 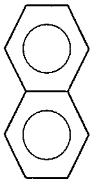 | 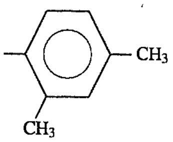 | 267 | 77.63 5.02 8.79 (78.40) (5.49) (9.15) | 1670 | 1000 |
| 45 (181) | 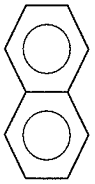 | 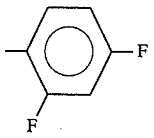 | 265 | 71.90 3.83 8.97 (71.93) (4.10) (8.99) | 1680 | 1000 |
| 46 (42) | 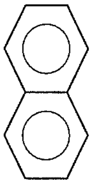 | 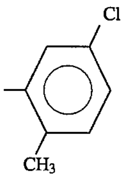 | 257 | 71.89 4.24 8.97 (72.55) (4.63) (8.76) | 1680 | 1000 |

TABLE 4-continued
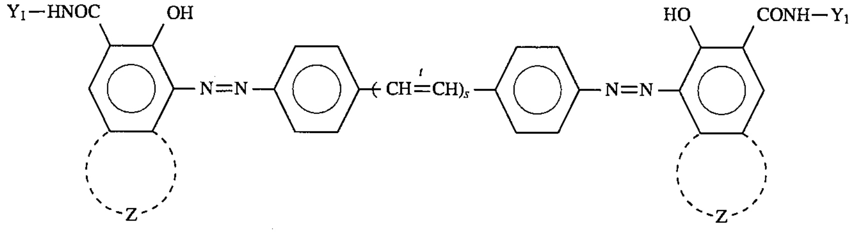
| Synthesis Example | 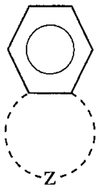 | $Y_1$ | Exothermic Peak Temperature (C.°) | Elemental Analysis Found (Calculated) % C | % H | % N | IR Spectrum (KBr) ($cm^{-1}$) C=O | trans-CH= |
|---|---|---|---|---|---|---|---|---|
| 47<br>(50) | 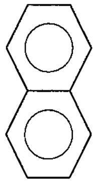 | 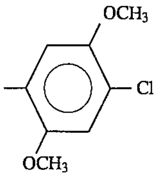 | 274 | 71.92<br>(72.92) | 4.30<br>(4.91) | 8.20<br>(8.51) | 1670 | 1000 |
| 48<br>(182) | 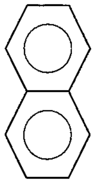 | 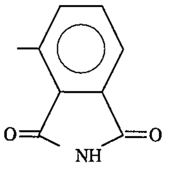 | 292 | 71.44<br>(71.98) | 3.66<br>(4.04) | 10.97<br>(11.20) | 1680 | 1000 |
| 49<br>(183) | 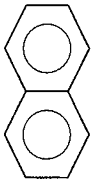 | 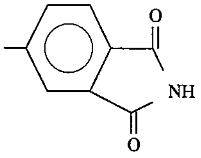 | 284 | 70.98<br>(71.98) | 3.82<br>(4.04) | 10.91<br>(11.20) | 1680 | 1005 |
| 50<br>(185) | 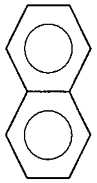 | 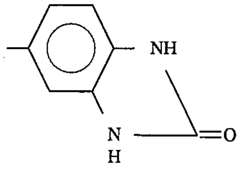 | 306 | 70.22<br>(71.44) | 4.26<br>(4.35) | 13.85<br>(14.37) | unclear | 1015 |
| 51<br>(187) | 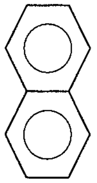 | 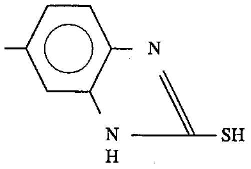 | 302 | 68.82<br>(69.16) | 4.46<br>(4.21) | 13.35<br>(13.91) | 1660 | 1005 |
| 52<br>(191) | 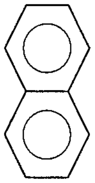 | 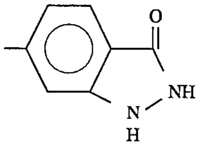 | 303 | 70.79<br>(71.44) | 4.15<br>(4.35) | 13.81<br>(14.37) | 1680 | 1005 |

TABLE 4-continued
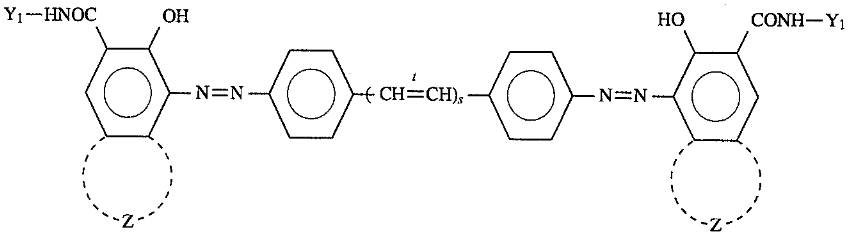
| Synthesis Example | 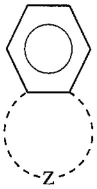 | $Y_1$ | Exothermic Peak Temperature (C.°) | Elemental Analysis Found (Calculated) % C % H % N | IR Spectrum (KBr) ($cm^{-1}$) C=O | trans-CH= |
|---|---|---|---|---|---|---|
| 53 (186) | 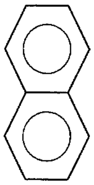 | 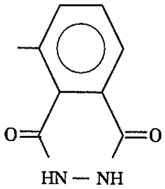 | 311 | 69.32 4.07 12.98 (69.89) (4.11) (13.59) | unclear | 1005 |
| 54 (106) | 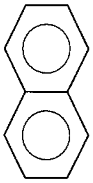 | 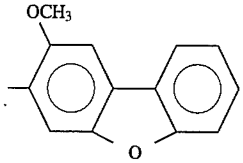 | 289 | 75.62 4.26 7.57 (76.20) (4.58) (7.62) | 1670 | 1005 |
| 55 (188) | 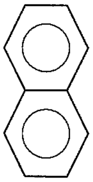 | 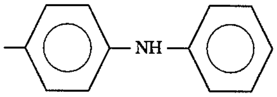 | 297 | 77.42 4.99 10.39 (78.13) (5.02) (10.72) | 1665 | 1005 |
| 56 (192) | 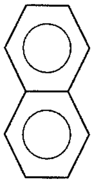 | 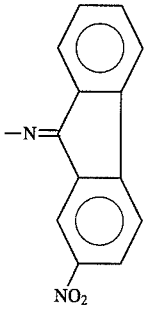 | 303 | 71.82 3.89 11.84 (72.77) (4.02) (12.13) | 1685 | 1000 |
| 57 (164) | 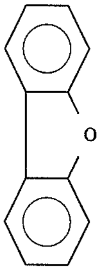 | 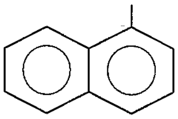 | 289 | 77.98 4.24 7.83 (78.29) (4.45) (8.06) | 1670 | 1000 |

TABLE 4-continued
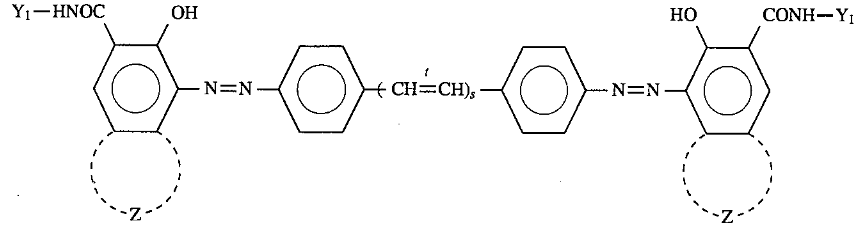
| Synthesis Example | 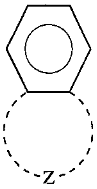 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 58 (189) | 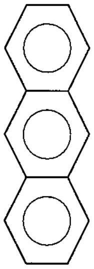 | 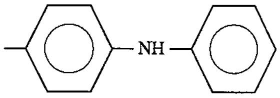 | 293 | 79.22 4.62 9.50 (79.69) (4.94) (9.79) | 1665 | 1010 |
| 59 (190) | 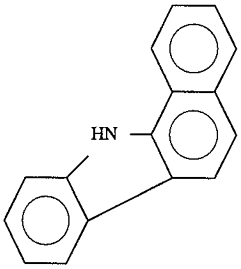 | 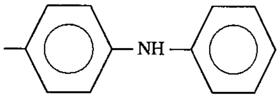 | 307 | 77.95 4.79 11.01 (78.53) (4.79) (11.45) | 1660 | 1000 |
| 60 (193) | 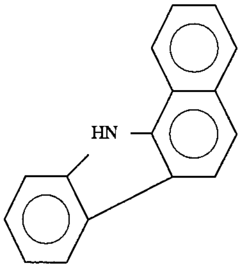 | 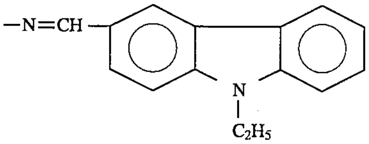 | 301 | 76.60 4.62 12.30 (77.68) (4.86) (12.64) | 1670 | 1000 |
| 61 (194) | 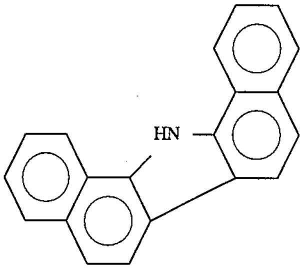 | 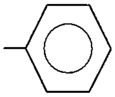 | 284 | 80.01 4.05 9.68 (79.97) (4.60) (9.82) | 1670 | 1000 |

TABLE 4-continued
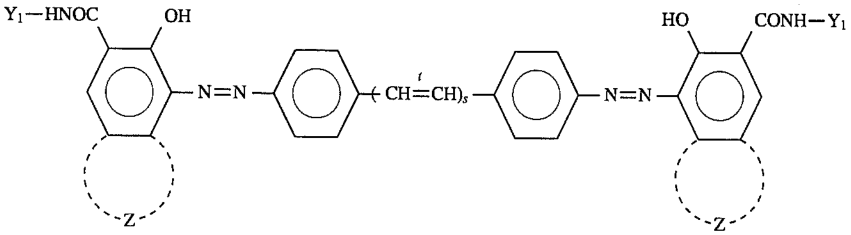
| Synthesis Example | 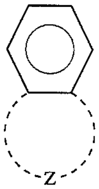 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 62 (195) | 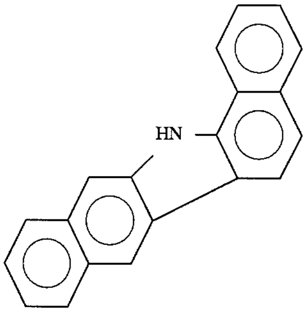 | 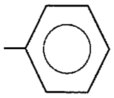 | 311 | 79.89 4.25 9.66 (79.97) (4.60) (9.82) | 1670 | 1000 |
| 63 (196) | 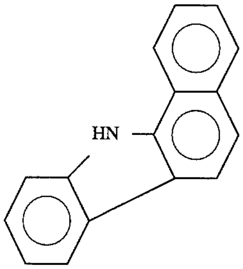 | 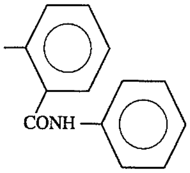 | 290 | 76.92 4.08 10.77 (76.97) (4.58) (10.95) | 1660[a] (broad) | 1000 |
| 64 (197) | 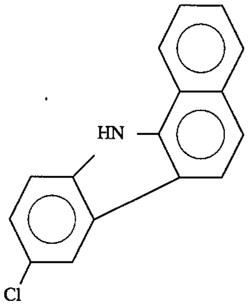 | 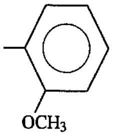 | 319 | 72.01 3.92 9.12 (71.84) (4.32) (9.58) | 1670 | 1000 |
| 65 (198) | 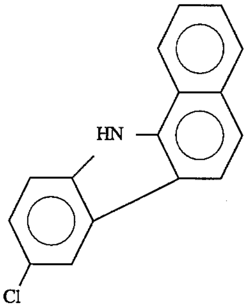 | 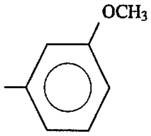 | 305 | 72.45 3.92 9.53 (71.84) (4.32) (9.58) | 1670 | 1000 |

TABLE 4-continued
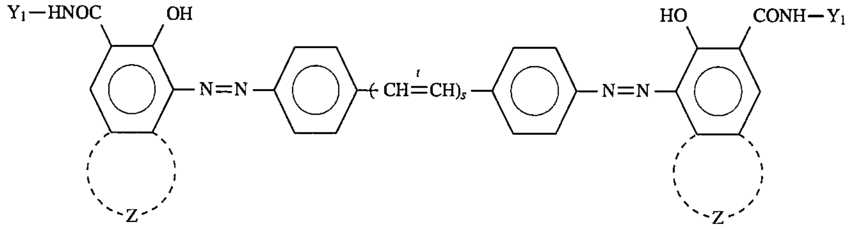
| Synthesis Example | 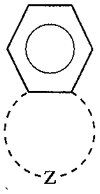 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 66 (199) | 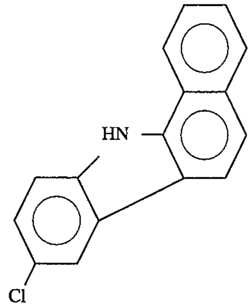 | 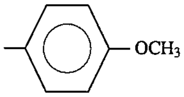 | 309 | 72.06 3.84 9.38 (71.84) (4.32) (9.58) | 1670 | 1005 |
| 67 (200) | 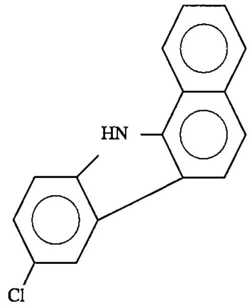 | 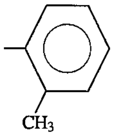 | 318 | 73.70 4.04 9.87 (73.86) (4.44) (9.85) | 1675 | 1000 |
| 68 (201) | 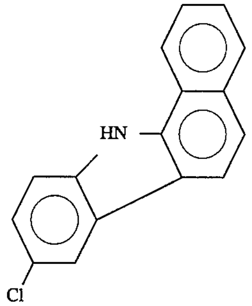 | 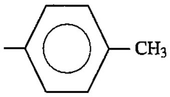 | 320 | 73.65 4.10 9.75 (73.86) (4.44) (9.85) | 1675 | 1005 |

TABLE 4-continued
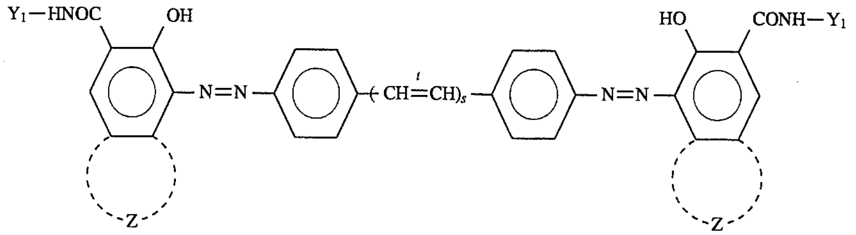
| Synthesis Example | 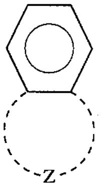 | $Y_1$ | Exothermic Peak Temperature (C.°) | Elemental Analysis Found (Calculated) % C | % H | % N | IR Spectrum (KBr) ($cm^{-1}$) C=O | trans-CH= |
|---|---|---|---|---|---|---|---|---|
| 69 (202) | 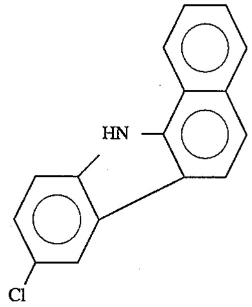 | 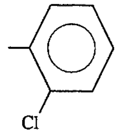 | 310 | 68.44 (69.27) | 3.29 (3.77) | 9.32 (9.51) | 1675 | 1005 |
| 70 (203) | 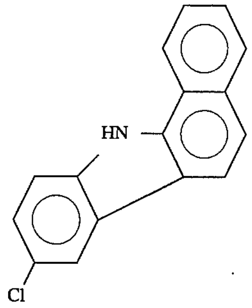 | 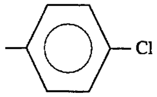 | 335 | 68.69 (69.27) | 3.35 (3.77) | 9.36 (9.51) | 1675 | 1005 |
| 71 (204) | 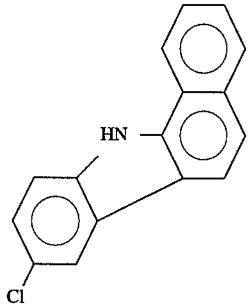 | 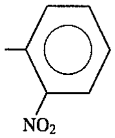 | 322 | 67.88 (68.05) | 3.40 (3.70) | 11.18 (11.67) | 1675 | 1000 |

TABLE 4-continued
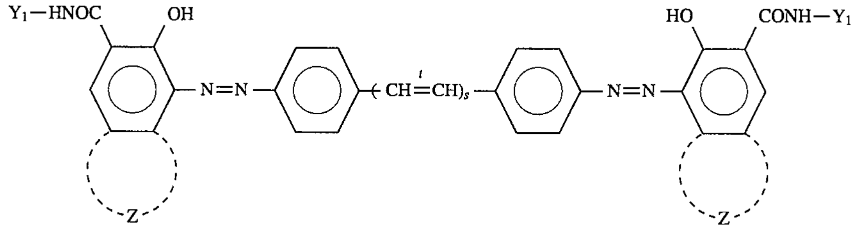
| Synthesis Example | 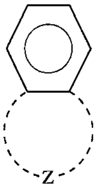 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 72 (205) | 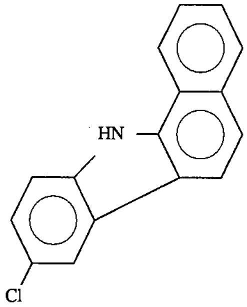 | 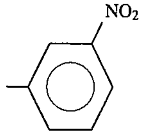 | 329 | 67.15 3.48 11.29 (68.05) (3.70) (11.67) | 1680 | 1000 |
| 73 (206) | 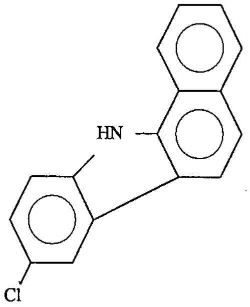 | 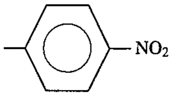 | 382 | 67.94 3.43 11.37 (68.05) (3.70) (11.67) | 1680 | 1005 |
| 74 (207) | 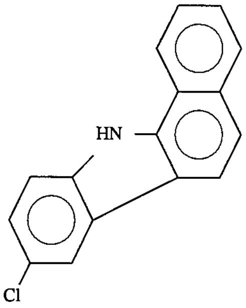 | 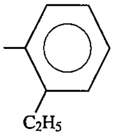 | 297 | 73.55 4.33 9.40 (74.15) (4.68) (9.61) | 1675 | 1000 |

TABLE 4-continued

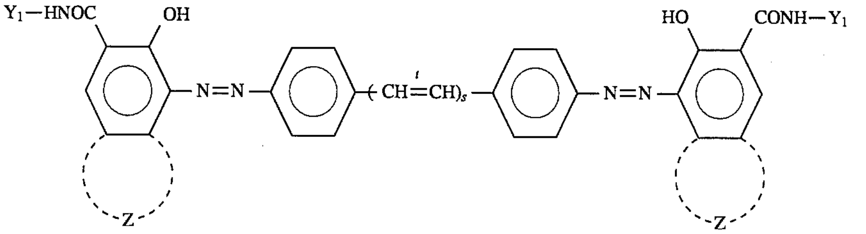

| Synthesis Example | 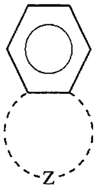 | $Y_1$ | Exothermic Peak Temperature (C.°) | Elemental Analysis Found (Calculated) %C %H %N | IR Spectrum (KBr) ($cm^{-1}$) C=O | trans-CH= |
|---|---|---|---|---|---|---|
| 75 (208) | 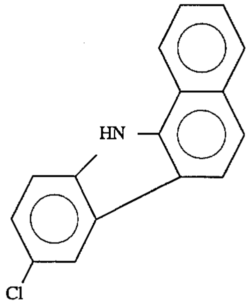 | 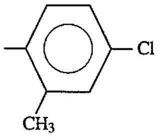 | 330 | 68.38 3.89 8.78 (69.65) (4.02) (9.29) | 1680 | 1010 |
| 76 (209) | 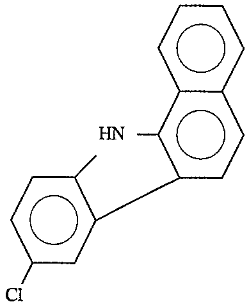 | 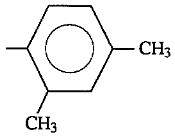 | 304 | 73.48 4.38 9.39 (74.15) (4.68) (9.61) | 1670 | 1000 |
| 77 (210) | 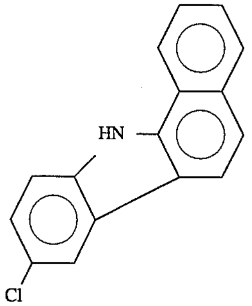 | 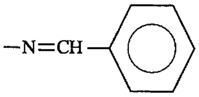 | 319 | 72.76 4.01 11.79 (72.21) (4.16) (12.03) | 1675 | 1005 |

In the electrophotographic photoconductor according to the present invention, the bisazo pigment having the general formula (I) is contained in a photoconductive layer as a charge generating material. The bisazo pigments can be employed in different ways, for example, as shown in FIG. 11 and FIG. 12.

Figure 11:
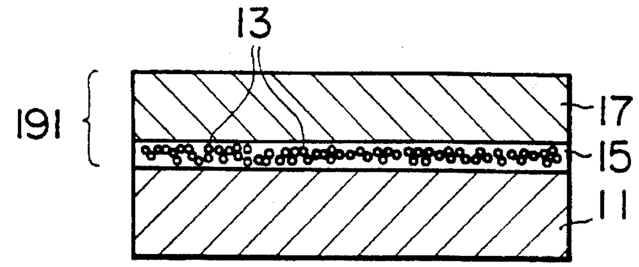
FIG. 11 is a schematic cross-sectional view of an example of an electrophotographic photoconductor according to the present invention.

In the photoconductor as shown in FIG. 11, there is formed on an electroconductive support 11 a two-layered photoconductive layer 191 comprising a charge generation layer 15 consisting essentially of a bisazo pigment 13 serving as a charge generating material and a charge transport layer 17 containing a charge transporting material.

In this photoconductor, light which has passed through the charge transport layer 17 reaches the charge generation layer 15. The charge carriers which are necessary for the light decay for latent electrostatic image formation are generated by the bisazo pigment 13 contained in the charge generation layer 15, accepted and transported by the charge transport layer 17.

Figure 12:
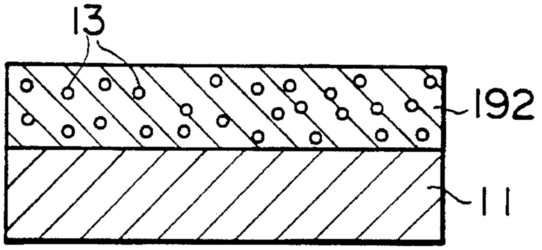
FIG. 12 is a schematic cross-sectional view of another example of an electrophotographic photoconductor according to the present invention.

In the photoconductor as shown in FIG. 12, there is formed on an electroconductive support 11 a photoconductive layer 192 mainly comprising a bisazo pigment 13, a charge transporting material and an insulating binder agent. In this photoconductor, the bisazo pigment 13 functions as a charge generating material.

Besides the photoconductors as shown in FIG. 11 and FIG. 12, a photoconductor in which the overlaying order of the charge generation layer 15 containing the bisazo pigment and the charge transport layer 17 is reversed as compared with the electrophotographic photoconductor as shown in FIG. 11 can be employed.

In the photoconductor as shown in FIG. 11, it is preferable that the thickness of the charge generation layer 15 of the photoconductive layer 191 be in the range of 0.01 to 5 μm, more preferably in the range of 0.05 to 2 μm.

When the thickness of the charge generation layer 15 is 0.01 μm or less, the charge carriers generated are not sufficient for the light decay for latent electrostatic image formation. When the thickness of the charge generation layer 15 is 5 μm or more, the residual electric potential remains too high.

It is preferable that the thickness of the charge transport layer 17 be in the range of 3 to 50 μm, more preferably in the range of 5 to 20 μm.

When the thickness of the charge transport layer 17 is 3 μm or less, the electrical charge quantity is not sufficient for practical use. When the thickness of the charge transport layer 17 is 50 μm or more, the residual electric potential remains too high.

The charge generation layer 15 comprises the bisazo pigment of the general formula (I), a binder agent and a plasticizer. It is preferable that the amount of the bisazo pigment contained in the charge generation layer 15 be 30 wt. % or more, more preferably 50 wt. % or more.

The charge transport layer 17 comprises the charge transporting material, a binder agent and a plasticizer. It is preferable that the amount of the charge transporting material contained in the charge transport layer 17 be in the range of 10 to 95 wt. %, more preferably in the range of 30 to 90 wt. %. When the amount of the charge transporting material contained in the charge transport layer 17 is less than 10 wt. %, the charge carriers are hardly transported. When the amount of the charge transporting material contained in the charge transport layer 17 is 95 wt. % or more, the mechanical strength of the film of the photoconductor is considerably insufficient for practical use.

In the photoconductor as shown in FIG. 15, it is preferable that the thickness of the photoconductive layer 192 be in the range of 3 to 50 μm, more preferably in the range of 5 to 20 μm.

It is preferable that the amount of the bisazo pigment contained in the photoconductive layer 192 be 50 wt. % or less, more preferably 20 wt. % or less. It is preferable that the amount of the charge transporting material contained in the photoconductive layer 192 be in the range of 10 to 95 wt. %, more preferably in the range of 30 to 90 wt. %.

In the electrophotographic photoconductor according to the present invention, conventional materials can be employed for each elements such as the electroconductive support and the charge transport material.

Specific examples of the electroconductive support for the electrophotographic photoconductor according to the present invention include a metallic plate made of aluminum, copper and zinc, a plastic sheet made of polyester, a plastic film on which a metal such as aluminum and tin dioxide is evaporated, and a sheet of paper which has been treated so as to be electroconductive.

Specific examples of the binder agent for use in the present invention are condensation resins such as polyamide, polyurethane, polyester, epoxy resin, polyketone, polycarbonate and polyacetal; and vinyl polymers such as polyvinylketone, polystyrene, poly-N-vinylcarbazole and polyacrylamide. Besides the above-listed binder agents, other conventional electrically insulating and adhesive resins can be used.

Specific examples of the plasticizer for use in the present invention are halogenated paraffin, polybiphenyl chloride, dimethylnaphthalene and dibutyl phthalate. In addition, silicone oil can be added to the photoconductor to improve the surface properties thereof.

As the charge transporting materials, there are positive hole transporting materials and electron transporting materials.

Specific examples of the positive hole transporting materials are the compounds represented by the following general formulas (1) through (11):

(1)

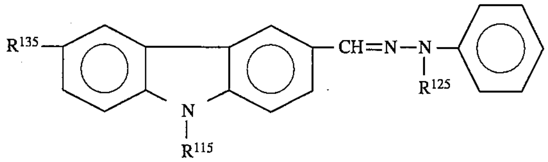

wherein $R^{115}$ represents a methyl group, an ethyl group, a 2-hydroxyethyl group, or a 2-chloroethyl group; $R^{125}$ represents a methyl group, an ethyl group, a benzyl group or a phenyl group; $R^{135}$ represents hydrogen, chlorine, bromine, an alkyl group having 1 to 4 carbon atoms, an alkoxyl group having 1 to 4 carbon atoms, a dialkylamino group or a nitro group.

(2)

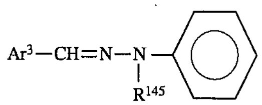

wherein $Ar^3$ represents an unsubstituted or substituted naphthalene ring, an unsubstituted or substituted anthracene ring, an unsubstituted or substituted styryl group, a pyrydine ring, a furan ring, or a thiophene ring; and $R^{145}$ represents an alkyl group or a benzyl group.

(3)

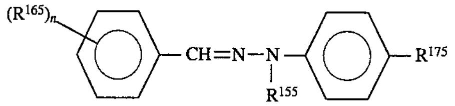

wherein $R^{155}$ represents an alkyl group, a benzyl group, a phenyl group, or a naphthyl group; $R^{165}$ represents hydrogen, an alkyl group having 1 to 3 carbon atoms, an alkoxyl group having 1 to 3 carbon atoms, a dialkylamino group, a diaralkylamino group or a diarylamino group; n is an integer of 1 to 4, and when n is 2 or more, $R^{165}$s may be the same or different; and $R^{175}$ represents hydrogen or a methoxy group.

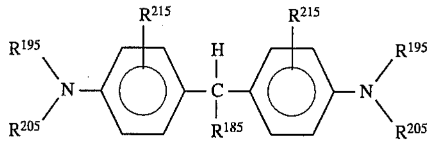

(4)

wherein $R^{185}$ represents an alkyl group having 1 to 11 carbon atoms, an unsubstituted or substituted phenyl group, or a heterocyclic ring; $R^{195}$ and $R^{205}$ and may be the same or different and each represent hydrogen, an alkyl group having 1 to 4 carbon atoms, a hydroxylalkyl group, a chloroalkyl group, or an unsubstituted or substituted aralkyl group, $R^{195}$ and $R^{205}$ may be bonded to each other to form a heterocyclic ring containing nitrogen atom(s); each $R^{215}$ may be the same or different and represents hydrogen, an alkyl group having 1 to 4 carbon atoms, an alkoxyl group or halogen.

(5)

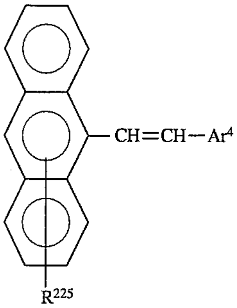

wherein $R^{225}$ represents hydrogen or halogen; and $Ar^4$ represents an unsubstituted or substituted phenyl group, an unsubstituted or substituted naphthyl group, an unsubstituted or substituted anthryl group or an unsubstituted or substituted carbazolyl group.

(6)

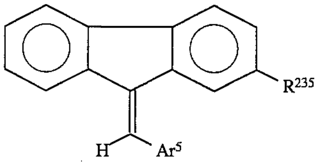

wherein $R^{235}$ represents hydrogen, halogen, a cyano group, an alkoxyl group having 1 to 4 carbon atoms, or an alkyl group having 1 to 4 carbon atoms; $Ar^5$ represents

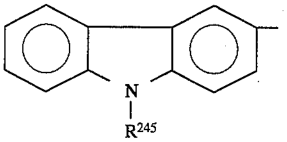

or

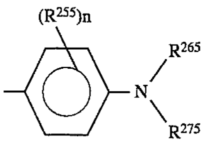

wherein $R^{245}$ represents an alkyl group having 1 to 4 carbon atoms; $R^{255}$ represents hydrogen, halogen, an alkyl group having 1 to 4 carbon atoms, an alkoxyl group having 1 to 4 carbon atoms, or a dialkylamino group; n is an integer of 1 or 2, and when n is 2, each $R^{255}$ may be the same or different; and $R^{265}$ and $R^{275}$ each represent hydrogen, an unsubstituted or substituted alkyl group having 1 to 4 carbon atoms, or an unsubstituted or substituted benzyl group.

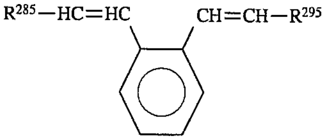

(7)

wherein $R^{285}$ and $R^{295}$ each represent a carbazolyl group, a pyridyl group, a thienyl group, an indolyl group, a furyl group, an unsubstituted or substituted phenyl group, an unsubstituted or substituted styryl group, an unsubstituted or substituted naphthyl group, an unsubstituted or substituted anthryl group, which may have a substituent selected from the group consisting of a dialkylamino group, an alkyl group, an alkoxyl group, a carboxyl group or an ester thereof, halogen, a cyano group, an aralkylamino group, an N-alkyl-N-aralkylamino group, an amino group, a nitro group and an acetylamino group.

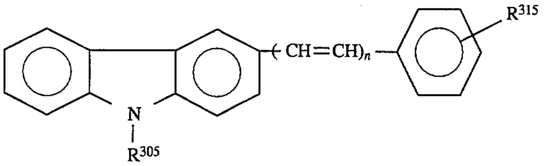

(8)

wherein $R^{305}$ represents a lower alkyl group or a benzyl group; $R^{315}$ represents hydrogen, a lower alkyl group, a lower alkoxyl group, halogen, a nitro group, an amino group which may have as a substituent a lower alkyl group or a benzyl group, and n is an integer of 1 or 2.

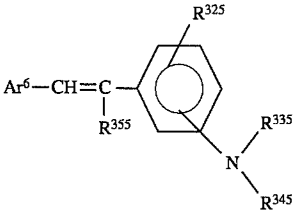

(9)

wherein $R^{325}$ represents hydrogen, an alkyl group, an alkoxyl group or halogen; $R^{335}$ and $R^{345}$ each represent an alkyl group, an unsubstituted or substituted aralkyl group, or an unsubstituted or substituted aryl group; $R^{355}$ represents hydrogen or an unsubstituted or substituted phenyl group, and $Ar^6$ represents a phenyl group or a naphthyl group.

(10)

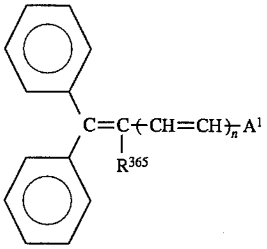

wherein n is an integer of 0 or 1; $R^{365}$ represents hydrogen, an alkyl group, or an unsubstituted or substituted phenyl group; $A^1$ represents

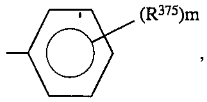,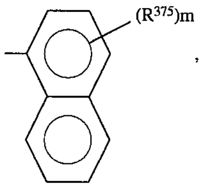, a 9-anthryl group or an unsubstituted or substituted N-alkylcarbazolyl group, wherein $R^{375}$ represents hydrogen, an alkyl group, an alkoxyl group, halogen, or

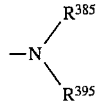

wherein $R^{385}$ and $R^{395}$ each represent an alkyl group, or an unsubstituted or substituted aryl group, and $R^{385}$ and $R^{395}$ may form a ring in combination; m is an integer of 0, 1, 2, or 3, and when m is 2 or more, each $R^{375}$ may be the same or different.

(11)

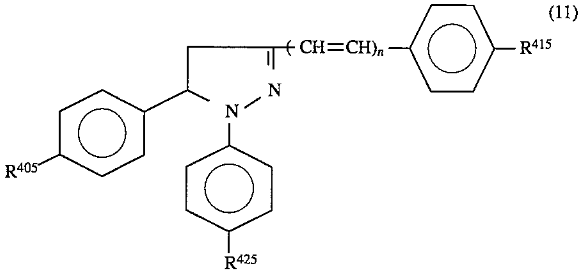

wherein $R^{405}$, $R^{415}$ and $R^{425}$ each represent hydrogen, a lower alkyl group, a lower alkoxyl group, a dialkylamino group, or halogen; and n is an integer of 0 or 1.

Specific examples of the compound represented by the above general formula (1) are 9-ethylcarbazole-3-aldehyde, 1-methyl-1-phenylhydrazone, 9-ethylcarbazole-3-aldehyde 1-benzyl-1-phenylhydrazone, and 9-ethylcarbazole-3-aldehyde 1,1-diphenylhydrazone.

Specific examples of the compound represented by the above general formula (2) are 4-diethylaminostylene-β-aldehyde 1-methyl-1-phenylhydrazone, and 4-methoxynaphthalene-1-aldehyde 1-benzyl-1-phenylhydrazone.

Specific examples of the compound represented by the above general formula (3) are 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenyl-hydrazone, 4-methoxybenzaldehyde 1-benzyl-1-(methoxy)phenylhydrazone, 4-diphenylaminobenzaldehyde 1-benzyl-1-phenylhydrazone, and 4-dibenzylaminobenzaldehyde-1,1-diphenylhydrazone.

Specific examples of the compound represented by the above general formula (4) are 1,1-bis(4-dibenzylaminophenyl)propane, tris(4-diethylaminophenyl)methane, 1,1-bis(4-dibenzylaminophenyl)propane, and 2,2'-dimethyl-4,4'-bis-(diethylamino)-triphenylmethane.

Specific examples of the compound represented by the above general formula (5) are 9-(4-diethylaminostyryl) anthracene, and 9-bromo-10-(4-diethylaminostyryl) anthracene.

Specific examples of the compound represented by the above general formula (6) are 9-(4-dimethylaminobenzylidene) fluorene, and 3-(9-fluorenylidene)-9-ethylcarbazole.

Specific examples of the compound represented by the above general formula (7) are 1,2-bis(4-diethylaminostyryl) benzene, and 1,2-bis(2,4-dimethoxystyryl)benzene.

Specific examples of the compound represented by the above general formula (8) are 3-styryl-9-ethylcarbazole, and 3-(4-methoxystyryl)-9-ethylcarbazole.

Specific examples of the compound represented by the above general formula (9) are 4-diphenylaminostilbene, 4-dibenzylaminostilbene, 4-ditolylaminostilbene, 1-(4-diphenylaminostyryl)naphthalene, and 1-(4-diethylaminostyryl) naphthalene.

Specific examples of the compound represented by the above general formula (10) are 4'-diphenylamino-α-phenylstilbene, and 4'-methylphenylamino-α-phenylstilbene.

Specific examples of the compound represented by the above general formula (11) are 1-phenyl-3-(4-diethylaminostyryl)-5-(4-diethylaminophenyl) pyrazoline, and 1-phenyl-3-(4-dimethylaminostyryl)-5-(4-dimethylaminophenyl) pyrazoline.

As other positive hole transporting materials, there are, for example, oxadiazole compounds such as 2,5-bis(4-diethylaminophenyl)-1,3,4-oxadiazole, 2,5-bis[4-(4-diethylaminostyryl)phenyl]-1,3,4-oxadiazole, and 2-(9-ethylcarbazolyl-3-)-5-(4-diethylaminophenyl)-1,3,4-oxadiazole; and oxazole compounds such as 2-vinyl-4-(2-chlorophenyl)-5-(4-diethylaminophenyl)oxazole, and 2-(4-diethylaminophenyl)-4-phenyloxazole. In addition, besides the above low-molecular weight compounds, the following polymeric compounds such as poly-N-vinylcarbazole, halogenated poly-N-vinylcarbazole, polyvinyl pyrene, polyvinyl anthracene, pyrene-formaldehyde resin, and ethylcarbazole-formaldehyde resin can be employed.

As electron transporting materials, there are, for example, chloranil, bromanil, tetracyanoethylene, tetracyanoquinone dimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno [1,2-b]thiophene-4-one, and 1,3,7-trinitrodibenzothiophene-5,5-dioxide. These electron transporting materials can be employed alone or in combination.

In the electrophotographic photoconductor according to the present invention, an adhesive layer or a barrier layer may be interposed between the electroconductive support and the photoconductive layer when necessary. The materials suitable for preparing the adhesive layer or barrier layer are polyamide, nitrocellulose and aluminum oxide. It is preferable that the thickness of the adhesive layer or barrier layer be 1 μm or less.

The electrophotographic photoconductor as shown in FIG. 11 can be prepared by depositing a bisazo pigment on an electroconductive support by vacuum deposition method as described in U.S. Pat. No. 3,973,959 and U.S. Pat. No. 3,996,049, or by coating on the electroconductive support a dispersion of finely-divided particles of the bisazo pigment dispersed in an appropriate solvent, with a binder agent dissolved therein when necessary, and drying the coated dispersion, and when necessary, subjecting the surface of the coated layer to buffing as disclosed in Japanese Laid-Open Patent Application 51-90827, or with the thickness of the coated layer adjusted appropriately. Finally, a solution of a charge transporting material and a binder agent is coated on the coated layer and drying the coated solution.

The electrophotographic photoconductor as shown in FIG. 12 can be prepared by dispersing finely-divided particles of the bisazo pigment in a solution in which a charge transporting material and a binder agent are dissolved to form a dispersion, coating the dispersion on an electroconductive support, and drying the coated dispersion.

In any of the electrophotographic photoconductors according to the present invention, it is preferable that the particle of the bisazo pigment are pulverized with a ball mill to 5 μm or less, more preferably 2 μm or less, when used. The coating of such bisazo pigments can be performed by the conventional means, such as a doctor blade and wire bar, or by the conventional dipping method.

Copying by use of the electrophotographic photoconductor according to the present invention can be performed by a process comprising the steps of uniformly charging the surface of the photoconductive layer to a predetermined potential in the dark, exposing the uniformly charged photoconductive layer to a light image to form a latent electrostatic image on the photoconductive layer, and developing the latent electrostatic image with a developer to a visible image, and when necessary by transferring the developed visible image to a transfer sheet such a sheet of paper, and by fixing the transferred image to the transfer sheet.

In the electrophotographic photoconductor according to the present invention, a bisazo pigment having 1,10-diphenyl-1,3,5,7,9-decapentaene skeleton is used as a charge generating material. This photoconductor has advantages that it has high photosensitivity and uniform spectral absorbance not only in the entire visible region, but also in the semiconductor laser wavelength region, and it can be manufactured easily as compared with conventional photoconductors. Furthermore, the characteristics of this photoconductor can be maintained in the course of repeated practical use.

Examples of the electrophotographic photoconductors according to the present-invention-will now be explained in detail, which are given for illustration of the present invention and are not intended to be limiting thereof.

EXAMPLE 1

7.5 parts by weight of a bisazo pigment No. 58 and 500 parts by weight of a tetrahydrofuran solution of a polyester resin (Trademark "Vylon 200" made by Toyobo Company, Ltd.) with the amount of the solid components contained therein being 0.5% were dispersed and ground in a ball mill. The thus prepared dispersion was coated on an aluminum surface of an aluminum-deposited polyester film by a doctor blade, and dried at room temperature, so that a charge generation layer having a thickness of about 1 μm was formed on the aluminum-deposited polyester film.

Furthermore, 2 parts by weight of 9-ethylcarbazole-3-aldehyde-1-methyl-1-phenylhydrazone serving as a charge transporting material, 2 parts by weight of a polycarbonate resin (Trademark "Panlite K-1300" made by Teijin Limited.) and 16 parts by weight of tetrahydrofuran were mixed to form a solution. This solution was coated on the above formed charge generation layer by a doctor blade and then dried at 80° C. for 2 minutes, and then at 105° C. for 5 minutes, so that a charge transport layer having a thickness of about 20 μm was formed on the charge generation layer. Thus a two-layered type electrophotographic photoconductor No. 1 according to the present invention as shown in FIG. 11 was prepared.

EXAMPLES 2 to 45

Example 1 was repeated except that the bisazo pigment No. 58 employed in Example 1 was replaced by the bisazo pigments listed in the following Table 5, whereby electrophotographic photoconductors No. 2 to No. 45 according to the present invention were prepared.

EXAMPLES 46 to 71

Example 1 was repeated except that 9-ethylcarbazole-3-aldehyde-1-methyl-1-phenylhydrazone employed as a charge transport material in Example 1 was replaced by 1-phenyl-3-(4-diethylaminostyryl)-5-(4-diethylaminophenyl)pyrazoline, and the bisazo pigment No. 58 employed in Example 1 was replaced by the bisazo pigments listed in the following Table 6, whereby electrophotographic photoconductors No. 46 to No. 71 according to the present invention were prepared.

EXAMPLES 72 to 108

Example 1 was repeated except that 9-ethylcarbazole-3-aldehyde-1-methyl-1-phenylhydrazone employed as a charge transport material in Example 1 was replaced by α-phenyl-4'-N,N-diphenylaminostilbene, and the bisazo pigment No. 58 employed in Example 1 was replaced by the bisazo pigments listed in the following Table 7, whereby electrophotographic photoconductors No. 72 to No. 108 according to the present invention were prepared.

EXAMPLES 109 to 144

Example 1 was repeated except that 9-ethylcarbazole-3-aldehyde-1-methyl-1-phenylhydrazone employed as a charge transport material in Example 1 was replaced by 1,1-bis(4-dibenzylaminophenyl)propane, and the bisazo pigment No. 58 employed in Example 1 was replaced by the bisazo pigments listed in the following Table 8, whereby electrophotographic photoconductors No. 109 to No. 144 according to the present invention were prepared.

With each of the electrophotographic photoconductors No. 1 through No. 144 according to the present invention, the surface of the photoconductive layer was charged negatively in the dark under application of −6 KV of corona charge for 20 seconds by a commercially available electrostatic copying sheet testing apparatus ("Paper Analyzer SP 428" made by Kawaguchi Electro Works Co., Ltd.), and then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 4.5 lux, and the exposure $E_{1/2}$ (lux.sec) required to reduce the initial surface potential Vpo (V) to ½ the initial surface potential Vpo (V) was measured. The results are given in Tables 5 to 8.

TABLE 5

| Photo-Conductor No. | Bisazo Pigment No. | Vpo (V) | E1/2 (lux · sec) |
|---|---|---|---|
| 1 | 58 | 700 | 4.24 |
| 2 | 90 | 676 | 2.13 |
| 3 | 163 | 572 | 7.91 |
| 4 | 8 | 715 | 2.67 |
| 5 | 34 | 376 | 3.77 |
| 6 | 65 | 780 | 4.76 |
| 7 | 66 | 860 | 5.62 |
| 8 | 59 | 500 | 4.68 |
| 9 | 60 | 772 | 3.78 |
| 10 | 61 | 812 | 4.37 |
| 11 | 71 | 576 | 1.77 |
| 12 | 72 | 506 | 1.13 |
| 13 | 62 | 431 | 1.63 |
| 14 | 67 | 591 | 1.55 |
| 15 | 69 | 645 | 4.45 |

TABLE 5-continued

| Photo-Conductor No. | Bisazo Pigment No. | Vpo (V) | E1/2 (lux · sec) |
|---|---|---|---|
| 16 | 179 | 650 | 1.98 |
| 17 | 180 | 723 | 1.44 |
| 18 | 172 | 572 | 1.39 |
| 19 | 174 | 377 | 1.31 |
| 20 | 173 | 499 | 1.78 |
| 21 | 175 | 320 | 1.26 |
| 22 | 115 | 130 | 4.19 |
| 23 | 181 | 408 | 7.93 |
| 24 | 50 | 278 | 4.59 |
| 25 | 183 | 294 | 3.73 |
| 26 | 187 | 540 | 7.49 |
| 27 | 186 | 196 | 8.45 |
| 28 | 106 | 240 | 4.30 |
| 29 | 189 | 436 | 13.68 |
| 30 | 193 | 560 | 4.11 |
| 31 | 194 | 346 | 1.70 |
| 32 | 195 | 422 | 1.93 |
| 33 | 196 | 863 | 1.71 |
| 34 | 198 | 766 | 2.72 |
| 35 | 199 | 529 | 1.66 |
| 36 | 200 | 122 | 0.62 |
| 37 | 201 | 291 | 0.91 |
| 38 | 202 | 596 | 2.43 |
| 39 | 204 | 646 | 8.64 |
| 40 | 207 | 191 | 0.78 |
| 41 | 209 | 426 | 0.88 |
| 42 | 210 | 233 | 1.09 |
| 43 | 211 | 300 | 1.19 |
| 44 | 212 | 298 | 2.05 |
| 45 | 213 | 731 | 3.60 |

TABLE 6

| Photo-Conductor No. | Bisazo Pigment No. | Vpo (V) | E1/2 (lux · sec) |
|---|---|---|---|
| 46 | 1 | 630 | 8.50 |
| 47 | 58 | 120 | 0.90 |
| 48 | 77 | 1060 | 7.21 |
| 49 | 90 | 200 | 0.79 |
| 50 | 163 | 420 | 3.52 |
| 51 | 10 | 1025 | 9.21 |
| 52 | 4 | 480 | 4.71 |
| 53 | 65 | 390 | 1.17 |
| 54 | 66 | 480 | 1.36 |
| 55 | 60 | 495 | 0.86 |
| 56 | 61 | 520 | 1.05 |
| 57 | 70 | 470 | 1.51 |
| 58 | 63 | 430 | 1.96 |
| 59 | 67 | 520 | 0.55 |
| 60 | 69 | 620 | 1.26 |
| 61 | 167 | 890 | 9.10 |
| 62 | 181 | 116 | 3.64 |
| 63 | 194 | 109 | 0.85 |
| 64 | 195 | 177 | 0.72 |
| 65 | 196 | 246 | 0.57 |
| 66 | 198 | 151 | 0.62 |
| 67 | 199 | 194 | 0.62 |
| 68 | 202 | 194 | 0.49 |
| 69 | 204 | 505 | 1.66 |
| 70 | 212 | 169 | 0.63 |
| 71 | 213 | 328 | 0.86 |

TABLE 7

| Photo-Conductor No. | Bisazo Pigment No. | Vpo (V) | E1/2 (lux · sec) |
|---|---|---|---|
| 72 | 58 | 594 | 5.80 |
| 73 | 90 | 856 | 5.86 |

TABLE 7-continued

| Photo-Conductor No. | Bisazo Pigment No. | Vpo (V) | E1/2 (lux · sec) |
|---|---|---|---|
| 74 | 115 | 212 | 6.84 |
| 75 | 163 | 358 | 6.13 |
| 76 | 16 | 310 | 4.23 |
| 77 | 65 | 762 | 5.92 |
| 78 | 59 | 420 | 4.47 |
| 79 | 60 | 790 | 5.92 |
| 80 | 71 | 420 | 1.85 |
| 81 | 72 | 284 | 1.33 |
| 82 | 63 | 543 | 8.39 |
| 83 | 67 | 475 | 1.79 |
| 84 | 179 | 812 | 3.31 |
| 85 | 180 | 962 | 3.25 |
| 86 | 172 | 442 | 1.95 |
| 87 | 174 | 333 | 2.07 |
| 88 | 173 | 650 | 7.41 |
| 89 | 2 | 628 | 6.53 |
| 90 | 33 | 206 | 2.43 |
| 91 | 181 | 280 | 6.71 |
| 92 | 192 | 268 | 10.61 |
| 93 | 189 | 292 | 10.82 |
| 94 | 193 | 868 | 12.88 |
| 95 | 194 | 527 | 6.70 |
| 96 | 195 | 279 | 2.77 |
| 97 | 196 | 960 | 5.06 |
| 98 | 198 | 778 | 3.95 |
| 99 | 199 | 994 | 2.63 |
| 100 | 201 | 236 | 1.76 |
| 101 | 202 | 570 | 6.37 |
| 102 | 207 | 242 | 1.26 |
| 103 | 208 | 159 | 0.61 |
| 104 | 209 | 554 | 1.79 |
| 105 | 210 | 283 | 4.83 |
| 106 | 211 | 272 | 1.69 |
| 107 | 212 | 332 | 5.10 |
| 108 | 213 | 568 | 4.94 |

TABLE 8

| Photo-Conductor No. | Bisazo Pigment No. | Vpo (V) | E1/2 (lux · sec) |
|---|---|---|---|
| 109 | 90 | 988 | 7.62 |
| 110 | 163 | 544 | 6.68 |
| 111 | 16 | 484 | 5.67 |
| 112 | 65 | 962 | 7.40 |
| 113 | 59 | 806 | 7.71 |
| 114 | 60 | 984 | 7.31 |
| 115 | 71 | 874 | 2.90 |
| 116 | 72 | 584 | 2.48 |
| 117 | 74 | 470 | 2.54 |
| 118 | 62 | 620 | 3.82 |
| 119 | 67 | 681 | 2.71 |
| 120 | 179 | 949 | 5.25 |
| 121 | 180 | 1187 | 4.49 |
| 122 | 172 | 693 | 3.38 |
| 123 | 174 | 704 | 3.38 |
| 124 | 181 | 364 | 5.83 |
| 125 | 42 | 1028 | 7.54 |
| 126 | 182 | 516 | 9.68 |
| 127 | 194 | 739 | 13.85 |
| 128 | 195 | 501 | 4.33 |
| 129 | 196 | 1082 | 8.51 |
| 130 | 198 | 996 | 5.38 |
| 131 | 199 | 766 | 3.93 |
| 132 | 200 | 297 | 3.29 |
| 133 | 201 | 421 | 3.97 |
| 134 | 202 | 785 | 9.01 |
| 135 | 203 | 506 | 2.17 |
| 136 | 205 | 456 | 1.22 |
| 137 | 206 | 247 | 3.16 |
| 138 | 207 | 531 | 2.97 |
| 139 | 208 | 565 | 1.65 |

TABLE 8-continued

| Photo-Conductor No. | Bisazo Pigment No. | Vpo (V) | E1/2 (lux · sec) |
|---|---|---|---|
| 140 | 209 | 794 | 2.90 |
| 141 | 210 | 415 | 9.12 |
| 142 | 211 | 693 | 3.32 |
| 143 | 212 | 402 | 7.34 |
| 144 | 213 | 958 | 6.35 |

Furthermore, the electrophotographic photoconductors No. 4 and No. 7 according to the present invention were separately incorporated into a commercially available copying machine ("MYRICOPY M-5" made by Ricoh Company Ltd.) and the image formation tests were repeated 10,000 times. As a result, both of the photoconductors No. 4 and No. 7 yielded clear images without any degradation due to the deterioration of the photoconductor in the course of the repeated operation.

To measure the spectral reflectance of the bisazo pigment for use in the present invention, the following sample No. 1 containing a bisazo pigment for use in the present invention and comparative samples No. 2 and No. 3 were prepared:

(1) Preparation of Sample No. 1

A mixture of 7.5 parts by weight of the bisazo pigment No. 58 for use in the present invention, as listed in Table 1, and 500 parts by weight of a tetrahydrofuran solution containing polyester resin (Trademark "Vylon 200" made by Toyobo Co., Ltd) with a solid component of 0.5% was dispersed and ground in a ball mill. The thus obtained dispersion was coated by a doctor blade on an aluminum-deposited surface of a substrate which was obtained by subjecting a polyester film to aluminum-deposition, and dried, so that a pigment-layer having a thickness of 0.5 μm was formed on the substrate.

(2) Preparation of Samples No. 2 and No. 3

The same procedure as that employed in the above-mentioned preparation of sample No. 1 was repeated except that the-bisazo pigment No. 58 was respectively replaced by the following bisazo pigments, so that comparative samples No. 2 and No. 3 were prepared.

Bisazo Pigment of Sample No. 2:

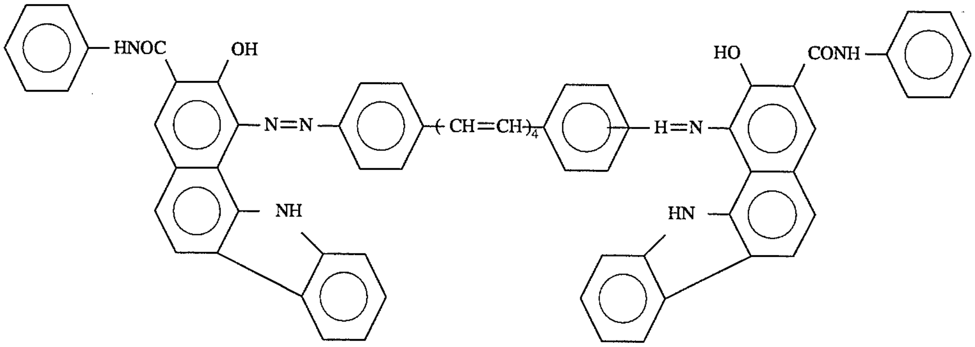

Bisazo Pigment of Sample No. 3:

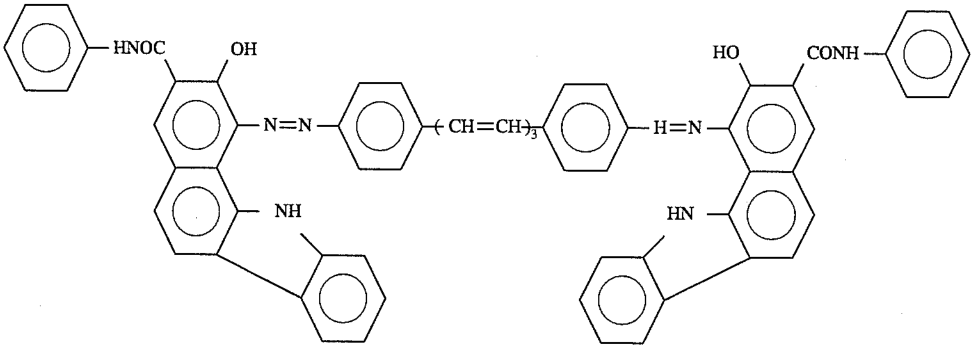

The spectral reflectance of the above-prepared samples No. 1, No. 2 and No. 3 was measured using "Color Analyzer Type-607" made by Hitachi, Ltd. The results are given in FIG. 13.

Figure 13:
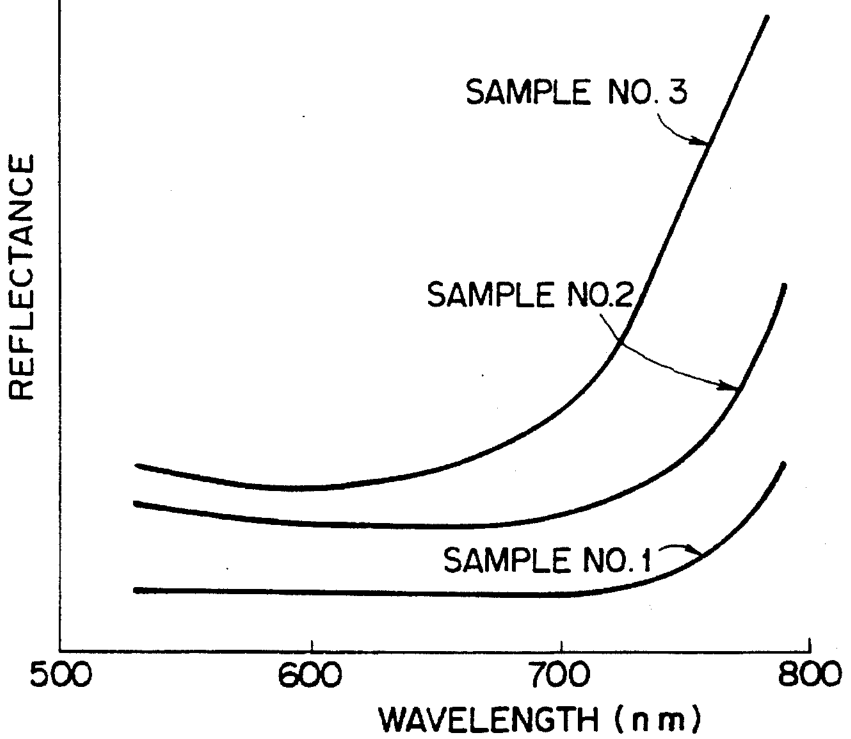
FIG. 13 is a graph showing the relationship between the spectral reflectance and the wavelength, bisazo pigments for use in the present invention.

As shown in FIG. 13, the sample No. 1 employing the bisazo pigment No. 58 according to the present invention shows a lower spectral reflectance even in a long wavelength region, in comparison with the samples No. 2 and No. 3. This indicates that the sample No. 1 has a sufficiently high absorbance, in particular, in the long wavelength region, so that it is useful in the electrophotographic process using semiconductor laser beams.

Tables 5 to 8 indicate that the electrophotographic photoconductors according to the present invention which contain the particular bisazo pigments as charge generation material have high photosensitivity, and good properties which do not change in the course of the repeated operation. In addition, the photoconductors according to the present invention can be manufactured more easily than conventional photoconductors.

What is claimed is:

1. A charge generating material having the formula (I):

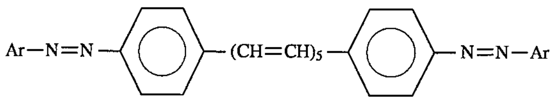

(I)

wherein Ar in the formula (I) is

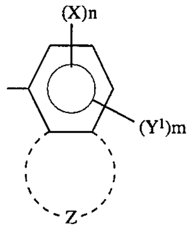

wherein X represents —OH,

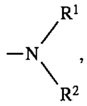

, or —$NHSO_2$—$R^3$, wherein $R^1$ and $R^2$ each represent hydrogen, an unsubstituted or substituted alkyl group; and $R^3$ represents an unsubstituted or substituted alkyl group or an unsubstituted or substituted aryl group;

$Y^1$ represents hydrogen, a halogen, an unsubstituted or substituted alkyl group, an unsubstituted or substituted alkoxy group, a carboxyl group, a sulfo group, an unsubstituted or substituted sulfamoyl group,

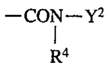

wherein $R^4$ represents hydrogen, an unsubstituted or substituted alkyl group, or an unsubstituted or substituted phenyl group; and $Y^2$ represents an unsubstituted or substituted cyclic hydrocarbon group, an unsubstituted or substituted heterocyclic group, or

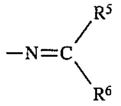

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto;

Z represents an unsubstituted or substituted cyclic hydrocarbon group, or an unsubstituted or substituted heterocyclic group; n is an integer of 1 or 2; and m is an integer of 1 wherein X is situated ortho or para to the site of attachment of the azo group.

2. A charge generating material having the formula (I):

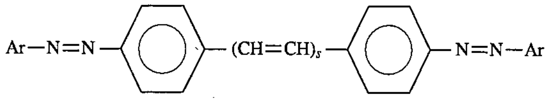

(I)

wherein Ar is

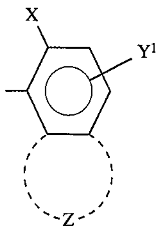

wherein X represents —OH,

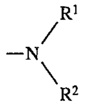

or —$NHSO_2$—$R^3$, wherein $R^1$ and $R^2$ each represent hydrogen, or an unsubstituted or substituted alkyl group; and $R^3$ represents an unsubstituted or substituted alkyl group or an unsubstituted or substituted aryl group;

$Y^1$ represents hydrogen, a halogen, an unsubstituted or substituted alkyl group, an unsubstituted or substituted alkoxyl group, a carboxyl group, a sulfo group, an unsubstituted or substituted sulfamoyl group, or

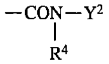

wherein $R^4$ represents hydrogen, an unsubstituted or substituted alkyl group, or an unsubstituted or substituted phenyl group; and $Y^2$ represents an unsubstituted or substituted cyclic hydrocarbon group, an unsubstituted or substituted heterocyclic group, or

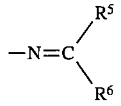

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an substituted or substituted ring in combination with a carbon atom linked thereto; and Z represents an unsubstituted or substituted cyclic hydrocarbon group or an unsubstituted or substituted heterocyclic group.

3. A charge generating material having the formula (I):

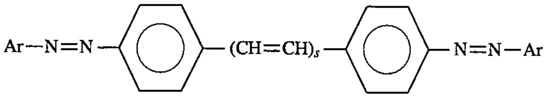

(I)

wherein Ar is

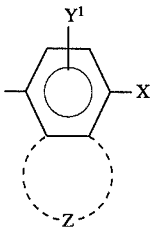

or

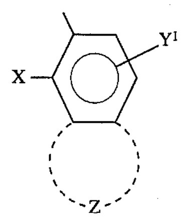

wherein X represents —OH,

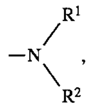

or —$NHSO_2$—$R^3$, wherein $R^1$ and $R^2$ each represent hydrogen, or an unsubstituted or substituted alkyl group; and $R^3$ represents an unsubstituted or substituted alkyl group or an unsubstituted or substituted aryl group;

$Y^1$ represents hydrogen, a halogen, a substituted or unsubstituted alkyl group, an unsubstituted or substituted alkoxyl group, a carboxyl group, a sulfo group, a substituted or unsubstituted sulfamoyl group, or

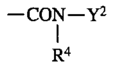

wherein $R^4$ represents hydrogen, an unsubstituted or substituted alkyl croup, or an unsubstituted or substituted phenyl group; and $Y^2$ represents an unsubstituted or substituted cyclic hydrocarbon group, an unsubstituted or substituted heterocyclic group, or

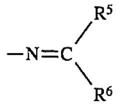

wherein $R^5$ represents an unsubstituted or substituted cyclic hydrocarbon group, an unsubstituted or substituted heterocyclic group, or an unsubstituted or substituted styryl group; and $R^6$ represents hydrogen, an alkyl group, or an unsubstituted or substituted phenyl group, or $R^5$ and $R^6$ may form an unsubstituted or substituted ring in combination with a carbon atom linked thereto: and Z represents an unsubstituted or substituted cyclic hydrocarbon group, or an unsubstituted or substituted heterocyclic group.

4. A bisazo compound having the formula:

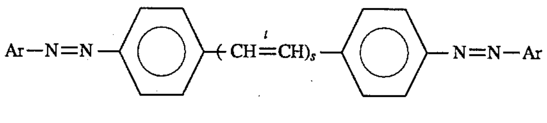

wherein Ar represents

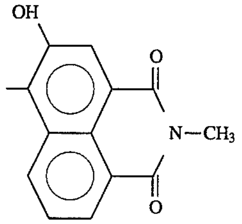

or

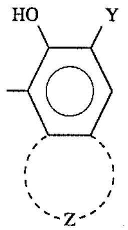

wherein Y represents a methoxy carbonyl group; an N,N-dimethyl carbamoyl group; —CONH—$Y^1$ in which $Y^1$ represents an unsubstituted or substituted hydrocarbon group, or an unsubstituted or substituted heterocyclic group; or —CONH=CH—$Y^2$ in which $Y^2$ represents an unsubstituted or substituted hydrocarbon group, or an unsubstituted or substituted heterocyclic group; and Z represents a benzene ring, a naphthalene ring, or an carbazole ring each of which rings may have a substituent.

5. The bisazo compound as claimed in claim 4, wherein said benzene ring, naphthalene ring and carbazole ring represented by Z may have a substituent selected from the group consisting of a halogen, an alkyl group, and an alkoxyl group; said hydrocarbon group represented by $Y^1$ is (i) a phenyl group which may have a substituent selected from the group consisting of an alkyl group, an alkoxyl group, a hydroxyl group, a dialkylamino group, a halogen, a nitro group, a phenylamino group and a phenylcarbamoyl group, or (ii) a naphthyl group which may have a substituent selected from the group consisting of an alkyl group, a halogen, a hydroxyl group, a nitro group and an alkoxyl group; or said heterocyclic group represented by $Y^1$ is a group selected from the group consisting of a carbazolyl group,

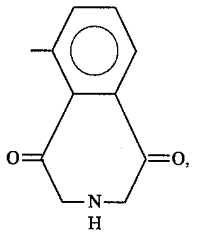

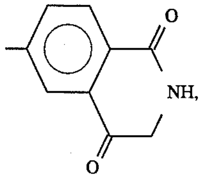

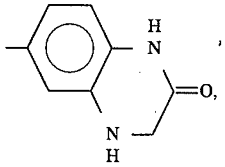

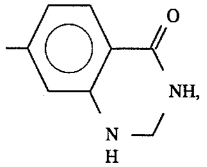

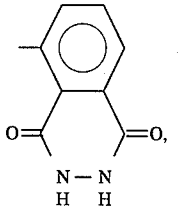

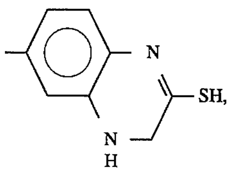

-continued
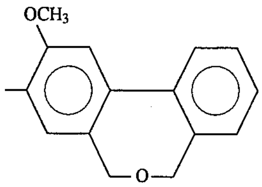
, and
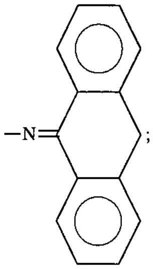
;
and said hydrocarbon group represented by $Y^2$ is (i) a phenyl group or naphthyl group which may have a substituent selected from the group consisting of an alkyl group, an alkoxyl group, a halogen, a hydroxyl group and a nitro group, or (ii) an anthryl group.
* * * * *

UNITED STATES PATENT AND TRADEMARK OFFICE
CERTIFICATE OF CORRECTION

PATENT NO. : 5,623,062
DATED : APRIL 22, 1997
INVENTOR(S) : MASAOMI SASAKI ET AL

It is certified that error appears in the above-identified patent and that said Letters Patent is hereby corrected as shown below:

Column 2, line 52, "electro-photographic" should read --electrophotographic--.

Column 3, line 17, "practice-for" should read --practice for--.

Column 5, line 29, "alkoxy-group" should --alkoxy group--; "group-a" should read --group, a--; and "group an" should read --group, an--;
line 55, "group," should read --group, or--;
line 56, "$R^5$ $R^6$" should read --$R^5$ and $R^6$--; and "substituted" (first occurrence) should read --unsubstituted--.

Column 8, line 50, "an" (first occurrence) should read --a--.

Column 15, line 13, "group" should read --group;--

Column 111, line 49, "Fig. 15" should read --Fig. 12--.

Column 117, line 31, "present-invention-will" should read --present invention will--.

Column 122, line 11, "the-bisazo" should read --the bisazo--.

Column 124, line 56, "substituted" should read --unsubstituted--.

UNITED STATES PATENT AND TRADEMARK OFFICE

CERTIFICATE OF CORRECTION

PATENT NO. : 5,623,062

DATED : APRIL 22, 1997

INVENTOR(S) : MASAOMI SASAKI ET AL

It is certified that error appears in the above-identified patent and that said Letters Patent is hereby corrected as shown below:

Column 125, line 37, "croup" should read --group--.

Signed and Sealed this

Seventh Day of July, 1998

*Attest:*

BRUCE LEHMAN

*Attesting Officer*

*Commissioner of Patents and Trademarks*